United States Patent
Giusti et al.

(10) Patent No.: US 11,841,933 B2
(45) Date of Patent: Dec. 12, 2023

(54) RADAR-BASED AUTHENTICATION STATUS FEEDBACK

(71) Applicant: Google LLC, Mountain View, CA (US)

(72) Inventors: Leonardo Giusti, San Francisco, CA (US); Ivan Poupyrev, Los Altos, CA (US); Vignesh Sachidanandam, Redwood City, CA (US); Johan Prag, Mountain View, CA (US); Brandon Barbello, Mountain View, CA (US); Tyler Reed Kugler, Palo Alto, CA (US); Alok Chandel, Mountain View, CA (US)

(73) Assignee: Google LLC, Mountain View, CA (US)

( * ) Notice: Subject to any disclaimer, the term of this patent is extended or adjusted under 35 U.S.C. 154(b) by 268 days.

(21) Appl. No.: 16/901,189

(22) Filed: Jun. 15, 2020

(65) Prior Publication Data

US 2020/0410072 A1     Dec. 31, 2020

Related U.S. Application Data

(63) Continuation of application No. PCT/US2019/039306, filed on Jun. 26, 2019.

(51) Int. Cl.
*G06F 1/32* (2019.01)
*G06F 21/32* (2013.01)
(Continued)

(52) U.S. Cl.
CPC ............. *G06F 21/32* (2013.01); *G01S 7/412* (2013.01); *G01S 7/415* (2013.01); *G06F 1/3231* (2013.01)

(58) Field of Classification Search
CPC .......... G01S 13/56; G01S 7/415; G01S 7/412; G01S 13/867; G06F 21/32; G06F 1/3231; G06F 21/316; H04W 12/06; H04W 12/68
See application file for complete search history.

(56) References Cited

U.S. PATENT DOCUMENTS 5,670,987 A      9/1997    Koi et al.
6,215,890 B1    4/2001    Matsuo et al.
(Continued)

FOREIGN PATENT DOCUMENTS

CN    102549574    7/2012
CN    103502911    1/2014
(Continued)

OTHER PUBLICATIONS

"Extended European Search Report", EP Application No. 21191070.8, dated Dec. 1, 2021, 13 pages.
(Continued)

*Primary Examiner* — Towfiq Elahi
(74) *Attorney, Agent, or Firm* — Colby Nipper PLLC

(57) ABSTRACT

This document describes techniques and systems that enable radar-based authentication status feedback. A radar field is used to enable an electronic device to account for the user's distal physical cues to determine and maintain an awareness of the user's location and movements around the device. This awareness allows the device to anticipate some of the user's intended interactions and provide functionality in a timely and seamless manner, such as preparing an authentication system to authenticate the user before the user touches or speaks to the device. These features also allow the device to provide visual feedback that can help the user understand that the device is aware of the user's location and movements. In some cases, the feedback is provided using visual elements presented on a display.

20 Claims, 18 Drawing Sheets

(51) Int. Cl.
*G01S 7/41* (2006.01)
*G06F 1/3231* (2019.01)

(56) References Cited

U.S. PATENT DOCUMENTS

| | | |
|---|---|---|
| 6,727,892 B1 | 4/2004 | Murphy |
| 6,990,335 B1 | 1/2006 | Shamoon et al. |
| 8,237,666 B2 | 8/2012 | Soo et al. |
| 8,373,666 B2 | 2/2013 | Jung et al. |
| 8,508,347 B2 | 8/2013 | Pihlaja |
| 8,659,548 B2 | 2/2014 | Hildreth |
| 9,134,798 B2 | 9/2015 | Morris et al. |
| 9,207,852 B1 | 12/2015 | Zhou et al. |
| 9,448,634 B1 | 9/2016 | Wakeford et al. |
| 9,575,560 B2 | 2/2017 | Poupyrev et al. |
| 9,629,201 B2 | 4/2017 | Chen et al. |
| 9,778,749 B2 | 10/2017 | Poupyrev |
| 9,811,164 B2 | 11/2017 | Poupyrev |
| 9,921,660 B2 | 3/2018 | Poupyrev |
| 10,061,509 B2 | 8/2018 | Mese et al. |
| 10,088,908 B1 | 10/2018 | Poupyrev et al. |
| 10,101,874 B2 | 10/2018 | Kwon et al. |
| 10,139,916 B2 | 11/2018 | Poupyrev |
| 10,241,581 B2 | 3/2019 | Lien et al. |
| 10,268,321 B2 | 4/2019 | Poupyrev |
| 10,284,541 B1 | 5/2019 | Subramanian et al. |
| 10,300,370 B1 | 5/2019 | Amihood et al. |
| 10,356,617 B2 | 7/2019 | Abernathy et al. |
| 10,394,333 B2 | 8/2019 | Cheng et al. |
| 10,602,548 B2 | 3/2020 | Trotta et al. |
| 10,915,155 B2 | 2/2021 | Zhu et al. |
| 11,169,615 B2 | 11/2021 | Stern et al. |
| 11,281,303 B2 | 3/2022 | Stern et al. |
| 11,288,895 B2 | 3/2022 | Chandel et al. |
| 11,360,192 B2 | 6/2022 | Chandel et al. |
| 11,385,722 B2 | 7/2022 | Hong et al. |
| 11,467,672 B2 | 10/2022 | Sachidanandam et al. |
| 11,687,167 B2 | 6/2023 | Stern et al. |
| 11,790,693 B2 | 10/2023 | Chandel et al. |
| 2002/0158838 A1 | 10/2002 | Smith et al. |
| 2003/0095154 A1 | 5/2003 | Colmenarez |
| 2003/0122651 A1 | 7/2003 | Doi et al. |
| 2004/0157603 A1 | 8/2004 | Hurtta et al. |
| 2006/0256082 A1 | 11/2006 | Cho et al. |
| 2008/0178126 A1 | 7/2008 | Beeck et al. |
| 2008/0300055 A1 | 12/2008 | Lutnick et al. |
| 2009/0191968 A1 | 7/2009 | Johnson et al. |
| 2009/0296930 A1 | 12/2009 | Krantz et al. |
| 2010/0008031 A1 | 1/2010 | Reifman |
| 2010/0192102 A1 | 7/2010 | Chmielewski et al. |
| 2010/0205667 A1 | 8/2010 | Anderson et al. |
| 2010/0215254 A1 | 8/2010 | Prokhorov |
| 2010/0306716 A1 | 12/2010 | Perez |
| 2011/0090761 A1 | 4/2011 | Nishino et al. |
| 2011/0181509 A1 | 7/2011 | Rautiainen et al. |
| 2011/0181510 A1 | 7/2011 | Hakala et al. |
| 2011/0181526 A1 | 7/2011 | Shaffer et al. |
| 2011/0185318 A1 | 7/2011 | Hinckley et al. |
| 2011/0304541 A1 | 12/2011 | Dalal |
| 2011/0310005 A1 | 12/2011 | Chen et al. |
| 2012/0032834 A1 | 2/2012 | Weeks et al. |
| 2012/0092284 A1 | 4/2012 | Rofougaran et al. |
| 2012/0110516 A1 | 5/2012 | Tumanov |
| 2012/0131229 A1 | 5/2012 | Mccarthy et al. |
| 2012/0185910 A1 | 7/2012 | Miettinen et al. |
| 2012/0194551 A1 | 8/2012 | Osterhout et al. |
| 2012/0214594 A1 | 8/2012 | Kirovski et al. |
| 2012/0226981 A1* | 9/2012 | Clavin ............ G06F 3/005 715/750 |
| 2012/0229377 A1 | 9/2012 | Kim et al. |
| 2012/0235790 A1 | 9/2012 | Zhao et al. |
| 2012/0280900 A1 | 11/2012 | Wang et al. |
| 2012/0280917 A1 | 11/2012 | Toksvig et al. |
| 2013/0038564 A1 | 2/2013 | Ho |
| 2013/0106898 A1 | 5/2013 | Saint-Loubert-Bie et al. |
| 2013/0191791 A1 | 7/2013 | Rydenhag et al. |
| 2013/0316687 A1 | 11/2013 | Subbaramoo et al. |
| 2014/0028539 A1 | 1/2014 | Newham et al. |
| 2014/0092031 A1 | 4/2014 | Schwartz et al. |
| 2014/0118257 A1 | 5/2014 | Baldwin |
| 2014/0124647 A1 | 5/2014 | Hsu |
| 2014/0139422 A1 | 5/2014 | Mistry et al. |
| 2014/0149754 A1 | 5/2014 | Silva et al. |
| 2014/0157209 A1 | 6/2014 | Dalal et al. |
| 2014/0192259 A1 | 7/2014 | Holz |
| 2014/0247206 A1 | 9/2014 | Grokop et al. |
| 2014/0332441 A1 | 11/2014 | Jayetileke et al. |
| 2014/0333431 A1 | 11/2014 | Abdelsamie et al. |
| 2014/0358368 A1 | 12/2014 | Entenmann et al. |
| 2015/0007049 A1 | 1/2015 | Anglois |
| 2015/0084852 A1 | 3/2015 | Shon et al. |
| 2015/0088283 A1 | 3/2015 | Fiedler et al. |
| 2015/0121108 A1* | 4/2015 | Agrawal ............ G06F 21/44 713/323 |
| 2015/0169071 A1 | 6/2015 | Jitkoff |
| 2015/0193116 A1* | 7/2015 | Fadell ............ G06F 3/0488 726/16 |
| 2015/0205821 A1 | 7/2015 | Kogan |
| 2015/0212641 A1 | 7/2015 | Tanneberger et al. |
| 2015/0277569 A1 | 10/2015 | Sprenger et al. |
| 2015/0324004 A1 | 11/2015 | Lee et al. |
| 2015/0346820 A1 | 12/2015 | Poupyrev et al. |
| 2015/0362986 A1 | 12/2015 | Lee et al. |
| 2016/0018900 A1 | 1/2016 | Tu et al. |
| 2016/0036996 A1 | 2/2016 | Midholt et al. |
| 2016/0041617 A1 | 2/2016 | Poupyrev |
| 2016/0041618 A1 | 2/2016 | Poupyrev |
| 2016/0054803 A1 | 2/2016 | Poupyrev |
| 2016/0054808 A1 | 2/2016 | Cho et al. |
| 2016/0055201 A1 | 2/2016 | Poupyrev et al. |
| 2016/0071341 A1 | 3/2016 | Menzel |
| 2016/0073351 A1 | 3/2016 | Cardozo et al. |
| 2016/0084869 A1 | 3/2016 | Yuen et al. |
| 2016/0098089 A1 | 4/2016 | Poupyrev |
| 2016/0150124 A1 | 5/2016 | Panda et al. |
| 2016/0170491 A1 | 6/2016 | Jung |
| 2016/0179205 A1 | 6/2016 | Katz |
| 2016/0187992 A1 | 6/2016 | Yamamoto et al. |
| 2016/0189469 A1 | 6/2016 | Post |
| 2016/0216769 A1 | 7/2016 | Goetz et al. |
| 2016/0252607 A1 | 9/2016 | Saboo et al. |
| 2016/0260309 A1 | 9/2016 | Dayal |
| 2016/0261760 A1 | 9/2016 | Aso et al. |
| 2016/0275348 A1 | 9/2016 | Slaby et al. |
| 2016/0282934 A1 | 9/2016 | Willis et al. |
| 2016/0292410 A1 | 10/2016 | Lu et al. |
| 2016/0306491 A1 | 10/2016 | Lee et al. |
| 2016/0320854 A1 | 11/2016 | Lien et al. |
| 2017/0010658 A1 | 1/2017 | Tanaka et al. |
| 2017/0021728 A1 | 1/2017 | Holger et al. |
| 2017/0052618 A1 | 2/2017 | Lee et al. |
| 2017/0076079 A1 | 3/2017 | Ran et al. |
| 2017/0097413 A1* | 4/2017 | Gillian ............ H04W 16/28 |
| 2017/0097684 A1 | 4/2017 | Lien |
| 2017/0115738 A1 | 4/2017 | Wei |
| 2017/0115739 A1 | 4/2017 | Wei |
| 2017/0160392 A1 | 6/2017 | Brisimitzakis et al. |
| 2017/0168595 A1 | 6/2017 | Sakaguchi et al. |
| 2017/0220843 A1 | 8/2017 | Apostolos et al. |
| 2017/0243389 A1 | 8/2017 | Wild et al. |
| 2017/0243433 A1 | 8/2017 | Luciano et al. |
| 2017/0262064 A1 | 9/2017 | Ofir et al. |
| 2017/0289766 A1 | 10/2017 | Scott et al. |
| 2017/0299710 A1 | 10/2017 | Shin et al. |
| 2017/0336220 A1 | 11/2017 | Broaddus et al. |
| 2017/0337431 A1 | 11/2017 | Yang et al. |
| 2017/0358940 A1 | 12/2017 | Parikh et al. |
| 2018/0004301 A1 | 1/2018 | Poupyrev |
| 2018/0040144 A1 | 2/2018 | Li |
| 2018/0043246 A1 | 2/2018 | Chang |
| 2018/0052518 A1 | 2/2018 | Zhu et al. |
| 2018/0059798 A1 | 3/2018 | Matsubara et al. |
| 2018/0082656 A1 | 3/2018 | Ito et al. |
| 2018/0095524 A1 | 4/2018 | Chew |

(56) References Cited

U.S. PATENT DOCUMENTS

| | | | |
|---|---|---|---|
| 2018/0117447 A1 | 5/2018 | Tran | |
| 2018/0129202 A1 | 5/2018 | Guo et al. | |
| 2018/0157330 A1 | 6/2018 | Gu et al. | |
| 2018/0164893 A1 | 6/2018 | Sperrhake et al. | |
| 2018/0164942 A1 | 6/2018 | Huffman et al. | |
| 2018/0173323 A1 | 6/2018 | Harvey et al. | |
| 2018/0210536 A1 | 7/2018 | Messely et al. | |
| 2018/0211024 A1* | 7/2018 | Zhao | G06F 21/32 |
| 2018/0329049 A1 | 11/2018 | Amihood et al. | |
| 2018/0329050 A1 | 11/2018 | Amihood et al. | |
| 2018/0343023 A1 | 11/2018 | Park et al. | |
| 2019/0011524 A1 | 1/2019 | Beitler et al. | |
| 2019/0011993 A1 | 1/2019 | Ette et al. | |
| 2019/0034609 A1* | 1/2019 | Yang | G01P 15/165 |
| 2019/0072410 A1 | 3/2019 | Tang | |
| 2019/0079590 A1 | 3/2019 | Tomizawa et al. | |
| 2019/0087621 A1 | 3/2019 | Khuri-Yakub et al. | |
| 2019/0129520 A1 | 5/2019 | Shin et al. | |
| 2019/0138109 A1 | 5/2019 | Poupyrev et al. | |
| 2019/0141181 A1 | 5/2019 | Wantland | |
| 2019/0162010 A1 | 5/2019 | Rafrafi et al. | |
| 2019/0175077 A1 | 6/2019 | Zhang et al. | |
| 2019/0187265 A1 | 6/2019 | Barbello et al. | |
| 2019/0260661 A1 | 8/2019 | Amini et al. | |
| 2019/0278339 A1 | 9/2019 | Cooper et al. | |
| 2019/0286806 A1 | 9/2019 | Robinson et al. | |
| 2019/0354668 A1 | 11/2019 | Flautner et al. | |
| 2019/0357049 A1 | 11/2019 | Tali et al. | |
| 2019/0389563 A1 | 12/2019 | Swain | |
| 2020/0081560 A1 | 3/2020 | Geller et al. | |
| 2020/0142645 A1 | 5/2020 | Wibbels et al. | |
| 2020/0159897 A1 | 5/2020 | Schmitt et al. | |
| 2020/0204541 A1 | 6/2020 | Nair et al. | |
| 2020/0219338 A1 | 7/2020 | Chen et al. | |
| 2020/0264657 A1 | 8/2020 | Lee et al. | |
| 2020/0264826 A1 | 8/2020 | Kwon et al. | |
| 2020/0364967 A1 | 11/2020 | Spice | |
| 2020/0366742 A1 | 11/2020 | Van Os et al. | |
| 2020/0371660 A1 | 11/2020 | Che et al. | |
| 2020/0372239 A1 | 11/2020 | Schmitt et al. | |
| 2021/0019441 A1 | 1/2021 | Neves Creto et al. | |
| 2021/0025976 A1 | 1/2021 | Alok et al. | |
| 2021/0026454 A1 | 1/2021 | Hong et al. | |
| 2021/0027049 A1 | 1/2021 | Chandel et al. | |
| 2021/0029542 A1 | 1/2021 | Prag et al. | |
| 2021/0064142 A1 | 3/2021 | Stern et al. | |
| 2021/0064143 A1 | 3/2021 | Stern et al. | |
| 2021/0064144 A1 | 3/2021 | Stern et al. | |
| 2021/0064145 A1 | 3/2021 | Stern et al. | |
| 2021/0064146 A1 | 3/2021 | Stern et al. | |
| 2021/0103337 A1 | 4/2021 | Jeppsson et al. | |
| 2021/0103348 A1 | 4/2021 | Jeppsson et al. | |
| 2021/0158138 A1 | 5/2021 | Hazra et al. | |
| 2021/0314250 A1 | 10/2021 | Laplante et al. | |
| 2021/0342008 A1 | 11/2021 | Sachidanandam et al. | |
| 2022/0026993 A1 | 1/2022 | O'Reilley et al. | |
| 2022/0100283 A1 | 3/2022 | Stern et al. | |
| 2022/0180659 A1 | 6/2022 | Chandel et al. | |
| 2022/0261084 A1 | 8/2022 | Hong et al. | |
| 2022/0283649 A1 | 9/2022 | Stern et al. | |
| 2022/0413620 A1 | 12/2022 | Sachidanandam et al. | |
| 2023/0251725 A1 | 8/2023 | Stern et al. | |
| 2023/0315212 A1 | 10/2023 | Stern et al. | |

FOREIGN PATENT DOCUMENTS

| | | |
|---|---|---|
| CN | 103729054 | 4/2014 |
| CN | 105278674 | 1/2016 |
| CN | 105278681 | 1/2016 |
| CN | 105404466 | 3/2016 |
| CN | 205318531 | 6/2016 |
| CN | 106062777 | 10/2016 |
| CN | 106339076 | 1/2017 |
| CN | 106371569 | 2/2017 |
| CN | 106537173 | 3/2017 |
| CN | 106662639 | 5/2017 |
| CN | 107107841 | 8/2017 |
| CN | 107130873 | 9/2017 |
| CN | 107430443 | 12/2017 |
| CN | 107589829 | 1/2018 |
| CN | 107710012 | 2/2018 |
| CN | 108287608 | 7/2018 |
| CN | 108639006 | 10/2018 |
| CN | 108781308 | 11/2018 |
| CN | 108958490 | 12/2018 |
| CN | 109032488 | 12/2018 |
| CN | 208339456 | 1/2019 |
| CN | 109643167 | 4/2019 |
| CN | 109857251 | 6/2019 |
| CN | 110050240 | 7/2019 |
| CN | 115079109 | 9/2022 |
| DE | 202017104779 | 11/2017 |
| EP | 2385450 | 11/2011 |
| EP | 3267291 | 1/2018 |
| GB | 2548964 | 10/2017 |
| GB | 2575185 | 1/2020 |
| JP | 2007080219 | 3/2007 |
| JP | 4314877 | 8/2009 |
| JP | 4318227 | 8/2009 |
| JP | 2015103020 | 6/2015 |
| JP | 2015207275 | 11/2015 |
| JP | 2016076061 | 5/2016 |
| JP | 2016517087 | 6/2016 |
| JP | 2016153250 | 8/2016 |
| JP | 2018520394 | 7/2018 |
| JP | 2018185873 | 11/2018 |
| JP | 2019030000 | 2/2019 |
| JP | 2019533846 | 11/2019 |
| KR | 20150033182 | 4/2015 |
| KR | 20150112708 | 10/2015 |
| KR | 20160123200 | 10/2016 |
| KR | 101683868 | 12/2016 |
| KR | 20180030123 | 3/2018 |
| KR | 20180071398 | 6/2018 |
| KR | 20180115348 | 10/2018 |
| KR | 20190039521 | 4/2019 |
| KR | 20190050775 | 5/2019 |
| WO | 2009008411 | 1/2009 |
| WO | 2015196063 | 12/2015 |
| WO | 2016022764 | 2/2016 |
| WO | 2018226265 | 12/2018 |
| WO | 2019118017 | 6/2019 |
| WO | 2019146032 | 8/2019 |
| WO | 2019206091 | 10/2019 |
| WO | 2021021218 | 2/2021 |
| WO | 2021021219 | 2/2021 |
| WO | 2021021220 | 2/2021 |
| WO | 2021021224 | 2/2021 |
| WO | 2021021227 | 2/2021 |
| WO | 2021040742 | 3/2021 |
| WO | 2021040745 | 3/2021 |
| WO | 2021040747 | 3/2021 |
| WO | 2021040748 | 3/2021 |
| WO | 2021040749 | 3/2021 |

OTHER PUBLICATIONS

"Foreign Office Action", KR Application No. 10-2021-7037578, dated Jan. 19, 2022, 6 pages.

"International Preliminary Report on Patentability", Application No. PCT/US2019/039306, dated Dec. 28, 2021, 11 pages.

"Non-Final Office Action", U.S. Appl. No. 16/912,534, dated Jan. 6, 2022, 21 pages.

"Non-Final Office Action", U.S. Appl. No. 16/912,603, dated Feb. 3, 2022, 14 pages.

"Non-Final Office Action", U.S. Appl. No. 16/965,735, dated Nov. 23, 2021, 12 pages.

"Non-Final Office Action", U.S. Appl. No. 16/872,055, dated Nov. 23, 2021, 25 pages.

"Non-Final Office Action", U.S. Appl. No. 16/886,626, dated Dec. 17, 2021, 11 pages.

"Non-Final Office Action", U.S. Appl. No. 16/912,373, dated Dec. 24, 21, 6 pages.

(56) References Cited

OTHER PUBLICATIONS

"Non-Final Office Action", U.S. Appl. No. 16/871,945, dated Dec. 24, 21, 8 pages.
"Notice of Allowance", U.S. Appl. No. 16/912,635, dated Jan. 28, 2022, 5 pages.
"Notice of Allowance", U.S. Appl. No. 16/879,662, dated Nov. 17, 2021, 7 pages.
"Foreign Office Action", CN Application No. 201980006096.3, dated Jul. 14, 2021, 18 pages.
"Non-Final Office Action", U.S. Appl. No. 16/871,945, dated May 7, 2021, 41 pages.
"Non-Final Office Action", U.S. Appl. No. 16/912,635, dated Jun. 11, 2021, 14 pages.
"Notice of Allowance", U.S. Appl. No. 16/912,307, dated Jun. 23, 2021, 8 pages.
"Final Office Action", U.S. Appl. No. 16/871,945, dated Aug. 25, 2021, 46 pages.
"Final Office Action", U.S. Appl. No. 16/601,452, dated Sep. 30, 2021, 15 pages.
"Final Office Action", U.S. Appl. No. 16/912,373, dated Oct. 8, 2021, 11 pages.
"Foreign Notice of Allowance", KR Application No. 10-2019-0157394, dated Sep. 24, 2021, 3 pages.
"Foreign Office Action", KR Application No. 10-2019-0157391, dated Jul. 29, 2021, 9 pages.
"Non-Final Office Action", U.S. Appl. No. 16/601,421, dated Sep. 14, 2021, 29 pages.
"Non-Final Office Action", U.S. Appl. No. 16/879,662, dated Sep. 16, 2021, 12 pages.
"Notice of Allowance", U.S. Appl. No. 16/912,635, dated Aug. 19, 2021, 7 pages.
Park, "Development of Kinect-Based Pose Recognition Model for Exercise Game", May 2016, pp. 303-310.
"ControlAir on the Mac App Store", retrieved from https://apps.apple.com/om/app/controlair/id950009491 on Jun. 25, 19, 2 pages.
"Intelligent Rendering of Readable Content onto Display Devices", Published on IP.com on Sep. 21, 2010, Sep. 21, 2010, 4 pages.
"International Search Report and Written Opinion", PCT Application No. PCT/US2019/039306, dated Mar. 11, 2020, 17 pages.
"International Search Report and Written Opinion", PCT Application No. PCT/US2019/049208, dated Mar. 26, 2020, 13 pages.
"International Search Report and Written Opinion", PCT Application No. PCT/US2019/049212, dated Mar. 26, 2020, 14 pages.
"International Search Report and Written Opinion", PCT Application No. PCT/US2019/053676, dated Apr. 2, 2020, 14 pages.
"International Search Report and Written Opinion", PCT Application No. PCT/US2019/049233, dated Apr. 20, 2020, 19 pages.
"International Search Report and Written Opinion", PCT Application No. PCT/US2019/049236, dated May 26, 2020, 17 pages.
"International Search Report and Written Opinion", PCT Application No. PCT/US2019/049204, dated May 4, 2020, 15 pages.
"International Search Report and Written Opinion", PCT Application No. PCT/US2019/049164, dated May 6, 2020, 14 pages.
"International Search Report and Written Opinion", PCT Application No. PCT/US2019/049225, dated May 6, 2020, 15 pages.
Aboussouan, "Super-Resolution Image Construction Using an Array Camera", Technical Disclosure Commons; Retrieved from http://www.tdcommons.org/dpubs_series/643, Aug. 18, 2017, 7 pages.
Amihood, et al., "Closed-Loop Manufacturing System Using Radar", Technical Disclosure Commons; Retrieved from http://www.tdcommons.org/dpubs_series/464, Apr. 17, 2017, 8 pages.
Bardram, et al., "Context-Aware User Authentication - Supporting Proximity-Based Login in Pervasive Computing", Centre for Pervasive Computing; Department of Computer Science, University of Aarhus; A.K. Dey et al. (Eds.): UbiComp 2003, LNCS 2864; © Springer-Verlag Berlin Heidelberg, 2003, pp. 107-123.
Colgan, "How Does the Leap Motion Controller Work?", Retrieved from http://blog.leapmotion.com/hardware-to-software-how-does-the-leap-motion-controller-work/ on Jun. 25, 2019, Aug. 9, 2014, 10 pages.

Karagozler, et al., "Embedding Radars in Robots to Accurately Measure Motion", Technical Disclosure Commons; Retrieved from http://www.tdcommons.org/dpubs_series/454, Mar. 30, 2017, 8 pages.
Lien, et al., "Embedding Radars in Robots for Safety and Obstacle Detection", Technical Disclosure Commons; Retrieved from http://www.tdcommons.org/dpubs_series/455, Apr. 2, 2017, 10 pages.
Oh, et al., "Gesture Sensor for Mobile Devices", Samsung Electronics Co., Ltd; White Paper, 2013, 12 pages.
"Final Office Action", U.S. Appl. No. 16/601,421, dated Mar. 30, 2021, 17 pages.
"Foreign Office Action", KR Application No. 10-2019-0157391, dated Jan. 29, 2021, 8 pages.
"Foreign Office Action", KR Application No. 10-2019-0157394, dated Mar. 25, 2021, 10 pages.
"Non-Final Office Action", U.S. Appl. No. 16/912,307, dated Mar. 19, 2021, 11 pages.
"Non-Final Office Action", U.S. Appl. No. 16/601,452, dated Mar. 24, 2021, 13 pages.
"Non-Final Office Action", U.S. Appl. No. 16/912,373, dated Apr. 1, 2021, 15 pages.
"Non-Final Office Action", U.S. Appl. No. 16/871,945, dated Mar. 8, 2021, 41 pages.
Poupyrev, "Welcome to Project Soli—Youtube", Retrieved at: https://www.youtube.com/watch?v=0QNiZfSsPc0, May 29, 2015, 1 page.
Yeeun, "Brain Out—Blog", Retrieved at: https://blog.naver.com/junye2147/221658923923, Sep. 25, 2019, 29 pages.
"Final Office Action", U.S. Appl. No. 16/872,055, dated Apr. 15, 2022, 24 pages.
"Foreign Notice of Allowance", KR Application No. 10-2021-7037578, dated Apr. 11, 2022, 3 pages.
"Foreign Office Action", KR Application No. 10-2019-0157391, dated Jan. 26, 2022, 10 pages.
"Foreign Office Action", EP Application No. 19797449.6, dated Feb. 8, 2022, 8 pages.
"Foreign Office Action", IN Application No. 202147051694, dated Mar. 28, 2022, 6 pages.
"Foreign Office Action", EP Application No. 19769329.4, dated Mar. 28, 2022, 9 pages.
"Foreign Office Action", IN Application No. 202147051775, dated Apr. 18, 2022, 5 pages.
"International Preliminary Report on Patentability", Application No. PCT/US2019/049208, dated Feb. 1, 2022, 8 pages.
"International Preliminary Report on Patentability", Application No. PCT/US2019/049212, dated Feb. 1, 2022, 9 pages.
"International Preliminary Report on Patentability", Application No. PCT/US2019/049216, dated Feb. 1, 2022, 9 pages.
"International Preliminary Report on Patentability", Application No. PCT/US2019/053676, dated Feb. 1, 2022, 9 pages.
"International Preliminary Report on Patentability", Application No. PCT/US2019/055731, dated Feb. 1, 2022, 9 pages.
"International Preliminary Report on Patentability", Application No. PCT/US2019/049225, dated Mar. 1, 2022, 10 pages.
"International Preliminary Report on Patentability", Application No. PCT/US2019/049236, dated Mar. 1, 2022, 10 pages.
"International Preliminary Report on Patentability", Application No. PCT/US2019/049233, dated Mar. 1, 2022, 13 pages.
"International Preliminary Report on Patentability", Application No. PCT/US2019/049164, dated Mar. 1, 2022, 9 pages.
"International Preliminary Report on Patentability", Application No. PCT/US2019/049204, dated Mar. 1, 2022, 9 pages.
"Notice of Allowance", U.S. Appl. No. 16/886,626, dated Mar. 18, 2022, 5 pages.
"Notice of Allowance", U.S. Appl. No. 16/871,945, dated Apr. 13, 2022, 14 pages.
"Notice of Allowance", U.S. Appl. No. 16/912,373, dated Apr. 20, 2022, 8 pages.
"International Search Report and Written Opinion", PCT Application No. PCT/US2019/055731, dated Mar. 26, 2020, 15 pages.
"International Search Report and Written Opinion", PCT Application No. PCT/US2019/049216, dated Apr. 2, 2020, 14 pages.
"Non-Final Office Action", U.S. Appl. No. 16/601,421, dated Oct. 2, 2020, 15 pages.

(56) References Cited

OTHER PUBLICATIONS

"Foreign Office Action", IN Application No. 202147055373, dated Apr. 26, 2022, 6 pages.
"Foreign Office Action", IN Application No. 202147051918, dated Apr. 27, 2022, 7 pages.
"Foreign Office Action", IN Application No. 202147055371, dated Apr. 28, 2022, 6 pages.
"Foreign Office Action", KR Application No. 10-2021-7037833, dated Apr. 29, 2022, 8 pages.
"Foreign Office Action", IN Application No. 202147051927, dated Jun. 7, 2022, 7 pages.
"Foreign Office Action", EP Application No. 19769329.4, dated Oct. 5, 2022, 18 pages.
"Foreign Office Action", JP Application No. 2021-569202, dated Oct. 11, 2022, 3 pages.
"Non-Final Office Action", U.S. Appl. No. 17/548,266, dated Sep. 7, 2022, 21 pages.
"Non-Final Office Action", U.S. Appl. No. 17/661,494, dated Sep. 14, 2022, 13 pages.
"Notice of Allowance", U.S. Appl. No. 16/965,735, dated Jun. 17, 2022, 7 pages.
"Foreign Office Action", JP Application No. 2021-569202, dated Oct. 11, 2022, 7 pages.
"Non-Final Office Action", U.S. Appl. No. 17/493,736, dated Nov. 23, 2022, 18 pages.
"Final Office Action", U.S. Appl. No. 17/661,494, dated Feb. 23, 2023, 12 pages.
"Foreign Office Action", KR Application No. 10-2022-7021967, dated Jan. 9, 2023, 15 pages.
"Foreign Office Action", JP Application No. 2021-569190, dated Jan. 17, 2023, 10 pages.
"Foreign Office Action", JP Application No. 2021-569200, dated Feb. 7, 2023, 9 pages.
"Foreign Office Action", CN Application No. 201911194059.8, dated Feb. 15, 2023, 30 pages.
"Foreign Office Action", JP Application No. 2021-572929, dated Feb. 21, 2023, 6 pages.
"Non-Final Office Action", U.S. Appl. No. 17/652,265, dated Feb. 1, 2023, 17 pages.
"Notice of Allowance", U.S. Appl. No. 17/548,266, dated Mar. 7, 2023, 9 pages.
"Foreign Office Action", CN Application No. 201911193126.4, dated Mar. 31, 2023, 22 pages.
"Notice of Allowance", U.S. Appl. No. 17/661,494, dated Jun. 7, 2023, 5 pages.
"Notice of Allowance", U.S. Appl. No. 17/652,265, dated Jun. 7, 2023, 7 pages.
"Foreign Office Action", KR Application No. 10-2021-7040331, dated Jun. 8, 2023, 15 pages.
"Foreign Office Action", KR Application No. 10-2022-7043908, dated Jul. 20, 2023, 7 pages.
"Foreign Office Action", KR Application No. 10-2021-7036641, dated Jul. 31, 2023, 8 pages.
"Foreign Office Action", KR Application No. 10-2021-7037286, dated Jul. 31, 2023, 8 pages.
"Foreign Office Action", CN Application No. 202210329665.1, dated Aug. 9, 2023, 24 pages.
"Foreign Office Action", CN Application No. 201980096552.8, dated Aug. 12, 2023, 23 pages.
"Notice of Allowance", U.S. Appl. No. 17/661,494, dated Aug. 31, 2023, 5 pages.
"Foreign Office Action", CN Application No. 201980096544.3, dated Aug. 31, 2023, 29 pages.
"Foreign Office Action", CN Application No. 201980096592.2, dated Aug. 22, 2023, 34 pages.

* cited by examiner

RADAR-BASED AUTHENTICATION STATUS FEEDBACK

RELATED APPLICATIONS

This application is a continuation application of International Application No. PCT/US2019/039306, filed Jun. 26, 2019 and titled "Radar-Based Authentication Status Feedback," the disclosure of which is incorporated in its entirety by reference herein.

BACKGROUND

Electronic devices are used to communicate, store information and photographs, and conduct business and financial transactions. Because of the types and amount of information stored on electronic devices, many devices turn off the display and lock access to the device after some time period without active user interaction or based on some other criteria. Once the electronic device is locked, typically only an authorized user can unlock and access the device. Electronic devices therefore also typically include technology that allows the device to authenticate a user (e.g., determine that the user is an authorized user) before granting the user access to the device.

Depending on how long the user accesses the device per session or how often the user interacts with the device, users may have to be authenticated multiple times each day (according to some studies, typical users access their electronic devices more than 50 times per day). Often, authentication requires the user to perform a particular interaction on a touchscreen, remember and enter a complicated password, or hold a finger against a sensor long enough for the device to detect a fingerprint. Some electronic devices use a camera and facial recognition algorithms to try to reduce the complexity of the authentication process, but these methods can take extra time for operations such as camera warm up time. Further, even with facial recognition, the user typically has to first pick up the electronic device and aim the camera toward the user's face to make the device aware of the user's desire to be authenticated and access the electronic device. Only after being aimed at the user's face can the electronic device prepare the camera, or other authentication process, and grant the user's request for access. Prior to the user's physical interaction, the electronic device remains locked and unaware of the user's intent. Consequently, any user experience the electronic device provides before the user picks up the electronic device is typically dull and lacking in richness.

SUMMARY

This document describes techniques and systems that enable radar-based authentication status feedback. The techniques and systems use a radar field to enable an electronic device, such as a smartphone, to accurately determine the presence or absence of a user and further determine actions and movements of the user that have been categorized as actions that indicate whether the user intends to interact with the electronic device. Using these techniques, the electronic device can account for the user's distal physical cues to determine and maintain an awareness of the user's location and movements in its environment. This awareness, in turn, allows the electronic device to anticipate some of the user's intended interactions and provide functionality in a timely and seamless manner, such as preparing an authentication system to authenticate the user before the user touches or speaks to the electronic device. The awareness and ability to determine user intention also allow the electronic device to provide feedback that can help the user understand that the electronic device is aware of the user and the user's location and movements with respect to the electronic device. This kind of feedback can educate the user about what the electronic device is aware of and allow the user to take advantage of the additional functionality and features provided by the techniques. In some cases, the feedback is provided using visual elements presented on the display of the electronic device.

Aspects described below include an electronic device comprising a display, a radar system, one or more computer processors, and one or more computer-readable media. The radar system is implemented at least partially in hardware and provides a radar field. The radar system also senses reflections from a user in the radar field, analyzes the reflections from the user in the radar field, and provides radar data based on the analysis of the reflections. The one or more computer-readable media include stored instructions that can be executed by the one or more computer processors to implement a radar-based awareness manager. The radar-based awareness manager maintains the electronic device in a dormant mode. The awareness manager also determines, based on a first subset of the radar data, a presence of the user within a recognition zone of the electronic device and, responsive to determining the presence of the user within the recognition zone, causes the electronic device to enter an aware mode. In the aware mode, the display presents a first visual element that indicates a first status of the electronic device. The awareness manager also detects, based on a second subset of the radar data, a user action that is categorized as an indication of a user intent to interact with the electronic device. In response to the detection of the user action associated with the user intent to interact with the electronic device, the awareness manager causes the electronic device to prepare an authentication system to perform an authentication process. Based on a trigger event, the awareness manager also causes the prepared authentication system to perform the authentication process on the user. In response to the user being authenticated, the awareness manager causes the electronic device to enter an active mode.

Aspects described below also include a method implemented in an electronic device that includes a radar system and a radar-based awareness manager. The method comprises providing, by the radar system, a radar field and sensing, by the radar system, reflections from an object in the radar field. The method also includes analyzing the reflections from the object in the radar field and providing, based on the analysis of the reflections, radar data. The method also includes maintaining the electronic device, by the radar-based awareness manager, in a dormant mode. The method also includes determining, based on a first subset of the radar data, a presence of the user within a recognition zone of the electronic device and, in response to determining the presence of the user within the recognition zone, causing the electronic device to enter an aware mode. In the aware mode, the display presents a first visual element that indicates a first status of the electronic device. The method also includes detecting, based on a second subset of the radar data, a user action that is categorized as an indication of a user intent to interact with the electronic device. The method further includes, in response to detecting the user action that is categorized as the indication of the user intent to interact with the electronic device, causing the electronic device to prepare an authentication system to perform an authentication process. The method also includes causing, by the radar-based awareness manager and based on a trigger event, the prepared authentication system to perform the authentication process on the user and, in response to the user being authenticated, causing, by the radar-based awareness manager, the electronic device to enter an active mode.

Aspects described below include a system comprising a display, and an electronic device that includes, or is associated with means for providing a radar field that provides radar data, the radar data based on sensing and analyzing reflections from an object in the radar field. The system also includes means for maintaining the electronic device in a first mode. The system also includes means for determining, based on the radar data, a presence of the user within a recognition zone of the electronic device and responsive to determining the presence of the user within the recognition zone, causing the electronic device to enter a second mode, in which the display presents a first visual element that indicates a first status of the electronic device. The system also includes means for detecting, based on the radar data, a user action that is categorized as an indication of a user intent to interact with the electronic device and, in response to the detecting the user action associated with the user intent to interact with the electronic device, causing the electronic device to prepare an authentication system to perform an authentication process. The system also includes means for causing, based on a trigger event, the prepared authentication system to perform the authentication process on the user. The system also includes means for causing the electronic device to, in response to the user being authenticated, enter an active mode.

This summary is provided to introduce simplified concepts concerning radar-based authentication status feedback, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of radar-based authentication status feedback are described in this document with reference to the following drawings. The same numbers are used throughout the drawings to reference like features and components.

DETAILED DESCRIPTION

Overview

Figure 1:
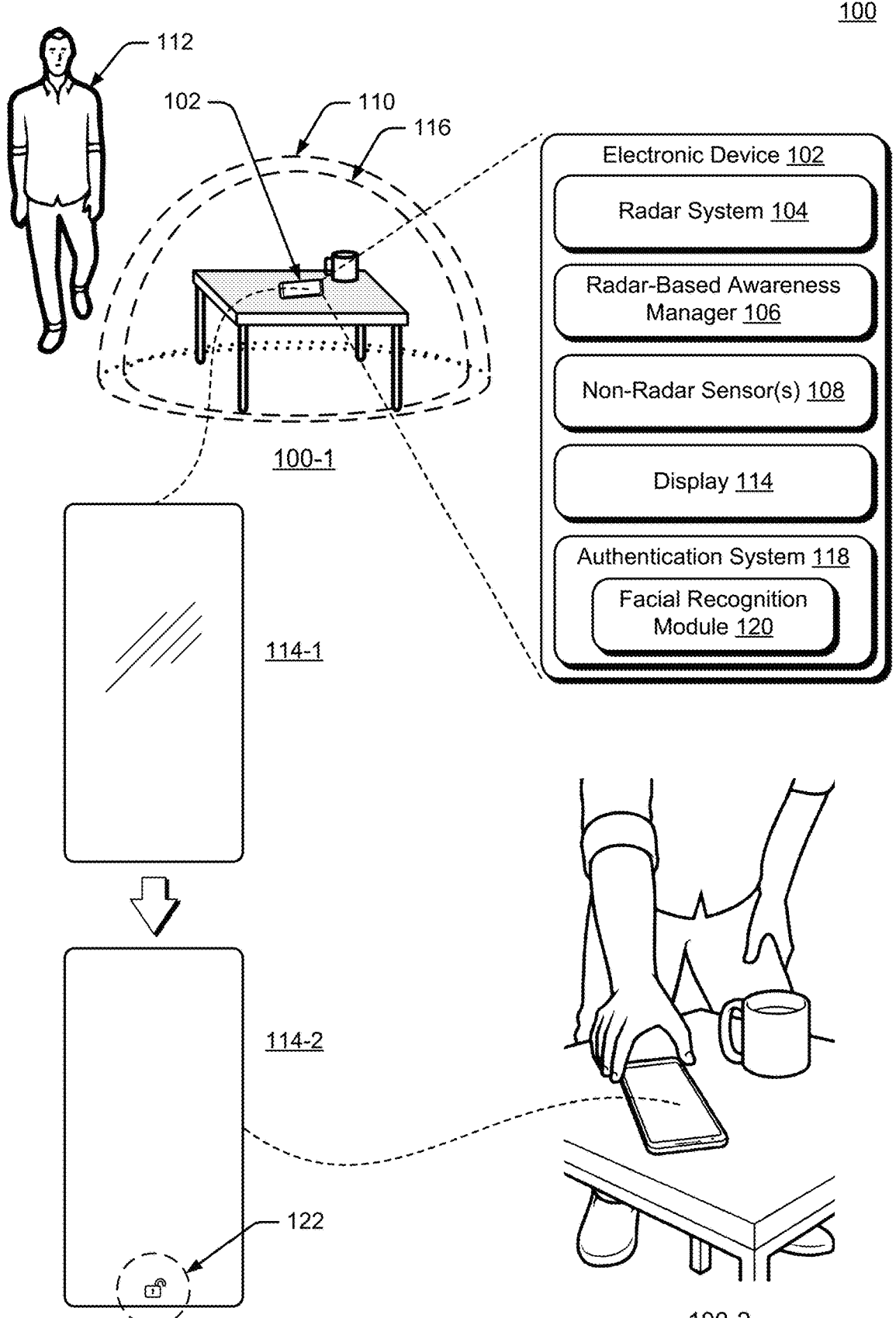
FIG. 1 illustrates an example environment in which techniques enabling radar-based authentication status feedback can be implemented.

This document describes techniques and systems that enable radar-based authentication status feedback. As noted, the authentication system and processes used to maintain security for an electronic device can adversely affect the user's experience by requiring multiple, time-consuming authentications over the course of the user's interactions with the electronic device. Even when using less complex authentication processes, such as facial recognition, operations such as camera warm-up and launching the facial recognition program take additional time. This problem is particularly frustrating to the user when the device locks access after some time period during which the user is not actually inactive, but is merely passively interacting.

The described techniques and systems employ a radar system that can determine a user's intent to interact, or not interact, with the electronic device, based on the user's position, the user's orientation with reference to the device, the user's gestures, or other factors. These techniques allow the electronic device to provide a timelier and more-efficient authentication process by anticipating when the user is ready to be authenticated and to more-accurately determine when to lock the device when the user is away. Because the described techniques allow the electronic device to determine the user's intention, interactions may be more convenient and less frustrating because the electronic device can anticipate the user's intent and enter an appropriate mode or state to interact and receive input.

Further, the radar system can detect the user's implicit interactions with the electronic device, such as presence, location, and movement, relative to the electronic device. Detection of the implicit interactions enables the electronic device to provide feedback and cues that inform the user of the electronic device's level of awareness regarding the implicit interactions and corresponding functionality.

Consider an example in which the electronic device is a smartphone that includes the described radar system and other components. In the example, the user may place the smartphone on a table or desk by the user while the user performs other tasks. An awareness manager can maintain the electronic device in a dormant mode that reduces power consumption (e.g., by turning the display or other sensors off or by operating the radar system at a lower sample rate), but allows the radar system to detect the presence of a user within a recognition zone around the electronic device. The recognition zone is an area around the electronic device. The size and shape of the recognition zone may be preset or user-selectable and can be dynamically adjusted. In some cases, the electronic device may determine the size and/or shape of the recognition zone based on a number of relevant factors, such as a type of electronic device, a battery level, a location of the electronic device, a velocity of the electronic device, or data received from one or more of the radar system, other sensors, or applications running on the electronic device. When the radar system detects that the user is within the recognition zone, the awareness manager can automatically transition the smartphone from the dormant mode to an aware mode.

In the aware mode, the display presents visual elements that can help the user understand the awareness level and functionality of the smartphone and improve the user's experience with the smartphone. For example, when the user comes within the recognition zone and the smartphone transitions to the aware mode, the display can present elements such as a time, a date, a connectivity status indicator, a battery-level indicator, or other elements that may be predetermined or user-selectable. In some cases, if the smartphone is running an application that can receive input through radar-based, remote, three-dimensional gestures, the display can present a visual element that indicates the availability of the application to receive that type of gesture input.

The awareness manager can also detect a user action that indicates the user intends to interact with the smartphone. For example, user actions such as turning toward, leaning over, or reaching out to the smartphone can be categorized as an indication of a user intent to interact with the smartphone. In this case, when the radar system detects the user reaching toward the smartphone (e.g., using radar data), the awareness manager can determine that the reach is an indication of the user's intent to interact with the smartphone and automatically transition from the aware mode to an engaged mode. Conversely, if the awareness manager determines that the user is in the recognition zone, but does not detect a user action that is categorized as an indication of the user's intent to interact with the smartphone, the awareness manager can maintain the smartphone in the aware mode until the awareness manager detects the action categorized as the indication of the user's intent to interact. In other cases, the awareness manager can maintain the smartphone in the aware mode for an adjustable time duration without the action categorized as the indication of the user's intent to interact and then transition back to the dormant mode, even if the user remains in the recognition zone.

In the engaged mode, the awareness manager can present additional or different visual elements on the display in comparison to the aware mode, which can help the user understand the changed awareness level and functionality of the smartphone and further improve the user's experience with the smartphone. For example, when the smartphone transitions to the engaged mode, the display can present visual elements such as a background image (e.g., a wallpaper) or a welcome message. The display can also present a visual element that indicates that access to the smartphone is locked and authentication is required for access (e.g., a locked padlock icon). These visual elements help the user to understand that the smartphone is aware that the user is taking action that suggests the user intends to interact with the smartphone.

Additionally, when the smartphone detects the action that is categorized as the indication of the user's intent to interact, the awareness manager can automatically prepare the authentication system to perform an authentication process, such as facial recognition, voice recognition, or another authentication process (e.g., a password, a fingerprint, or another biometric input). This preparation enables the authentication system to be ready to authenticate sooner. For example, in this case, in which the awareness manager automatically prepares the authentication system when the user reaches toward the smartphone, the authentication process can be performed when the awareness manager detects a trigger event. The trigger event is another interaction that is separate from the action that caused the smartphone to transition to the engaged state and that indicates the user is ready to be authenticated, such as picking up or leaning over the smartphone.

When the user in successfully authenticated, the awareness manager can automatically transition the smartphone from the engaged mode to an active mode. In the active mode, the smartphone is fully ready to interact with the user (e.g., running applications, receiving input, and providing output). Further, when the smartphone is in the active mode, the awareness manager can also present additional or different visual elements on the display that can help the user understand the changed awareness level and functionality of the smartphone. For example, when the smartphone transitions to the active mode, the display can transition the locked padlock icon to an unlocked padlock icon (to indicate a successful authentication). After a short time period the unlocked icon can fade and the display can present other visual elements such as a home screen, background image (e.g., a wallpaper), a home screen, a task list, or an instruction (e.g., "swipe to open").

The described techniques and systems employ a radar system to provide a useful and rewarding user experience that changes based on the user's interaction level with the electronic device, as determined by the user's natural movements and actions relative to the device. Rather than reacting only to explicit user input, the electronic device can provide feedback to the user to indicate that the device is aware of the user's movements and to alert the user to the features and functionality that are available. Further, the device can automatically prepare an authentication system so that the user can enjoy a quick, seamless, and (if so desired) automatic authentication process.

The described techniques and systems can enable lower power consumption by the electronic device (or at least the display device of the electronic device) relative to some conventional techniques, which may use an always-on camera (or other sensors or combinations of sensors) to control some display features. For example, power consumption may be reduced because the display uses less power when the user is not near the electronic device and gradually increases power consumption based on the user's implicit interaction with the electronic device. These are but a few examples of how the described techniques and devices may be used to enable radar-based authentication status feedback. Other examples and implementations of which are described throughout this document. The document now turns to an example operating environment, after which example devices, methods, and systems are described.

Operating Environment

FIG. 1 illustrates an example environment 100 in which techniques enabling radar-based authentication status feedback can be implemented. The example environment 100 includes an electronic device 102, which includes, or is associated with, a radar system 104, a persistent radar-based awareness manager 106 (awareness manager 106), and, optionally, one or more non-radar sensors 108 (non-radar sensor 108). The non-radar sensor 108 can be any of a variety of devices, such as an audio sensor (e.g., a microphone), a touch-input sensor (e.g., a touchscreen), an infrared (IR) sensor, or an image-capture device (e.g., a camera or video-camera).

In the example environment 100, the radar system 104 provides a radar field 110 by transmitting one or more radar signals or waveforms as described below with reference to FIGS. 3-6. The radar field 110 is a volume of space from which the radar system 104 can detect reflections of the radar signals and waveforms (e.g., radar signals and waveforms reflected from objects in the volume of space). The radar system 104 also enables the electronic device 102, or another electronic device, to sense and analyze reflections from an object in the radar field 110. Some implementations of the radar system 104 are particularly advantageous as applied in the context of smartphones, such as the electronic device 102. For example, with smartphones there is a convergence of issues such as a need for low power, a need for processing efficiency, limitations in a spacing and layout of antenna elements, and other issues. The radar system 104 can be particularly advantageous in the specific context of smartphones for which radar detection of fine hand gestures is desired. It should be noted, however, that although the implementations are particularly advantageous in the described context of the smartphone for which fine radar-detected hand gestures are required, the applicability of the features and advantages of the present invention is not necessarily so limited, and other implementations involving other types of electronic devices (e.g., as described with reference to FIG. 2) are also within the scope of the present teachings.

The object may be any of a variety of objects from which the radar system 104 can sense and analyze radar reflections, such as wood, plastic, metal, fabric, a human body, or human body parts (e.g., a foot, hand, or finger of a user of the electronic device 102). As shown in FIG. 1, the object is a user 112 of the electronic device 102. Based on the analysis of the reflections, the radar system 104 can provide radar data that includes various types of information associated with the radar field 110 and the reflections from the user 112, as described with reference to FIGS. 3-6 (e.g., the radar system 104 can pass the radar data to other entities, such as the awareness manager 106).

It should be noted that the radar data may be continuously or periodically provided over time, based on the sensed and analyzed reflections from the user 112 in the radar field 110. A position of the user 112 can change over time (e.g., the user 112 may move within the radar field 110) and the radar data can thus vary over time corresponding to the changed positions, reflections, and analyses. Because the radar data may vary over time, the radar system 104 may provide radar data that includes one or more subsets of radar data that correspond to different periods of time. For example, the radar system 104 may provide a first subset of the radar data corresponding to a first time-period, a second subset of the radar data corresponding to a second time-period, and so forth. Note that in some cases, one or more subsets of radar data may overlap or be substantially the same as one or more other subsets.

The electronic device 102 can also include a display device, such as display 114. The display 114 can include any suitable display device, such as a touchscreen, a liquid crystal display (LCD), thin film transistor (TFT) LCD, an in-place switching (IPS) LCD, a capacitive touchscreen display, an organic light emitting diode (OLED) display, an active-matrix organic light-emitting diode (AMOLED) display, super AMOLED display, and so forth. The display 114 is used to display visual elements that are associated with various modes of the electronic device 102, which are described in further detail herein with reference to FIGS. 10-17.

The awareness manager 106 can be used to interact with or control various components of the electronic device 102 (e.g., modules, managers, systems, interfaces, or one or more of the non-radar sensors 108). For instance, when the radar system 104 does not detect a user nearby, the awareness manager 106 can maintain the electronic device 102 in a dormant mode. The dormant mode is a persistent lower-power mode. In the dormant mode, the display 114 may present fewer visual elements than in other modes, or present no visual elements. In some implementations of the dormant mode, the display may be powered off. In other implementations, the display is powered on but is black (e.g., presents no elements and is not illuminated). In cases in which the display includes or provides a touch interface that can receive contact input (e.g., a capacitive touch interface that can receive input via touch, tap, or swipe), the touch interface may be either on or off. The term "persistent," with reference to the awareness manager 106, and to the dormant mode of the electronic device, means that no user interaction is required to maintain the radar system 104 in the dormant mode or to activate the awareness manager 106. In some implementations, the "persistent" state may be paused or turned off (e.g., by the user 112). In other implementations, the "persistent" state may be scheduled or otherwise managed in accordance with one or more parameters of the smartphone 102 (or other electronic device). For example, the user 112 may schedule the "persistent" state such that it is only operational during daylight hours, even though the smartphone 102 is on both at night and during the day.

In the dormant mode, the awareness manager 106 can also determine a presence of the user 112 without verbal, touch, or other input by the user. For example, while in the dormant mode, the awareness manager 106 may use one or more subsets of the radar data provided by the radar system 104 (as described herein), to determine the presence of the user 112 and/or of other objects that may be within a recognition zone 116 of the electronic device 102. The recognition zone 116 is a zone around the radar system 104 within which the awareness manager 106 can accurately determine the presence of the user 112. The recognition zone 116 may take any of a variety of shapes and forms. For example, the recognition zone 116 may be approximately coterminous with the radar field 110 (e.g., the shape of the radar field 110 as described, for example, with reference to FIGS. 3 and 4). In other cases, the recognition zone 116 may take a shape such as a radius extending from the radar system 104, a volume around the radar system 104 (e.g., a sphere, a hemisphere, a partial sphere, a beam, or a cone), or a non-uniform shape (e.g., to accommodate interference from obstructions in the awareness zone or humans that are not authorized to use the electronic device 102). In some cases, the awareness manager 106 (in the dormant mode or another mode) can determine the presence of multiple objects in the radar field 110, such as the user 112 and one or more other users (e.g., other humans).

The recognition zone may extend any of a variety of distances from the radar system 104 such as approximately three, seven, ten, or fourteen feet (or approximately one, two, three, or four meters). In other cases, as shown in FIG. 1, the recognition zone 116 may be less than a maximum extent of the radar field 110. The recognition zone 116 may be a static size or shape that is predefined, user-selectable, or determined via another method (e.g., based on power requirements, remaining battery life, or another factor). In some cases, the recognition zone 116 may be dynamically and automatically adjustable by the awareness manager 106, based on factors such as the velocity or location of the electronic device 102, a time of day, a state of an application running on the electronic device 102, or another factor.

When the awareness manager 106 determines the presence of the user 112 within the recognition zone 116, the awareness manager 106 can cause the electronic device 102 to exit the dormant mode and enter an aware mode. The aware mode is a lower-power mode, in which the display 114 presents one or more visual elements that can indicate a status or functionality level of the electronic device 102. In the aware mode, the electronic device 102 can provide features and functions that are different from those provided in the dormant mode. In some implementations of the aware mode, the presented visual elements include elements that describe environmental information or simple status information about the electronic device 102. For example, in the aware mode, the display 114 may present a time-of-day (a clock), a date, a connectivity status (e.g., Wi-Fi, cellular, or other network connectivity), or a battery-level indicator. The remainder of the screen may remain black or display a background image, such as a wallpaper or other image. In other implementations, the visual elements that indicate the electronic device 102 is in the aware mode may be images, such as a wallpaper, a background image, or a series of images or wallpapers. Additionally or alternatively, the radar system 104 may operate at a frame rate, duty cycle, or power level that is different from the dormant mode (e.g., the radar system 104 and/or the display 114 may use less power in the dormant mode than in the aware mode). If the user 112 exits the recognition zone 116, the awareness manager 106 may cause the electronic device 102 to return to the dormant mode (immediately, or after the user 112 has been outside the recognition zone 116 for a selectable predetermined amount of time). For example, the awareness manager 106 may determine that the user 112 turned away from the electronic device 102 and/or is walking away from the electronic device 102 and immediately return to the dormant mode.

In some implementations (e.g., as described with reference to FIGS. 13-17), applications running on the electronic device 102 may be able to receive input through radar-based, remote, three-dimensional (3D) gestures (remote 3D gestures). The term remote 3D gesture refers to the nature of gesture in space, away from the electronic device (e.g., the gesture does not require the user to touch the device, though it must be within a threshold distance of the device to be detected by the radar system 104). The gesture itself may be two-dimensional (2D), such as an upper-left-to-lower-right swipe in a plane, but because the gesture also has distance from the electronic device (e.g., a "third" dimension), the gestures are referred to herein as remote 3D gestures, whether the gesture itself includes elements in three dimensions. In this case, the display in the aware mode can present visual elements that indicate the availability of the application to receive that type of gesture input. For example, the display 114 may present an icon, a lighted area, or another element that is presented only when a radar-gesture-subscribed application (gesture-subscribed application) is running.

In the aware mode, the awareness manager 106 can also detect a user action that is categorized as an indication of a user's intent to interact (or not interact) with the electronic device 102. For example, the electronic device may have access to a library (e.g., in a memory device included, or associated, with the electronic device 102) of actions that are categorized as indicators of a user's intent to interact or not interact with the device (e.g., reaching for the electronic device, turning or walking toward or away from the electronic device, leaning toward or looking at the electronic device). Actions that are categorized as indications of the user's intent to interact with the electronic device 102 may be referred to herein as user actions that indicate user intent, indications of the user's intent, or indications of the user's intent to interact and may include reaching, moving, or turning toward the electronic device 102, looking at or leaning over the electronic device 102, and so forth. Thus, for example, while in the aware mode, the awareness manager 106 may use one or more other subsets of the radar data provided by the radar system 104 (as described herein), to detect that the user 112 is reaching toward the electronic device 102 and determine that the reaching is an indication of the user's intent to interact with the electronic device 102.

Different actions that are categorized as indications of the user's intent to interact may have different thresholds to be considered. For example, a reach toward the electronic device 102 may only be determined to indicate the user's intent if a portion of the user's body moves to within a threshold distance of the electronic device (e.g. five inches, eight inches, or twelve inches). In some implementations, the electronic device may also include machine-learning technology that enables the electronic device 102 to learn different or additional indications of the user's intent and add, remove, or modify the actions stored in the library (e.g., based on the user's history and behavior with the device).

Further, if the awareness manager 106 determines that the user is in the recognition zone, but does not detect a user action that is categorized as an indication of an intent to interact with the smartphone, the awareness manager 106 can maintain the electronic device 102 in the aware mode until the awareness manager 106 detects such a user action. In other cases, the awareness manager 106 may maintain the electronic device 102 in the aware mode for a selectable and adjustable time duration without such a user action (e.g., 60, 30, or 10 seconds) and then transition back to the dormant mode, even if the user remains in the recognition zone.

In some implementations, when the awareness manager 106 detects the indication of the user's intent to interact with the electronic device 102, the awareness manager 106 can cause the electronic device 102 to exit the aware mode and enter an engaged mode. The engaged mode is a higher-power mode of the electronic device 102 and the radar system 104. In implementations in which the electronic device 102 enters the engaged mode, the awareness manager 106 can cause the display 114 to present additional or different visual elements that indicate a new or changed status of the electronic device 102, including changed or new features, functionality, or services that are available. For example, the display 114 can present a background image (e.g., a wallpaper) or a welcome message. The display 114 also presents a visual element that indicates that access to the electronic device 102 is locked and that authentication is required for access (e.g., a locked padlock icon). These visual elements help the user to understand that the smartphone is aware that the user is taking action that suggests the user intends to interact with the smartphone. In some cases, the visual elements that indicate the electronic device 102 is in the engaged mode may be a wallpaper, a background image, or a series of images, in which the changing and/or additional images indicate the change in mode.

In some implementations of the aware mode or the engaged mode, the awareness manager 106 can cause the electronic device 102 to automatically prepare an authentication system 118 to perform an authentication process. The authentication system 118 can use any suitable authentication techniques, such as facial recognition, voice recognition, fingerprint recognition, and so forth. For example, the authentication system 118 may include or be associated with a camera (e.g., one of the non-radar sensors 108) and a facial recognition module 120, which can be used to authenticate the user based on a captured image (or multiple captured images) of the user's face. This preparation enables the authentication system 118 to be ready to authenticate with lower latency (e.g., more quickly). For example, when the awareness manager 106 detects the action that indicates the intent to interact, the awareness manager 106 can prepare the authentication system 118 by causing the camera to enter a state in which it can capture an image (e.g., a camera "warm up" process that prepares the camera hardware and any associated software or other programs that are used to capture images). Additionally, the awareness manager 106 can also cause the facial recognition module 120 to enter a state in which it can use the captured image(s) to authenticate the user.

When the authentication system 118 is prepared, the awareness manager 106 can cause the authentication system 118 to perform the authentication process on the user 112, based on a trigger event. The trigger event, which indicates that the user is ready to be authenticated, is another interaction that is separate from, or an addition to, the action that caused the electronic device 102 to transition to the optional engaged mode. For example, the trigger event may be a change in a location or orientation of the user 112 (e.g., the user 112 moves toward or leans over the electronic device 102 so that the user's face is directly in front of the display 114). The trigger event may instead or also be a change in an orientation of the electronic device 102 (the user 112 picks up or rotates the electronic device 102) or an explicit user action such as a touch input.

The trigger event may be detected using radar data or non-radar data (e.g., from the non-radar sensors 108 or another source). As noted, the radar-based awareness manager 106 can determine movements made by the user or the user's hand based on radar data provided by the radar system 104 (e.g., 3D gestures). The awareness manager 106 then processes the movements in a way that enables the user to interact with the electronic device 102 via the movements. For example, as described with reference to FIGS. 3-6, the radar system can use the radar field to sense and analyze reflections from objects in the radar field in ways that enable high resolution and accuracy for movement recognition of the user.

In some cases, there may be no trigger event, which indicates that the user 112 does not intend to interact with the electronic device 102. For example, the user 112 may reach toward the electronic device 102 and then decide to do something else, or reach for the electronic device 102 only to check the time and then withdraw. In these cases, the user is not authenticated and, if the electronic device 102 is in the engaged mode, the awareness manager 106 may maintain the electronic device 102 in the engaged mode for a selectable time duration (e.g., 60, 30, or 10 seconds) and then transition back to the aware mode.

When the user 112 is successfully authenticated, the awareness manager 106 causes the electronic device 102 to exit the aware or engaged mode and enter an active mode. The active mode is a higher-power mode in which the user 112 has full rights and access to the electronic device 102. When the electronic device 102 transitions from the aware or engaged mode to the active mode, the awareness manager 106 can cause the display 114 to present additional or different visual elements that indicate a new or changed status of the electronic device 102, including changed or new features, functionality, or services that are available. For example, the display 114 can present a background image (e.g., a wallpaper) or a home screen. The display 114 also presents a visual element that indicates that access to the electronic device 102 is unlocked (e.g., an unlocked padlock icon). Some or all of the additional background images or visual elements may be presented for a duration of time and then fade out or cease to be presented. These additional images and visual elements provide feedback to the user 112 to indicate that the electronic device 102 is unlocked and fully accessible, even though the user has merely walked up to the electronic device 102, reached toward it, and picked it up. As described, the awareness manager 106 may determine the presence of the user 112 and other humans. In this case, the awareness manager, alone or in conjunction with other applications or components of the electronic device 102, may use the presence of the other humans as a factor in determining what additional or different visual elements are presented on the display 114 in the active mode. For example, when other humans are present, the active mode display may be the lock screen with the unlocked icon or another image, such as a wallpaper. Conversely, when no other humans are present, the active mode display may be a home screen, a recent screen (e.g., opening the last application that was used prior to the electronic device 102 being locked and presenting a screen from that application), or another screen or user interface. In this way, the awareness manager 106 can provide the automatic authentication process while helping to maintain the privacy of the user 112.

Consider an example illustrated in FIG. 1. In a detail view 100-1, the user 112 is outside of the radar field 110 and the recognition zone 116. Accordingly, the electronic device 102 (in this case, a smartphone) is in the dormant mode, which in this case corresponds to the display 114 not presenting any visual elements, as shown in an example display 114-1. In this example, assume that the user 112 walked up to the electronic device 102 and reached toward it, causing the electronic device 102 to transition from the dormant mode to the aware mode and then (optionally) to the engaged mode. As described above, this sequence causes the electronic device 102 to prepare the authentication system 118. Then, as shown in detail view 100-2, the user 112 leans over and lifts the electronic device 102 off of the table. In response to this trigger event, the electronic device 102 authenticates the user 112 and transitions from the aware or engaged mode to the active mode. In the active mode, the display 114 presents a visual element 122 that indicates that the electronic device 102 is unlocked (in this case, an unlocked padlock icon), as shown in an example display 114-2.

Figure 2:
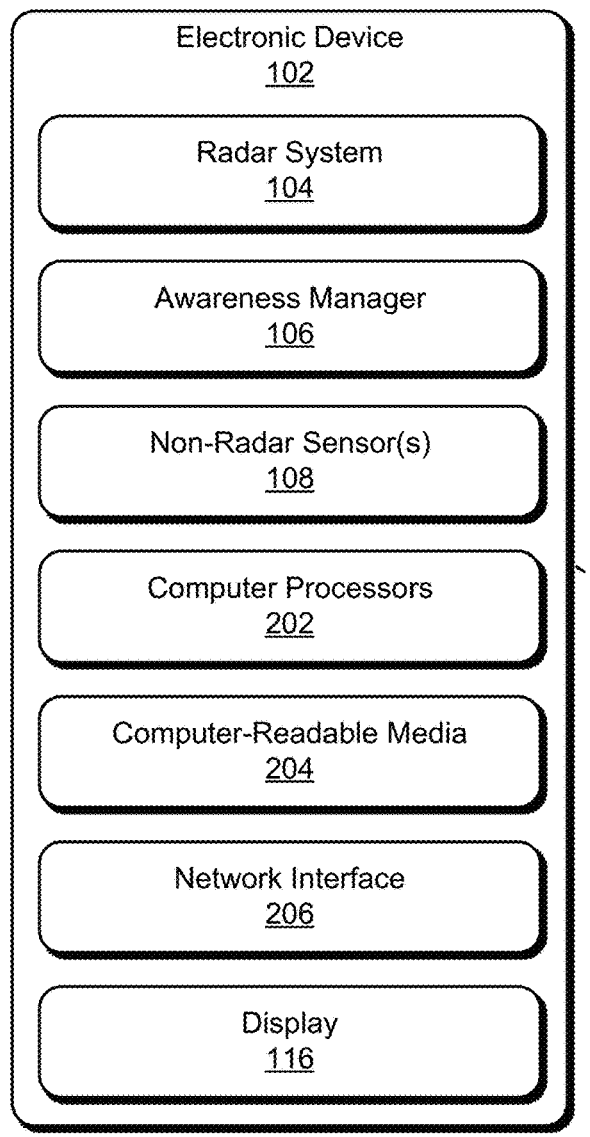
FIG. 2 illustrates an example implementation of an electronic device, including a radar system, that can implement radar-based authentication status feedback.
Figure 2:
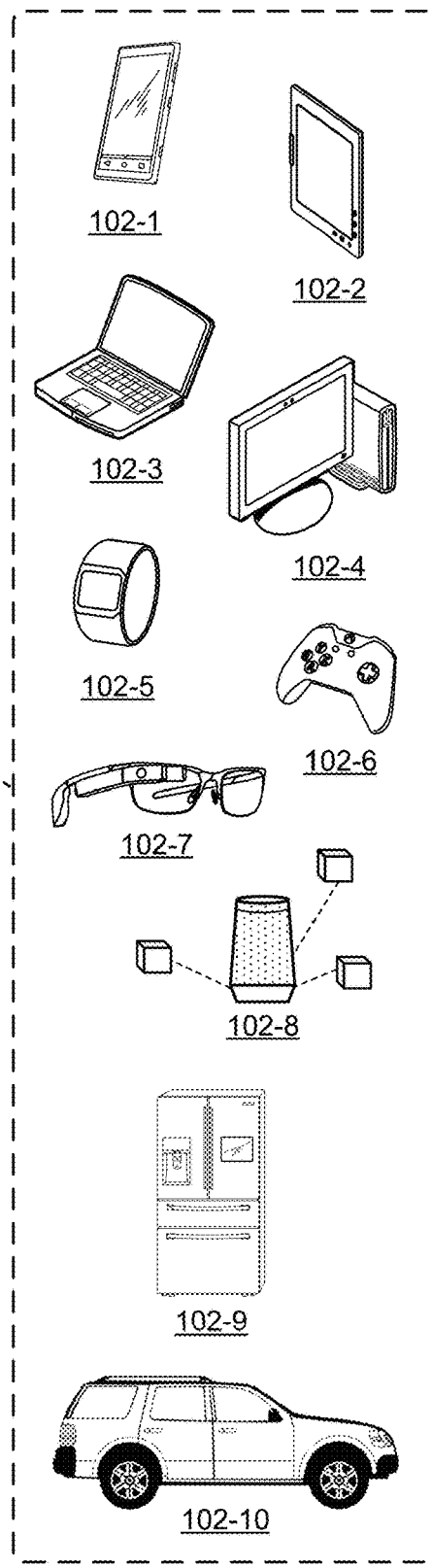

In more detail, consider FIG. 2, which illustrates an example implementation 200 of the electronic device 102 (including the radar system 104, the awareness manager 106, and the non-radar sensor 108) that can implement radar-based authentication status feedback. The electronic device 102 of FIG. 2 is illustrated with a variety of example devices, including a smartphone 102-1, a tablet 102-2, a laptop 102-3, a desktop computer 102-4, a computing watch 102-5, a gaming system 102-6, computing spectacles 102-7, a home-automation and control system 102-8, a smart refrigerator 102-9, and an automobile 102-10. The electronic device 102 can also include other devices, such as televisions, entertainment systems, audio systems, drones, track pads, drawing pads, netbooks, e-readers, home security systems, and other home appliances. Note that the electronic device 102 can be wearable, non-wearable but mobile, or relatively immobile (e.g., desktops and appliances).

In some implementations, exemplary overall lateral dimensions of the electronic device 102 can be approximately eight centimeters by approximately fifteen centimeters. Exemplary footprints of the radar system 104 can be even more limited, such as approximately four millimeters by six millimeters with antennas included. This requirement for such a limited footprint for the radar system 104, is to accommodate the many other desirable features of the electronic device 102 in such a space-limited package (e.g., a fingerprint sensor, the non-radar sensor 108, and so forth). Combined with power and processing limitations, this size requirement can lead to compromises in the accuracy and efficacy of radar gesture detection, at least some of which can be overcome in view of the teachings herein.

The electronic device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. The electronic device 102 may also include a network interface 206. The electronic device 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the radar system 104 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. The radar system 104 can operate as a monostatic radar by transmitting and receiving its own radar signals.

In some implementations, the radar system 104 may also cooperate with other radar systems 104 that are within an external environment to implement a bistatic radar, a multistatic radar, or a network radar. Constraints or limitations of the electronic device 102, however, may impact a design of the radar system 104. The electronic device 102, for example, may have limited power available to operate the radar, limited computational capability, size constraints, layout restrictions, an exterior housing that attenuates or distorts radar signals, and so forth. The radar system 104 includes several features that enable advanced radar functionality and high performance to be realized in the presence of these constraints, as further described below with respect to FIG. 3. Note that in FIG. 2, the radar system 104 and the awareness manager 106 are illustrated as part of the electronic device 102. In other implementations, either or both of the radar system 104 and the awareness manager 106 may be separate or remote from the electronic device 102.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 18 illustrate some of many possible environments and devices capable of employing the described techniques. FIGS. 3-6 describe additional details and features of the radar system 104. In FIGS. 3-6, the radar system 104 is described in the context of the electronic device 102, but as noted above, the applicability of the features and advantages of the described systems and techniques are not necessarily so limited, and other implementations involving other types of electronic devices may also be within the scope of the present teachings.

Figure 3:
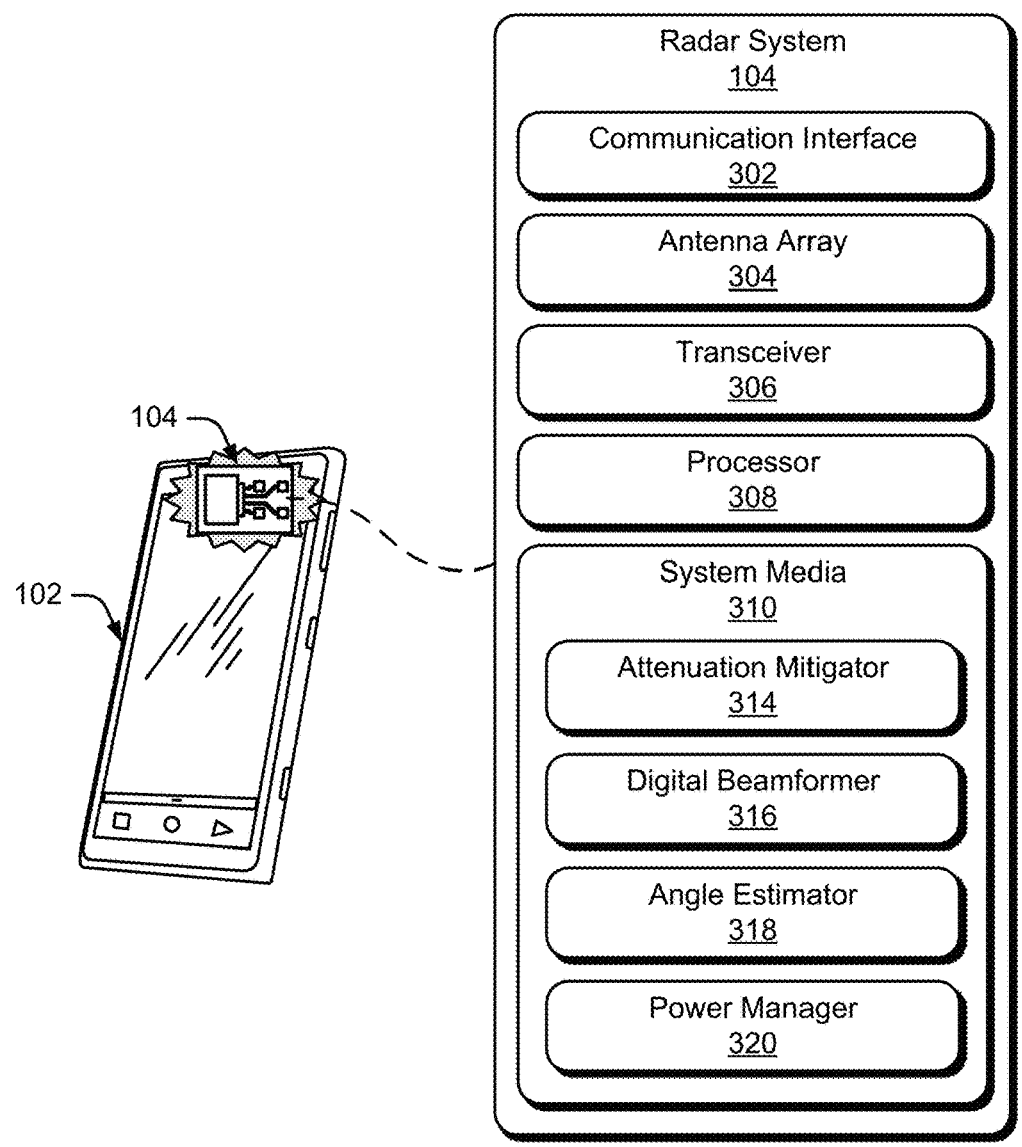
FIG. 3 illustrates an example implementation of the radar system of FIGS. 1 and 2.

FIG. 3 illustrates an example implementation 300 of the radar system 104 that can be used to enable radar-based authentication status feedback. In the example 300, the radar system 104 includes at least one of each of the following components: a communication interface 302, an antenna array 304, a transceiver 306, a processor 308, and a system media 310 (e.g., one or more computer-readable storage media). The processor 308 can be implemented as a digital signal processor, a controller, an application processor, another processor (e.g., the computer processor 202 of the electronic device 102) or some combination thereof. The system media 310, which may be included within, or be separate from, the computer-readable media 204 of the electronic device 102, includes one or more of the following modules: an attenuation mitigator 314, a digital beamformer 316, an angle estimator 318, or a power manager 320. These modules can compensate for, or mitigate the effects of, integrating the radar system 104 within the electronic device 102, thereby enabling the radar system 104 to recognize small or complex gestures, distinguish between different orientations of the user, continuously monitor an external environment, or realize a target false-alarm rate. With these features, the radar system 104 can be implemented within a variety of different devices, such as the devices illustrated in FIG. 2.

Using the communication interface 302, the radar system 104 can provide radar data to the awareness manager 106. The communication interface 302 may be a wireless or wired interface based on the radar system 104 being implemented separate from, or integrated within, the electronic device 102. Depending on the application, the radar data may include raw or minimally processed data, in-phase and quadrature (I/Q) data, range-Doppler data, processed data including target location information (e.g., range, azimuth, elevation), clutter map data, and so forth. Generally, the radar data contains information that is usable by the awareness manager 106 for radar-based authentication status feedback.

Figure 4:
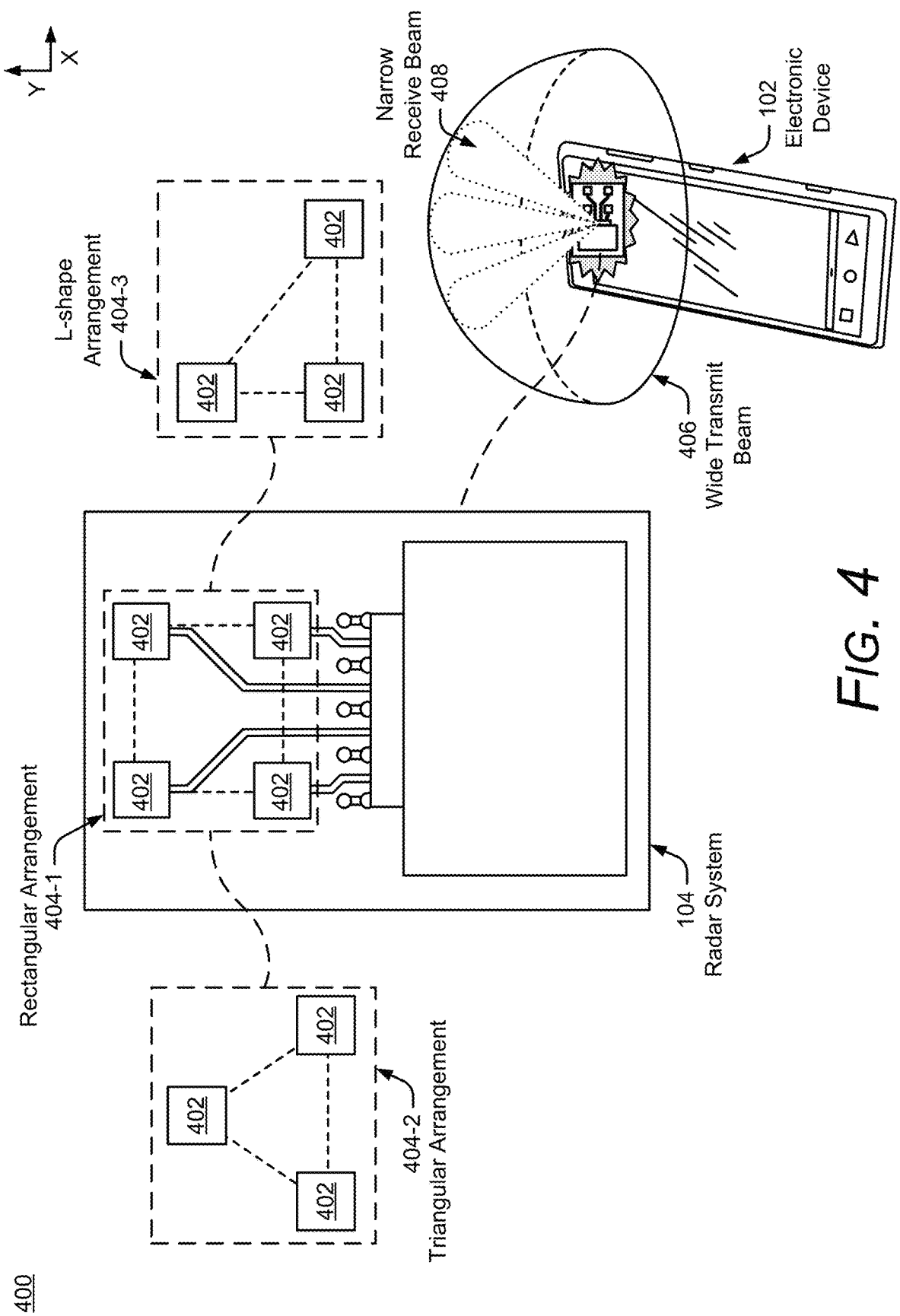
FIG. 4 illustrates example arrangements of receiving antenna elements for the radar system of FIG. 3.

The antenna array 304 includes at least one transmitting antenna element (not shown) and at least two receiving antenna elements (as shown in FIG. 4). In some cases, the antenna array 304 may include multiple transmitting antenna elements to implement a multiple-input multiple-output (MIMO) radar capable of transmitting multiple distinct waveforms at a time (e.g., a different waveform per transmitting antenna element). The use of multiple waveforms can increase a measurement accuracy of the radar system 104. The receiving antenna elements can be positioned in a one-dimensional shape (e.g., a line) or a two-dimensional shape for implementations that include three or more receiving antenna elements. The one-dimensional shape enables the radar system 104 to measure one angular dimension (e.g., an azimuth or an elevation) while the two-dimensional shape enables two angular dimensions to be measured (e.g., both azimuth and elevation). Example two-dimensional arrangements of the receiving antenna elements are further described with respect to FIG. 4.

FIG. 4 illustrates example arrangements 400 of receiving antenna elements 402. If the antenna array 304 includes at least four receiving antenna elements 402, for example, the receiving antenna elements 402 can be arranged in a rectangular arrangement 404-1 as depicted in the middle of FIG. 4. Alternatively, a triangular arrangement 404-2 or an L-shape arrangement 404-3 may be used if the antenna array 304 includes at least three receiving antenna elements 402.

Due to a size or layout constraint of the electronic device 102, an element spacing between the receiving antenna elements 402 or a quantity of the receiving antenna elements 402 may not be ideal for the angles at which the radar system 104 is to monitor. In particular, the element spacing may cause angular ambiguities to be present that make it challenging for conventional radars to estimate an angular position of a target. Conventional radars may therefore limit a field of view (e.g., angles that are to be monitored) to avoid an ambiguous zone, which has the angular ambiguities, and thereby reduce false detections. For example, conventional radars may limit the field of view to angles between approximately −45 degrees to 45 degrees to avoid angular ambiguities that occur using a wavelength of 5 millimeters (mm) and an element spacing of 3.5 mm (e.g., the element spacing being 70% of the wavelength). Consequently, the conventional radar may be unable to detect targets that are beyond the 45-degree limits of the field of view. In contrast, the radar system 104 includes the digital beamformer 316 and the angle estimator 318, which resolve the angular ambiguities and enable the radar system 104 to monitor angles beyond the 45-degree limit, such as angles between approximately −90 degrees to 90 degrees, or up to approximately −180 degrees and 180 degrees. These angular ranges can be applied across one or more directions (e.g., azimuth and/or elevation). Accordingly, the radar system 104 can realize low false-alarm rates for a variety of different antenna array designs, including element spacings that are less than, greater than, or equal to half a center wavelength of the radar signal.

Using the antenna array 304, the radar system 104 can form beams that are steered or un-steered, wide or narrow, or shaped (e.g., as a hemisphere, cube, fan, cone, or cylinder). As an example, the one or more transmitting antenna elements (not shown) may have an un-steered omnidirectional radiation pattern or may be able to produce a wide beam, such as the wide transmit beam 406. Either of these techniques enable the radar system 104 to illuminate a large volume of space. To achieve target angular accuracies and angular resolutions, however, the receiving antenna elements 402 and the digital beamformer 316 can be used to generate thousands of narrow and steered beams (e.g., 2000 beams, 4000 beams, or 6000 beams), such as the narrow receive beam 408. In this way, the radar system 104 can efficiently monitor the external environment and accurately determine arrival angles of reflections within the external environment.

Returning to FIG. 3, the transceiver 306 includes circuitry and logic for transmitting and receiving radar signals via the antenna array 304. Components of the transceiver 306 can include amplifiers, mixers, switches, analog-to-digital converters, filters, and so forth for conditioning the radar signals. The transceiver 306 can also include logic to perform in-phase/quadrature (I/Q) operations, such as modulation or demodulation. The transceiver 306 can be configured for continuous wave radar operations or pulsed radar operations. A variety of modulations can be used to produce the radar signals, including linear frequency modulations, triangular frequency modulations, stepped frequency modulations, or phase modulations.

The transceiver 306 can generate radar signals within a range of frequencies (e.g., a frequency spectrum), such as between 1 gigahertz (GHz) and 400 GHz, between 4 GHz and 100 GHz, or between 57 GHz and 63 GHz. The frequency spectrum can be divided into multiple sub-spectra that have a similar bandwidth or different bandwidths. The bandwidths can be on the order of 500 megahertz (MHz), 1 GHz, 2 GHz, and so forth. As an example, different frequency sub-spectra may include frequencies between approximately 57 GHz and 59 GHz, 59 GHz and 61 GHz, or 61 GHz and 63 GHz. Multiple frequency sub-spectra that have a same bandwidth and may be contiguous or non-contiguous may also be chosen for coherence. The multiple frequency sub-spectra can be transmitted simultaneously or separated in time using a single radar signal or multiple radar signals. The contiguous frequency sub-spectra enable the radar signal to have a wider bandwidth while the non-contiguous frequency sub-spectra can further emphasize amplitude and phase differences that enable the angle estimator 318 to resolve angular ambiguities. The attenuation mitigator 314 or the angle estimator 318 may cause the transceiver 306 to utilize one or more frequency sub-spectra to improve performance of the radar system 104, as further described with respect to FIGS. 5 and 6.

A power manager 320 enables the radar system 104 to conserve power internally or externally within the electronic device 102. In some implementations, the power manager 320 communicates with the awareness manager 106 to conserve power within either or both of the radar system 104 or the electronic device 102. Internally, for example, the power manager 320 can cause the radar system 104 to collect data using a predefined power mode or a specific duty cycle. In this case, the power manager 320 dynamically switches between different power modes such that response delay and power consumption are managed together based on the activity within the environment. In general, the power manager 320 determines when and how power can be conserved, and incrementally adjusts power consumption to enable the radar system 104 to operate within power limitations of the electronic device 102. In some cases, the power manager 320 may monitor an amount of available power remaining and adjust operations of the radar system 104 accordingly. For example, if the remaining amount of power is low, the power manager 320 may continue operating in a lower-power mode instead of switching to a higher-power mode.

The lower-power mode, for example, may use a lower duty cycle on the order of a few hertz (e.g., approximately 1 Hz or less than 5 Hz), which reduces power consumption to a few milliwatts (mW) (e.g., between approximately 2 mW and 8 mW). The higher-power mode, on the other hand, may use a higher duty cycle on the order of tens of hertz (Hz) (e.g., approximately 20 Hz or greater than 10 Hz), which causes the radar system 104 to consume power on the order of several milliwatts (e.g., between approximately 6 mW and 20 mW). While the lower-power mode can be used to monitor the external environment or detect an approaching user, the power manager 320 may switch to the higher-power mode if the radar system 104 determines the user is starting to perform a gesture. Different triggers may cause the power manager 320 to switch between the different power modes. Example triggers include motion or the lack of motion, appearance or disappearance of the user, the user moving into or out of a designated region (e.g., a region defined by range, azimuth, or elevation), a change in velocity of a motion associated with the user, or a change in reflected signal strength (e.g., due to changes in radar cross section). In general, the triggers that indicate a lower probability of the user interacting with the electronic device 102 or a preference to collect data using a longer response delay may cause a lower-power mode to be activated to conserve power.

The power manager 320 can also conserve power by turning off one or more components within the transceiver 306 (e.g., a voltage-controlled oscillator, a multiplexer, an analog-to-digital converter, a phase lock loop, or a crystal oscillator) during inactive time periods. These inactive time periods occur if the radar system 104 is not actively transmitting or receiving radar signals, which may be on the order of microseconds (μs), milliseconds (ms), or seconds (s). Further, the power manager 320 can modify transmission power of the radar signals by adjusting an amount of amplification provided by a signal amplifier. Additionally, the power manager 320 can control the use of different hardware components within the radar system 104 to conserve power. If the processor 308 comprises a lower-power processor and a higher-power processor (e.g., processors with different amounts of memory and computational capability), for example, the power manager 320 can switch between utilizing the lower-power processor for low-level analysis (e.g., implementing the idle mode, detecting motion, determining a location of a user, or monitoring the environment) and the higher-power processor for situations in which high-fidelity or accurate radar data is requested by the awareness manager 106 (e.g., for implementing the aware mode, the engaged mode, or the active mode, gesture recognition or user orientation).

Further, the power manager 320 can determine a context of the environment around the electronic device 102. From that context, the power manager 320 can determine which power states are to be made available and how they are configured. For example, if the electronic device 102 is in a user's pocket, then although the user 112 is detected as being proximate to the electronic device 102, there is no need for the radar system 104 to operate in the higher-power mode with a high duty cycle. Accordingly, the power manager 320 can cause the radar system 104 to remain in the lower-power mode, even though the user is detected as being proximate to the electronic device 102, and cause the display 114 to remain in an off or other lower-power state. The electronic device 102 can determine the context of its environment using any suitable non-radar sensor 108 (e.g., gyroscope, accelerometer, light sensor, proximity sensor, capacitance sensor, and so on) in combination with the radar system 104. The context may include time of day, calendar day, lightness/darkness, number of users near the user 112, surrounding noise level, speed of movement of surrounding objects (including the user 112) relative to the electronic device 102, and so forth).

Figure 5:
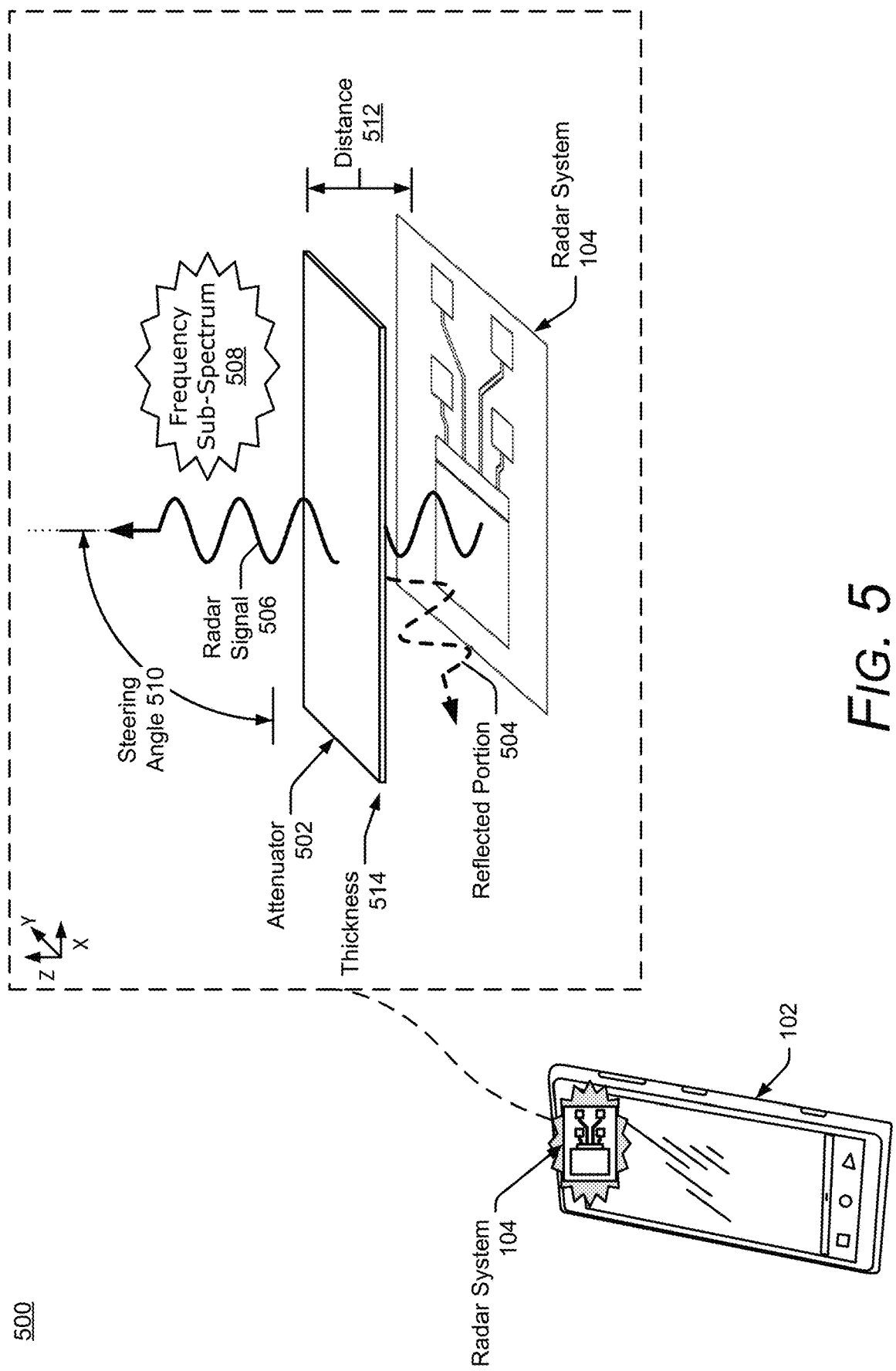
FIG. 5 illustrates additional details of an example implementation of the radar system of FIGS. 1 and 2.

FIG. 5 illustrates additional details of an example implementation 500 of the radar system 104 within the electronic device 102. In the example 500, the antenna array 304 is positioned underneath an exterior housing of the electronic device 102, such as a glass cover or an external case. Depending on its material properties, the exterior housing may act as an attenuator 502, which attenuates or distorts radar signals that are transmitted and received by the radar system 104. The attenuator 502 may include different types of glass or plastics, some of which may be found within display screens, exterior housings, or other components of the electronic device 102 and have a dielectric constant (e.g., relative permittivity) between approximately four and ten. Accordingly, the attenuator 502 is opaque or semi-transparent to a radar signal 506 and may cause a portion of a transmitted or received radar signal 506 to be reflected (as shown by a reflected portion 504). For conventional radars, the attenuator 502 may decrease an effective range that can be monitored, prevent small targets from being detected, or reduce overall accuracy.

Assuming a transmit power of the radar system 104 is limited, and re-designing the exterior housing is not desirable, one or more attenuation-dependent properties of the radar signal 506 (e.g., a frequency sub-spectrum 508 or a steering angle 510) or attenuation-dependent characteristics of the attenuator 502 (e.g., a distance 512 between the attenuator 502 and the radar system 104 or a thickness 514 of the attenuator 502) are adjusted to mitigate the effects of the attenuator 502. Some of these characteristics can be set during manufacturing or adjusted by the attenuation mitigator 314 during operation of the radar system 104. The attenuation mitigator 314, for example, can cause the transceiver 306 to transmit the radar signal 506 using the selected frequency sub-spectrum 508 or the steering angle 510, cause a platform to move the radar system 104 closer or farther from the attenuator 502 to change the distance 512, or prompt the user to apply another attenuator to increase the thickness 514 of the attenuator 502.

Appropriate adjustments can be made by the attenuation mitigator 314 based on pre-determined characteristics of the attenuator 502 (e.g., characteristics stored in the computer-readable media 204 of the electronic device 102 or within the system media 310) or by processing returns of the radar signal 506 to measure one or more characteristics of the attenuator 502. Even if some of the attenuation-dependent characteristics are fixed or constrained, the attenuation mitigator 314 can take these limitations into account to balance each parameter and achieve a target radar performance. As a result, the attenuation mitigator 314 enables the radar system 104 to realize enhanced accuracy and larger effective ranges for detecting and tracking the user that is located on an opposite side of the attenuator 502. These techniques provide alternatives to increasing transmit power, which increases power consumption of the radar system 104, or changing material properties of the attenuator 502, which can be difficult and expensive once a device is in production.

Figure 6:
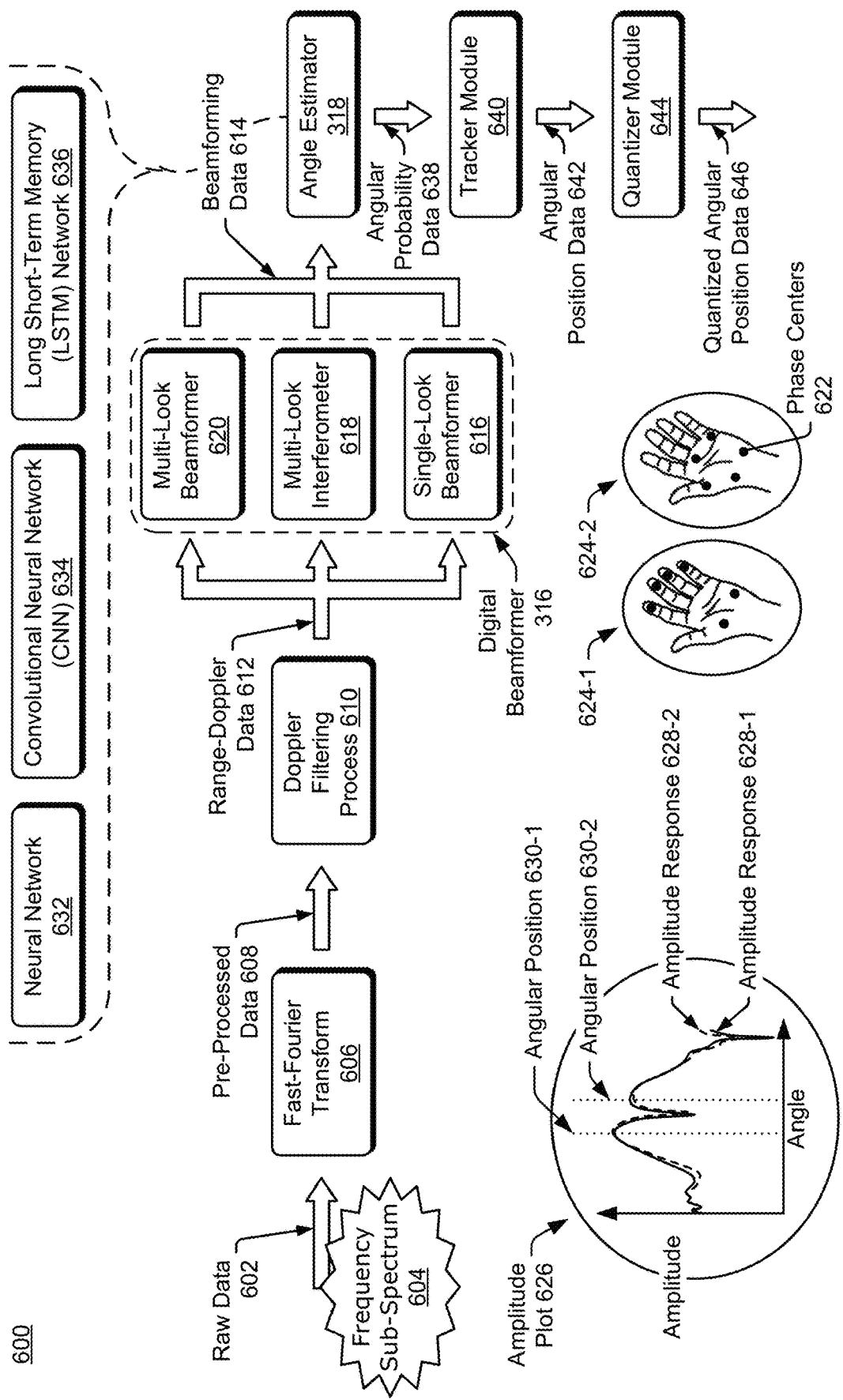
FIG. 6 illustrates an example scheme that can be implemented by the radar system of FIGS. 1 and 2.

FIG. 6 illustrates an example scheme 600 implemented by the radar system 104. Portions of the scheme 600 may be performed by the processor 308, the computer processors 202, or other hardware circuitry. The scheme 600 can be customized to support different types of electronic devices and radar-based applications (e.g., the awareness manager 106), and also enables the radar system 104 to achieve target angular accuracies despite design constraints.

The transceiver 306 produces raw data 602 based on individual responses of the receiving antenna elements 402 to a received radar signal. The received radar signal may be associated with one or more frequency sub-spectra 604 that were selected by the angle estimator 318 to facilitate angular ambiguity resolution. The frequency sub-spectra 604, for example, may be chosen to reduce a quantity of sidelobes or reduce an amplitude of the sidelobes (e.g., reduce the amplitude by 0.5 dB, 1 dB, or more). A quantity of frequency sub-spectra can be determined based on a target angular accuracy or computational limitations of the radar system 104.

The raw data 602 contains digital information (e.g., in-phase and quadrature data) for a period of time, different wavenumbers, and multiple channels respectively associated with the receiving antenna elements 402. A Fast-Fourier Transform (FFT) 606 is performed on the raw data 602 to generate pre-processed data 608. The pre-processed data 608 includes digital information across the period of time, for different ranges (e.g., range bins), and for the multiple channels. A Doppler filtering process 610 is performed on the pre-processed data 608 to generate range-Doppler data 612. The Doppler filtering process 610 may comprise another FFT that generates amplitude and phase information for multiple range bins, multiple Doppler frequencies, and for the multiple channels. The digital beamformer 316 produces beamforming data 614 based on the range-Doppler data 612. The beamforming data 614 contains digital information for a set of azimuths and/or elevations, which represents the field of view for which different steering angles or beams are formed by the digital beamformer 316. Although not depicted, the digital beamformer 316 may alternatively generate the beamforming data 614 based on the pre-processed data 608 and the Doppler filtering process 610 may generate the range-Doppler data 612 based on the beamforming data 614. To reduce a quantity of computations, the digital beamformer 316 may process a portion of the range-Doppler data 612 or the pre-processed data 608 based on a range, time, or Doppler frequency interval of interest.

The digital beamformer 316 can be implemented using a single-look beamformer 616, a multi-look interferometer 618, or a multi-look beamformer 620. In general, the single-look beamformer 616 can be used for deterministic objects (e.g., point-source targets having a single phase center). For non-deterministic targets (e.g., targets having multiple phase centers), the multi-look interferometer 618 or the multi-look beamformer 620 are used to improve accuracies relative to the single-look beamformer 616. Humans are an example of a non-deterministic target and have multiple phase centers 622 that can change based on different aspect angles, as shown at 624-1 and 624-2. Variations in the constructive or destructive interference generated by the multiple phase centers 622 can make it challenging for conventional radars to accurately determine angular positions. The multi-look interferometer 618 or the multi-look beamformer 620, however, perform coherent averaging to increase an accuracy of the beamforming data 614. The multi-look interferometer 618 coherently averages two channels to generate phase information that can be used to accurately determine the angular information. The multi-look beamformer 620, on the other hand, can coherently average two or more channels using linear or non-linear beamformers, such as Fourier, Capon, multiple signal classification (MUSIC), or minimum variance distortion less response (MVDR). The increased accuracies provided via the multi-look beamformer 620 or the multi-look interferometer 618 enable the radar system 104 to recognize small gestures or distinguish between multiple portions of the user.

The angle estimator 318 analyzes the beamforming data 614 to estimate one or more angular positions. The angle estimator 318 may utilize signal-processing techniques, pattern-matching techniques, or machine-learning. The angle estimator 318 also resolves angular ambiguities that may result from a design of the radar system 104 or the field of view the radar system 104 monitors. An example angular ambiguity is shown within an amplitude plot 626 (e.g., amplitude response).

The amplitude plot 626 depicts amplitude differences that can occur for different angular positions of the target and for different steering angles 510. A first amplitude response 628-1 (illustrated with a solid line) is shown for a target positioned at a first angular position 630-1. Likewise, a second amplitude response 628-2 (illustrated with a dotted-line) is shown for the target positioned at a second angular position 630-2. In this example, the differences are considered across angles between −180 degrees and 180 degrees.

As shown in the amplitude plot 626, an ambiguous zone exists for the two angular positions 630-1 and 630-2. The first amplitude response 628-1 has a highest peak at the first angular position 630-1 and a lesser peak at the second angular position 630-2. While the highest peak corresponds to the actual position of the target, the lesser peak causes the first angular position 630-1 to be ambiguous because it is within some threshold for which conventional radars may be unable to confidently determine whether the target is at the first angular position 630-1 or the second angular position 630-2. In contrast, the second amplitude response 628-2 has a lesser peak at the second angular position 630-2 and a higher peak at the first angular position 630-1. In this case, the lesser peak corresponds to the target's location.

While conventional radars may be limited to using a highest peak amplitude to determine the angular positions, the angle estimator 318 instead analyzes subtle differences in shapes of the amplitude responses 628-1 and 628-2. Characteristics of the shapes can include, for example, roll-offs, peak or null widths, an angular location of the peaks or nulls, a height or depth of the peaks and nulls, shapes of sidelobes, symmetry within the amplitude response 628-1 or 628-2, or the lack of symmetry within the amplitude response 628-1 or 628-2. Similar shape characteristics can be analyzed in a phase response, which can provide additional information for resolving the angular ambiguity. The angle estimator 318 therefore maps the unique angular signature or pattern to an angular position.

The angle estimator 318 can include a suite of algorithms or tools that can be selected according to the type of electronic device 102 (e.g., computational capability or power constraints) or a target angular resolution for the awareness manager 106. In some implementations, the angle estimator 318 can include a neural network 632, a convolutional neural network (CNN) 634, or a long short-term memory (LSTM) network 636. The neural network 632 can have various depths or quantities of hidden layers (e.g., three hidden layers, five hidden layers, or ten hidden layers) and can also include different quantities of connections (e.g., the neural network 632 can comprise a fully-connected neural network or a partially-connected neural network). In some cases, the CNN 634 can be used to increase computational speed of the angle estimator 318. The LSTM network 636 can be used to enable the angle estimator 318 to track the target. Using machine learning techniques, the angle estimator 318 employs non-linear functions to analyze the shape of the amplitude response 628-1 or 628-2 and generate angular probability data 638, which indicates a likelihood that the user or a portion of the user is within an angular bin. The angle estimator 318 may provide the angular probability data 638 for a few angular bins, such as two angular bins to provide probabilities of a target being to the left or right of the electronic device 102, or for thousands of angular bins (e.g., to provide the angular probability data 638 for a continuous angular measurement).

Based on the angular probability data 638, a tracker module 640 produces angular position data 642, which identifies an angular location of the target. The tracker module 640 may determine the angular location of the target based on the angular bin that has a highest probability in the angular probability data 638 or based on prediction information (e.g., previously-measured angular position information). The tracker module 640 may also keep track of one or more moving targets to enable the radar system 104 to confidently distinguish or identify the targets. Other data can also be used to determine the angular position, including range, Doppler, velocity, or acceleration. In some cases, the tracker module 640 can include an alpha-beta tracker, a Kalman filter, a multiple hypothesis tracker (MHT), and so forth.

A quantizer module 644 obtains the angular position data 642 and quantizes the data to produce quantized angular position data 646. The quantization can be performed based on a target angular resolution for the awareness manager 106. In some situations, fewer quantization levels can be used such that the quantized angular position data 646 indicates whether the target is to the right or to the left of the electronic device 102 or identifies a 90-degree quadrant the target is located within. This may be sufficient for some radar-based applications, such as user proximity detection. In other situations, a larger number of quantization levels can be used such that the quantized angular position data 646 indicates an angular position of the target within an accuracy of a fraction of a degree, one degree, five degrees, and so forth. This resolution can be used for higher-resolution radar-based applications, such as gesture recognition, or in implementations of the recognition zone, aware mode, engaged mode, or active mode as described herein. In some implementations, the digital beamformer 316, the angle estimator 318, the tracker module 640, and the quantizer module 644 are together implemented in a single machine learning module.

These and other capabilities and configurations, as well as ways in which entities of FIG. 1-6 act and interact, are set forth below. The described entities may be further divided, combined, used along with other sensors or components, and so on. In this way, different implementations of the electronic device 102, with different configurations of the radar system 104 and non-radar sensors, can be used to implement radar-based authentication status feedback. The example operating environment 100 of FIG. 1 and the detailed illustrations of FIGS. 2-6 illustrate but some of many possible environments and devices capable of employing the described techniques.

Example Methods

Figure 7:
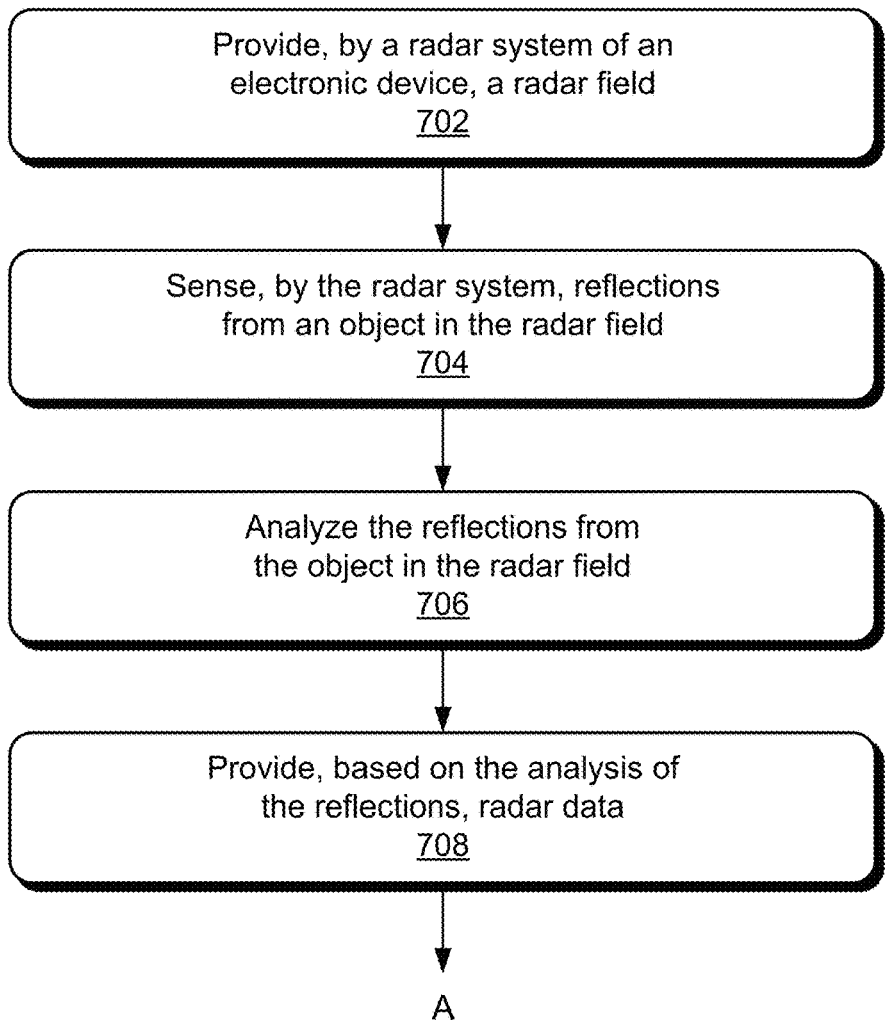
FIGS. 7-9 depict an example method that enables radar-based authentication status feedback.
Figure 8:
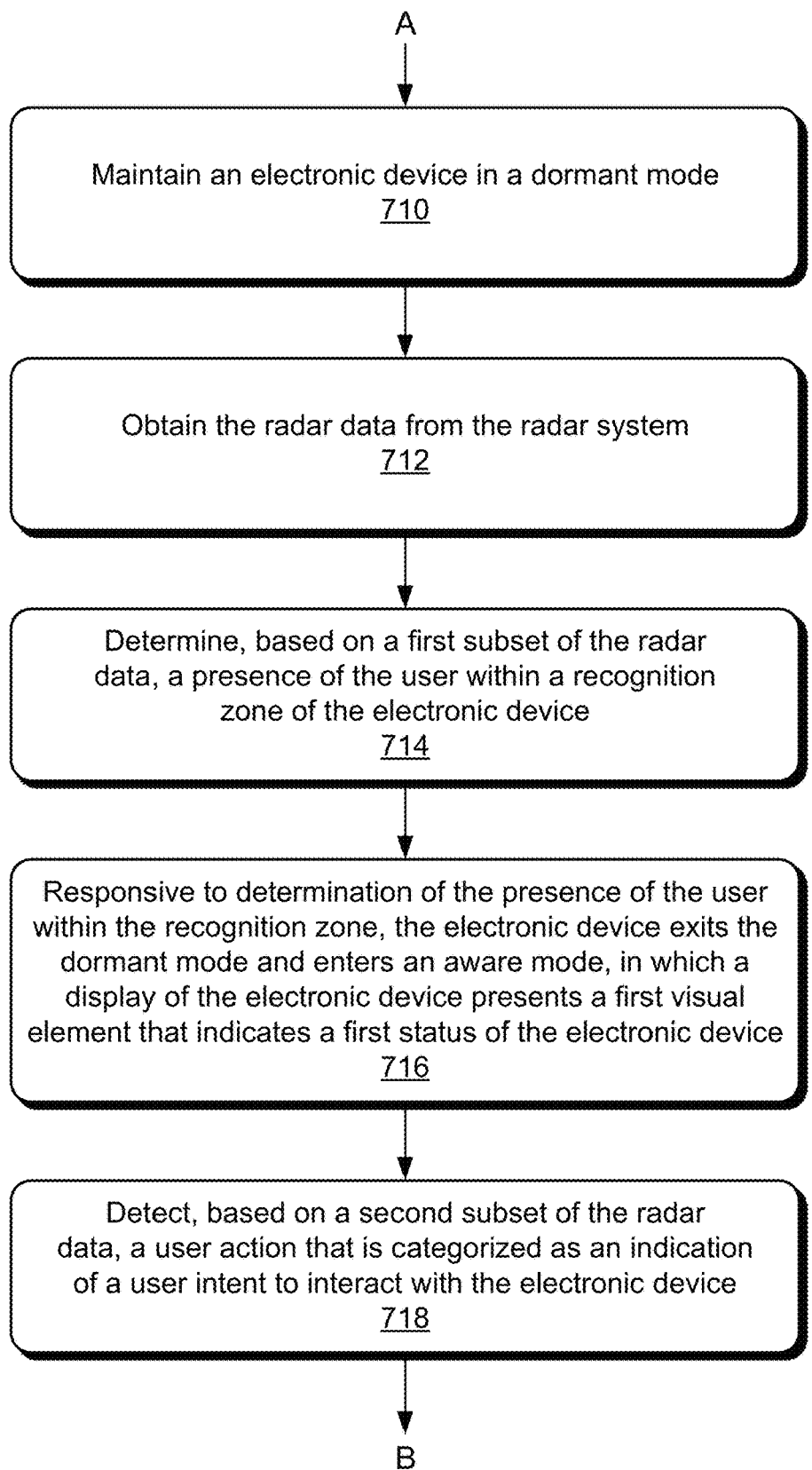
Figure 9:
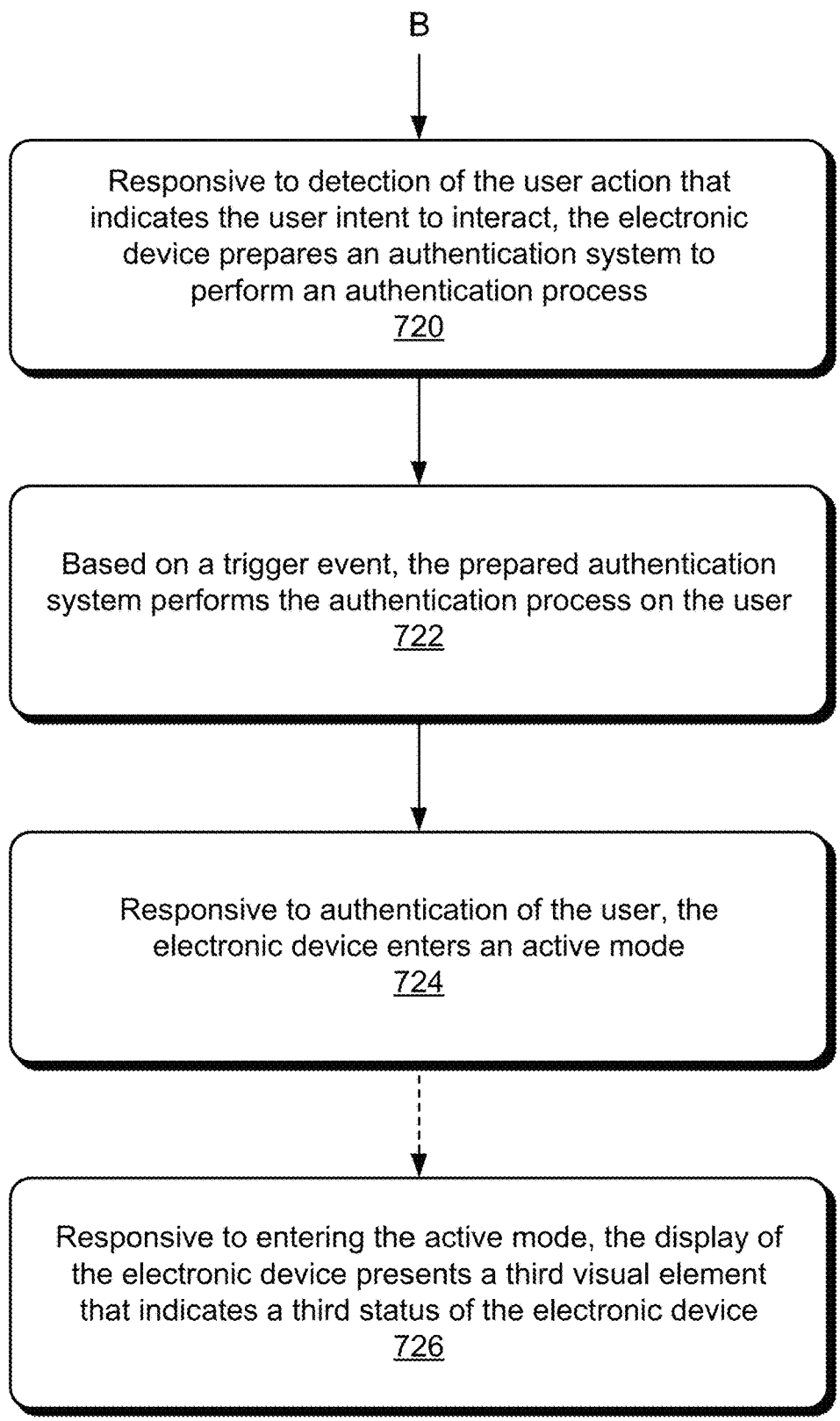

FIGS. 7-9 depict example method 700, which enables radar-based authentication status feedback. The method 700 can be performed with an electronic device that uses a radar system to provide a radar field. The radar field is used to detect interactions of a user with an electronic device, such as a presence of the user in the radar field and movement of the user relative to the electronic device. The user's movements can also be used to detect a user action that is categorized as an indication of the user's intent to interact (or not interact) with the electronic device. For example, the electronic device may have access to a library of actions (e.g., in a memory device included, or associated, with the electronic device) that are categorized as indicators of a user's intent to interact or not interact with the device (e.g., reaching for the electronic device, turning or walking toward or away from the electronic device, leaning toward or looking at the electronic device). Actions that are categorized as indications of the user's intent to interact with the electronic device may be referred to herein as user actions that indicate user intent, indications of the user's intent, or indications of the user's intent to interact and may include reaching, moving, or turning toward the electronic device 102, looking at or leaning over the electronic device, and so forth. Based on the detection of the user's presence, movements, and on the indications of the user's intention, the electronic device can cause the electronic device to enter and exit different modes of functionality and present different visual elements on a display, based on the modes. These modes can enable different functionalities for the electronic device, examples of which are described with respect to FIGS. 10-17.

The method 700 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-6, reference to which is made for example only. The techniques are not limited to performance by one entity or multiple entities operating on one device.

At 702, a radar field is provided. This radar field can be provided by any of a variety of electronic devices (e.g., the electronic device 102 described above), that include, or are associated with, a radar system (e.g., the radar system 104) and an awareness manager (e.g., the awareness manager 106). Further, the radar field may be any of a variety of types of radar fields, such as the radar field 110 described above.

At 704, reflections from an object in the radar field are sensed by the radar system. The object may be any of a variety of objects, such as wood, plastic, metal, fabric, or organic material (e.g., a person, such as the user 112 described above, or a body part of a person, such as the user's hand) For clarity, the object is referred to as "the user" or "users" while describing the method 700.

At 706, the reflections from the object in the radar field are analyzed. The analysis may be performed by any of a variety of entities (e.g., the radar system 104, the awareness manager 106, or another entity) and may include various operations or determinations, such as those described with reference to FIGS. 3-6.

At 708, based on the analysis of the reflections, radar data is provided (e.g., the radar data described with reference to FIGS. 1-6). The radar data may be provided by any of a variety of entities, such as the radar system 104, the awareness manager 106, or another entity. In some implementations, the radar system may provide the radar data and pass the radar data to other entities (e.g., any of the described radar-based applications, awareness managers, modules, or non-radar sensors). The description of the method 700 continues in FIG. 8, as indicated by the letter "A" after block 708 of FIG. 7, which corresponds to the letter "A" before block 710 of FIG. 8.

At 710, an electronic device is maintained in a dormant mode. For example, the awareness manager 106 may maintain the electronic device 102 in the dormant mode. The dormant mode is a persistent lower-power mode, as described with reference to FIG. 1. In the dormant mode, the display may be on or off and, in cases in which the display provides a touch interface, the touch interface may remain functional.

At 712, the radar data is obtained from the radar system. For example, the radar-based awareness manager 106 can obtain the radar data from the radar system 104. The radar data can be obtained in any suitable way. While indicated as a particular step in the method 700, the electronic device 102, the awareness manager 106, or other systems and components of the electronic device may continue obtaining radar data (including multiple subsets of the radar data) as long as the radar system is powered.

At 714, based on the radar data and during the dormant mode, a presence of the user within a recognition zone of the electronic device is determined. For example, based on one or more subsets of the radar data, the radar-based awareness manager 106 can determine the presence of the user 112 within the recognition zone 116 of the electronic device 102. The recognition zone may take any of a variety of shapes and sizes, as described with reference to FIG. 1. For example, the recognition zone may be an area approximately coterminous with the radar field, a radius extending from the radar system, a volume around the radar system, or a non-uniform shape. The recognition zone may extend any of a variety of distances from the radar system (e.g., three, seven, ten, or fourteen feet, although for a larger device, such as a large-screen television, the recognition zone may be extended to four, five, six or seven meters). Further, the recognition zone may be a static size or shape that is predefined, user-selectable, or determined via another method. In some cases, the recognition zone can be dynamically and automatically adjustable (e.g., by the awareness manager 106, as described with reference to FIG. 1).

At 716, responsive to determining the presence of the user within the recognition zone, the electronic device exits the dormant mode and enters an aware mode in which the display presents one or more visual elements that indicates a status of the electronic device. For example, in response to determining that the user 112 is within the recognition zone 116, the awareness manager 106 can cause the electronic device 102 to exit the dormant mode and enter the aware mode. As described with reference to FIG. 1, the aware mode is another lower-power mode, in which a display of the electronic device (e.g., the display 114) presents one or more visual elements that can indicate a status or functionality level of the electronic device. The visual elements presented in the aware mode may include visual elements that describe environmental information or simple status information about the electronic device, as described with reference to FIG. 1. Some example visual elements are described in additional detail with reference to FIGS. 10-12. When the user leaves the recognition zone, the electronic device may return to the dormant mode (immediately after determining that the user has exited the recognition zone or after the user has been outside the recognition zone for a period of time). For example, the awareness manager 106 may determine that the user 112 has turned away from the electronic device 102 and/or is walking away from the electronic device 102 and immediately return to the dormant mode.

At 718, based on the radar data and during the aware mode, a user action that is categorized as an indication of a user intent to interact with the electronic device is detected. For example, based on one or more other subsets of the radar data provided by the radar system 104, the awareness manager 106 can detect that the user 112 is performing an action (e.g., reaching toward the electronic device 102) and determine that the action is an indication of the user's intent to interact with the electronic device 102 (e.g., by referring to a library of actions, as described above and with reference to FIG. 1). Actions that may be indications of the user's intent to interact with the electronic device include reaching or turning toward the electronic device, leaning over the electronic device, and so forth, as described with reference to FIG. 1. Note that different actions that are categorized as indications of the user's intent to interact may have different thresholds to be considered. For example, a reach toward the electronic device may only be determined to indicate the user's intent if a portion of the user's body moves to within a threshold distance of the electronic device (e.g. three inches, five inches, eight inches, or twelve inches).

In some implementations, the electronic device may also include machine-learning technology that enables the electronic device to learn different or additional indications of the user's intent and add, remove, or modify the actions stored in the library (e.g., based on the user's history and behavior with the device). Further, if electronic device determines that the user is in the recognition zone, but does not detect an indication of an intent to interact, the electronic device may remain in the aware mode until such an action is detected. In other cases, the electronic device may remain in the aware mode for a selectable and adjustable time duration (e.g., 60, 30, or 10 seconds) and then transition back to the dormant mode, even if the user remains in the recognition zone. The description of the method 700 continues in FIG. 9, as indicated by the letter "B" after block 718 of FIG. 8, which corresponds to the letter "B" before block 720 of FIG. 9.

At 720, responsive to detecting the user action that indicates the user intent to interact with the electronic device, the electronic device automatically prepares an authentication system to perform an authentication process. For example, in response to detecting the indication of the user's (e.g., the user 112) intent to interact with electronic device 102, the awareness manager 106 can cause the electronic device 102 to prepare the authentication system 118.

In some implementations, responsive to detecting the user action that indicates the user intent to interact with the electronic device, the electronic device also exits the aware mode and enters an engaged mode in which a display of the electronic device presents one or more other visual elements that indicate another status (or a change in status) of the electronic device, as described with reference to FIG. 1. As described with reference to FIG. 1, the engaged mode is a higher-power mode of the electronic device and the radar system. When the electronic device enters the engaged mode, a display of the electronic device (e.g., the display 114) may present one or more other or additional visual elements that can indicate a new or enhanced status or functionality level of the electronic device. The visual elements presented in the engaged mode may include visual elements that indicate that access to the electronic device is locked and that authentication is required for access (e.g., a locked padlock icon). The other visual elements are described in additional detail with reference to FIGS. 10-12.

In the aware or the engaged mode, responsive to detecting the user action that indicates the user intent to interact with the electronic device, the electronic device can also automatically prepare an authentication system (e.g., the authentication system 118) to perform an authentication process. The authentication system can use any suitable authentication techniques. For example, the authentication system may include or be associated with a camera (e.g., one of the non-radar sensors 108) and a facial recognition module (e.g., the facial recognition module 120), which can be used to authenticate the user based on an image of the user's face. The automatic preparation may include steps such as placing the camera in a state in which it can capture an image (e.g., a "warm up" process that prepares the camera and any associated programs to capture images). The preparation may also include placing the facial recognition module in a state in which it can use the captured image to authenticate the user, as described with reference to FIG. 1. As noted, this preparation can reduce the latency between the user's initial actions toward authentication and completion of the authentication process.

At 722, based on a trigger event, the prepared authentication system performs the authentication process on the user. For example, based on the trigger event, the awareness manager 106 can cause the prepared authentication system 118 to perform the authentication process on the user 112. The trigger event is an interaction that is separate from, or in addition to, the action that caused the electronic device to transition to the optional engaged state. The trigger event indicates the user is ready to be authenticated. For example, the trigger event may be a change in a location or orientation of the user, a change in an orientation of the electronic device (e.g., the user touches, picks up, leans over, or rotates the electronic device), or an explicit user action such as a touch input, as described with reference to FIG. 1. The trigger event may be detected using radar data or non-radar data, and, in cases where there is no trigger event (e.g., indicating that the user does not intend to interact with the electronic device) the user is not authenticated and, if the electronic device 102 is in the engaged mode, the electronic device may be maintained in the engaged mode for a selectable time duration and then transition back to the aware mode.

At 724, responsive to the user being authenticated, the radar-based awareness manager causes the electronic device to enter an active mode, in which the user has full rights and access to the electronic device. For example, in response to successfully authenticating the user 112, the awareness manager 106 can cause the electronic device 102 to exit the aware or engaged mode and enter the active mode. In the active mode, as described with reference to FIG. 1, the user has full rights and access to the electronic device (e.g., the electronic device is unlocked and fully functional).

Optionally, at 726, when the electronic device enters the active mode, the display can present one or more different or additional visual elements that indicate another status, or a change in status, of the electronic device. For example, in the active mode, the display 114 can present visual elements that indicate a new or enhanced status or functionality level of the electronic device 102. The visual elements presented in the active mode may include a background image or a visual element that indicates the electronic device is unlocked (e.g., an unlocked padlock icon), as described with reference to FIG. 1. As described with reference to FIG. 1, the visual elements displayed in the active mode may be be determined, at least in part, on the number of users detected within the recognition zone. In some cases, the background image or visual element may be presented for a duration of time and then fade or disappear. Example of these additional or other visual elements are described in additional detail with reference to FIGS. 10-12.

These techniques for radar-based authentication status feedback may be more secure than other authentication and feedback techniques. For example, a user's position, orientation, or 3D gestures (especially user-defined gestures, micro-gestures, and posture or position-based gestures) are typically not duplicable or obtainable by an unauthorized person (unlike, for example, a password). Further, a radar image of the user (e.g., based on the radar data described above), even if it includes the user's face, does not visually identify the user like a photograph or video may do. Even so, further to the descriptions above, the user may be provided with controls allowing the user to make an election as to both whether and when any of the systems, programs, managers, modules, or features described in this document may enable collection of user information (e.g., images of the user, radar data describing the user, information about a user's social network, social actions or activities, profession, a user's preferences, or a user's current location), and whether and when the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, zip/postal code, or state level), so that a particular location of a user cannot be determined. Thus, the user may have control over what information is collected about the user, how that information is used, and what information is provided to or about the user.

Example Visual Elements

Figure 10:
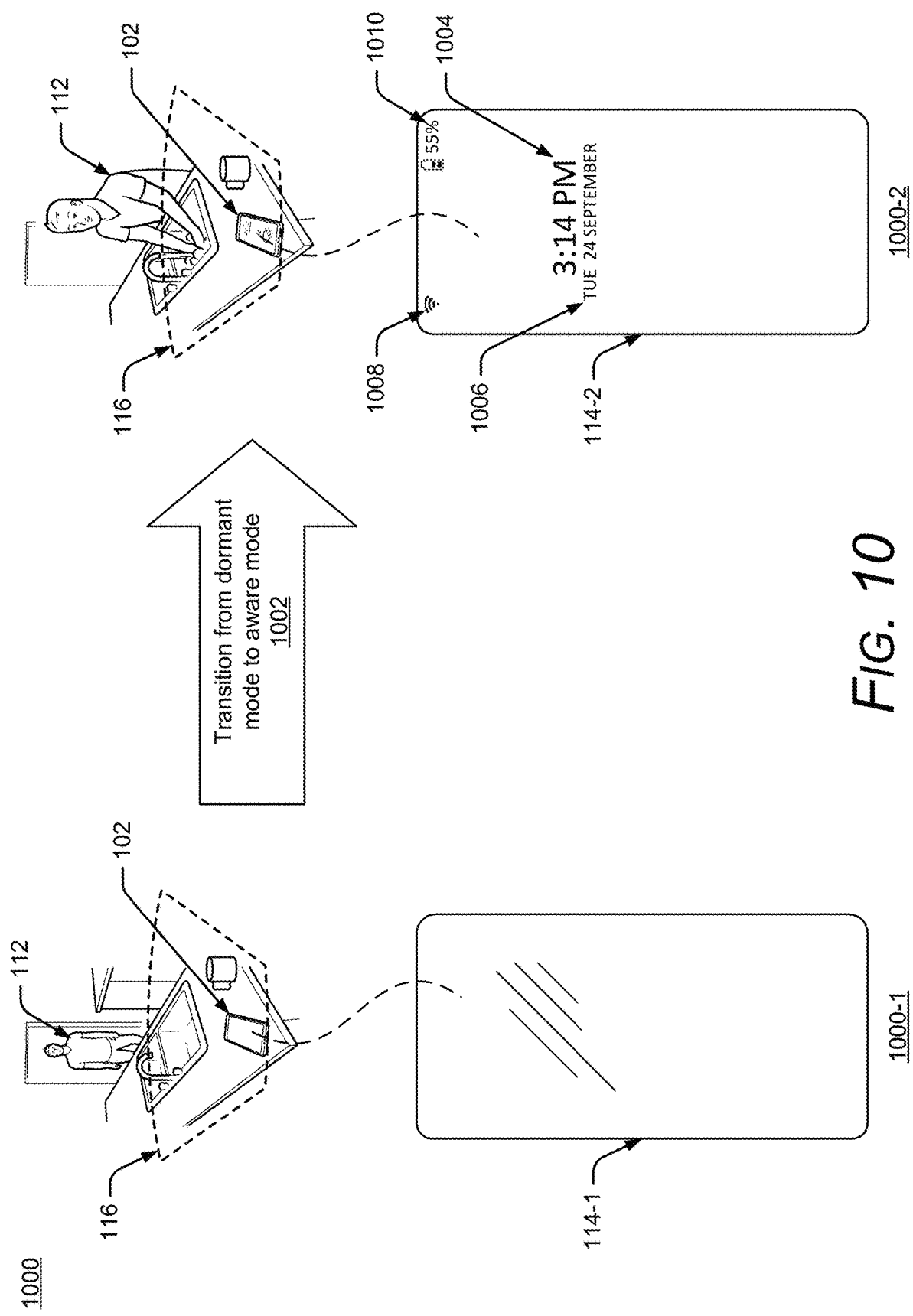
FIGS. 10-12 illustrate the electronic device of FIGS. 1 and 2 operating in multiple modes with examples of the visual elements that can be presented on the display in the different modes.
Figure 11:
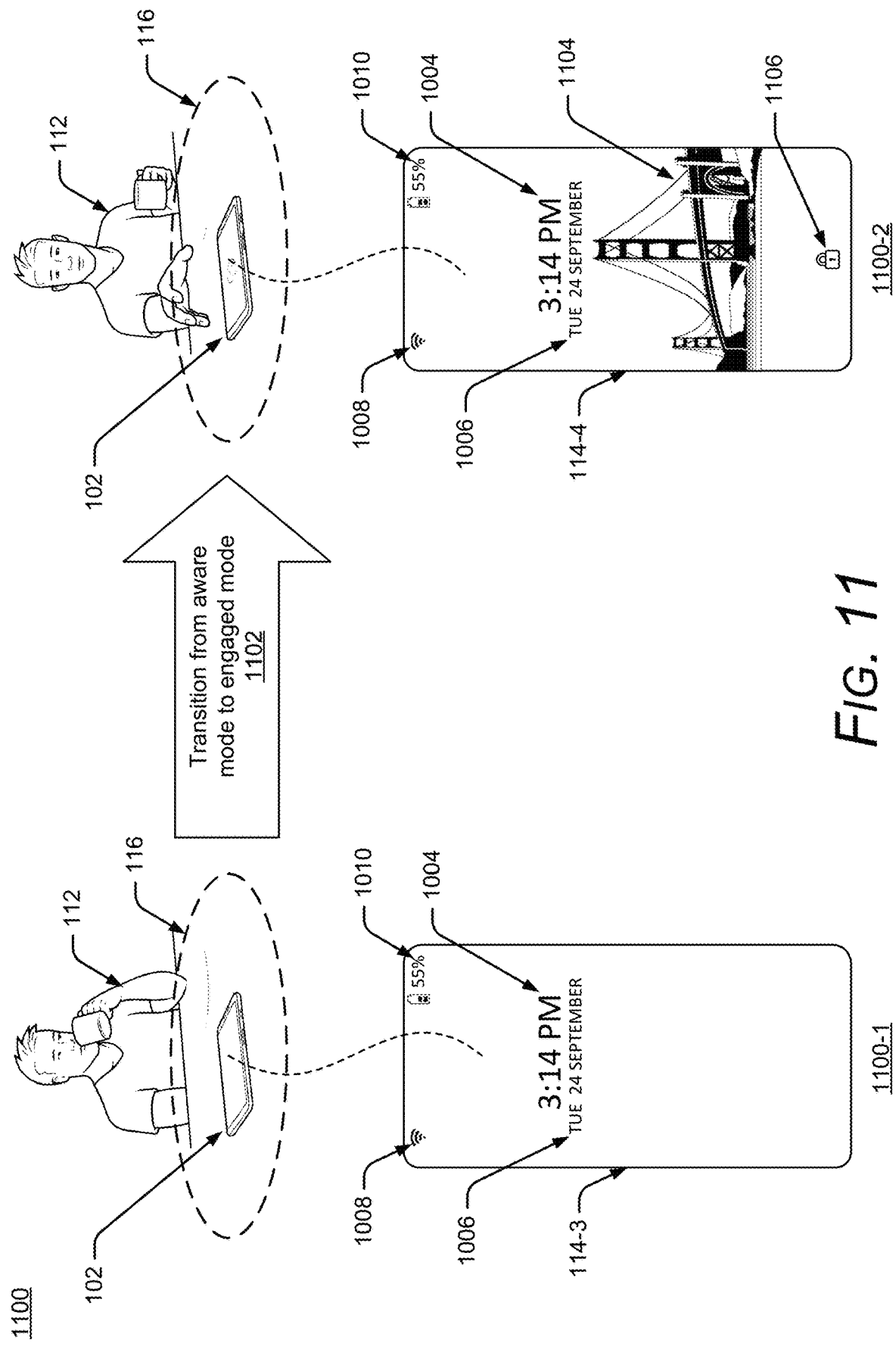
Figure 12:
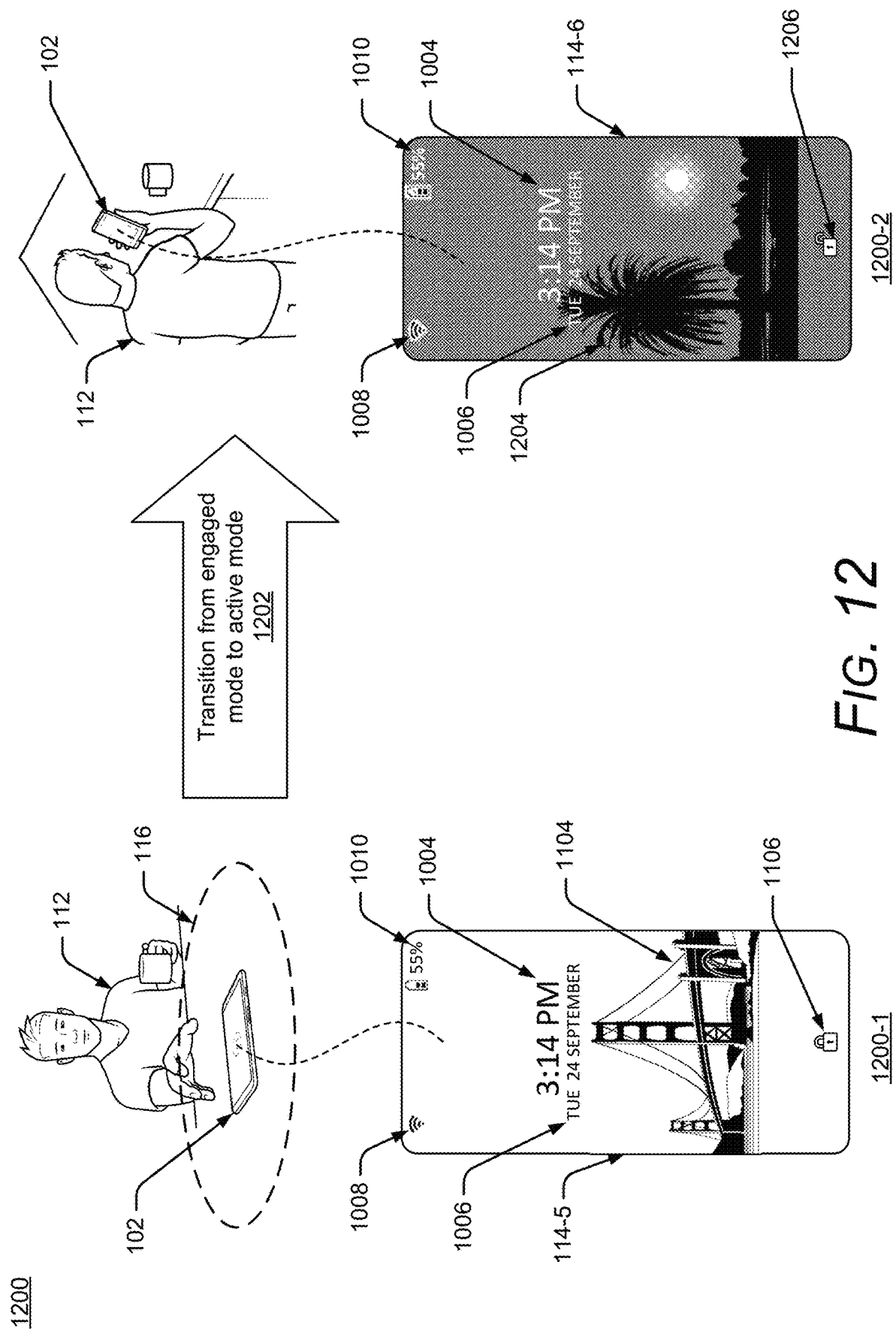

As noted, the techniques and systems described herein can enable multiple modes of the electronic device 102 that provide different services and functionality. The mode the device is in changes based on radar data (e.g., from a radar field such as the radar field 110) that can indicate a user's current location, level of interaction, and anticipated changes in the user's interaction level. The electronic device 102 also presents visual elements on the display 114 that indicate the functions and services the device can provide in the different modes. These visual elements also change, based on the modes, to help the user understand the mode the electronic device is operating in, and the services and functions that are available. FIGS. 10-12 illustrate the electronic device 102 operating in the multiple modes and describe examples of the visual elements that can be presented on the display in the different modes.

For instance, when the user 112 is not detected near the electronic device 102 (e.g., within the radar field 110 or the recognition zone 116), the device operates in a dormant mode. In the dormant mode, the display 114 may present fewer visual elements than in other modes, or no visual elements. The display 114 may be on or off, as described above. When an awareness manager 106 determines (e.g., using radar data, or one or more subsets of the radar data, from the radar system 104) the presence of the user 112 within the recognition zone 116, the electronic device 102 exits the dormant mode and enters an aware mode. In the aware mode, the display 114 presents one or more visual elements that can indicate a status or functionality level of the electronic device 102.

While the electronic device 102 is in the aware mode, the awareness manager 106 can detect a user action that is categorized as an indication of a user intent to interact with the electronic device 102. In response to detecting this user action, the electronic device 102 can prepare an authentication system 118 to perform an authentication process. In some implementations, when the awareness manager 106 detects the indication of the user's intent to interact with the electronic device 102, the awareness manager 106 can also cause the electronic device 102 to exit the aware mode and enter an engaged mode. In the engaged mode, the display 114 presents one or more additional or alternate visual elements that can indicate changes in the status or functionality level of the electronic device 102. The awareness manager 106 can also detect a trigger event and, based on the trigger event, cause the authentication system 118 to authenticate the user 112. In response to detecting the user 112 being authenticated, the electronic device 102 exits the aware or engaged mode and enters an active mode. In the active mode, the display 114 presents one or more additional or alternate visual elements that can indicate changes in the status or functionality level of the electronic device 102.

FIG. 10 illustrates an example 1000 of an electronic device transitioning from the dormant mode to the aware mode. A detail view 1000-1 shows the electronic device 102 in the dormant mode while the user 112 is outside of the recognition zone 116. In this example, the recognition zone 116 has a wedge shape, but as noted with reference to FIG. 1, the recognition zone can take any suitable shape or size. Continuing the example, in this case the display 114 is not presenting any visual elements in the dormant mode, as shown on an example display 114-1. In another detail view 1000-2, the user 112 is closer to the electronic device 102 and the awareness manager 106 has determined that the user 112 has entered the recognition zone 116. Based on this determination, the electronic device 102 exits the dormant mode and enters the aware mode, as shown by an arrow 1002.

In the detail view 1000-2, multiple visual elements are presented on an example display 114-2. For example, in the aware mode, the example display 114-2 presents a time-of-day element 1004 (a clock), a date element 1006, a connectivity status element 1008 (e.g., Wi-Fi, cellular, or other network connectivity), and a battery-level indicator element 1010 (including a graphical element and a percentage indicator). In the detail view 1000-2, the remainder of the example display 114-2 is blank. In some implementations, however, additional elements may be displayed, including a background image, such as a wallpaper or other image. Though not shown in FIG. 10, if the user 112 exits the recognition zone 116, the awareness manager 106 may cause the electronic device 102 to stop displaying the visual elements and return to the dormant mode (immediately or after the user 112 has been outside the recognition zone 116 for a selectable predetermined amount of time).

FIG. 11 illustrates an example 1100 of an electronic device transitioning from the aware mode to the optional engaged mode. A detail view 1100-1 shows the electronic device 102 in the aware mode, as described with reference to FIG. 10, including displaying multiple visual elements on an example display 114-3. Another detail view 1100-2 shows the user 112 reaching for the electronic device 102. The awareness manager 106 detects the reach (e.g., using one or more subsets of the radar data) as a user action that is an indication of a user intent to interact with the electronic device 102. In response to detecting this user action, the electronic device 102 exits the aware mode and enters the engaged mode, as shown by an arrow 1102.

In the detail view 1100-2, additional visual elements are presented on an example display 114-4. For example, in the engaged mode, the example display 114-4 presents a background image 1104 (in this case, an image of the Golden Gate Bridge). The background image 1104 may have dynamic features that adjust with the context of the user, such as animation, or varying brightness or transparency levels that change depending on the distance or speed of the reach. As noted, while in the engaged mode, the electronic device 102 also prepares an authentication system 118 to perform an authentication process (note that in some cases, the electronic device 102 does not enter the engaged mode and prepares the authentication system 118 while in the aware mode). Accordingly, the example display 114-4 also presents a lock icon 1106, which indicates that full access to the electronic device 102 is unavailable until the user 112 is authenticated. In some implementations, additional visual elements may be displayed on the example display 114-4, and some or all of the visual elements presented on the example display 114-3 may cease being presented. Though not shown in FIG. 11, if the user 112 withdraws the reach gestures, the awareness manager 106 may cause the electronic device 102 to exit the engaged mode, and return to the aware mode (immediately or after the reach has been withdrawn for a selectable predetermined amount of time).

FIG. 12 illustrates an example 1200 of an electronic device transitioning from the engaged mode to the active mode after the user 112 is authenticated (note that in some implementations, the electronic device can transition to the active mode from the aware mode). A detail view 1200-1 shows the electronic device 102 in the engaged mode, as described with reference to FIG. 11, including displaying multiple visual elements on an example display 114-5. As noted with reference to FIG. 11, when the user reaches for the electronic device 102, the authentication system 118 prepares to authenticate the user 112. In FIG. 12, another detail view 1200-2 shows that the user 112 has picked up the electronic device 102. The awareness manager 106 can determine that picking up the electronic device 102 is a trigger event, as described above, and authenticate the user 112. When the user 112 is authenticated, the electronic device 102 exits the engaged mode and enters an active mode, as shown by an arrow 1202.

Additional visual elements associated with the active mode may also be presented on an example display 114-6, as shown in the detail view 1200-2. For example, in the active mode, the example display 114-6 continues to present the visual elements associated with the aware mode, but the background image 1104 (associated with the engaged mode) has changed to another background image 1204, a beach silhouette (note that as the background image 1204 has a different color scheme, some of the visual elements have changed color so that they remain visible to the user 112). Additionally, the engaged mode lock icon 1106 has transitioned to an unlock icon 1206, which indicates that the user 112 is authenticated. In some implementations, the unlock icon 1206 may be presented for a duration of time and then fade. While not illustrated in FIG. 12, additional visual elements may be displayed on the example display 114-6 after the unlock icon 1206 fades, such as an instruction (e.g., "Swipe or tap to open"), one or more application launch icons, or other visual elements available to the electronic device 102.

In some implementations, the user 112 may remain authenticated as long as the user 112 remains with in the recognition zone 116 (or another defined area within which the radar system can detect the presence of the user 112). In these implementations, the display 114 may remain powered and able to receive input and present content, or the screen may turn off to save battery power. Because the user 112 remains authenticated, even if the screen is off, the user can access the electronic device 102 by touching the screen, picking up the device, or another action, without having to be re-authenticated. In this way, the user's enjoyment and experience with the electronic device 102 can be improved while preserving battery power.

Further, the described progression between modes (e.g., from the dormant mode, through the aware and engaged modes, to authentication and the active mode), may instead run in an opposite direction. For example, when the electronic device 102 is in the active mode and the user 112 sets it down (e.g., another trigger event occurs), the awareness manager 106 may instead lock the electronic device 102 (de-authenticate the user 112), and place the electronic device 102 in the engaged mode, as described above. Accordingly, if the user's hand remains near the electronic device 102 (e.g., remains in a "reach" position), the awareness manager 106 can keep the electronic device 102 in the engaged mode. Conversely, if the user's hand is withdrawn, the awareness manager 106 may transition the electronic device 102 from the engaged mode to the aware mode. Then, as noted, the electronic device 102 may remain in the aware mode while the user is in the recognition zone. During this progression between zones, the display 114 may present the visual elements described above for each zone, to indicate the changing status of the electronic device 102 to the user 112.

In some implementations, applications running on the electronic device 102 (e.g., in the active mode) may be able to receive input through radar-based, remote, three-dimensional (3D) gestures. In this case, the display in the aware mode can present visual elements that indicate the availability of the application to receive that type of gesture input. For example, when a radar-gesture-subscribed application (gesture-subscribed application) is running, the display 114 may present an icon, a contrasted lighting area (e.g., an area that is brighter or dimmer than the surrounding area), or an area of different or contrasting color.

Figure 13:
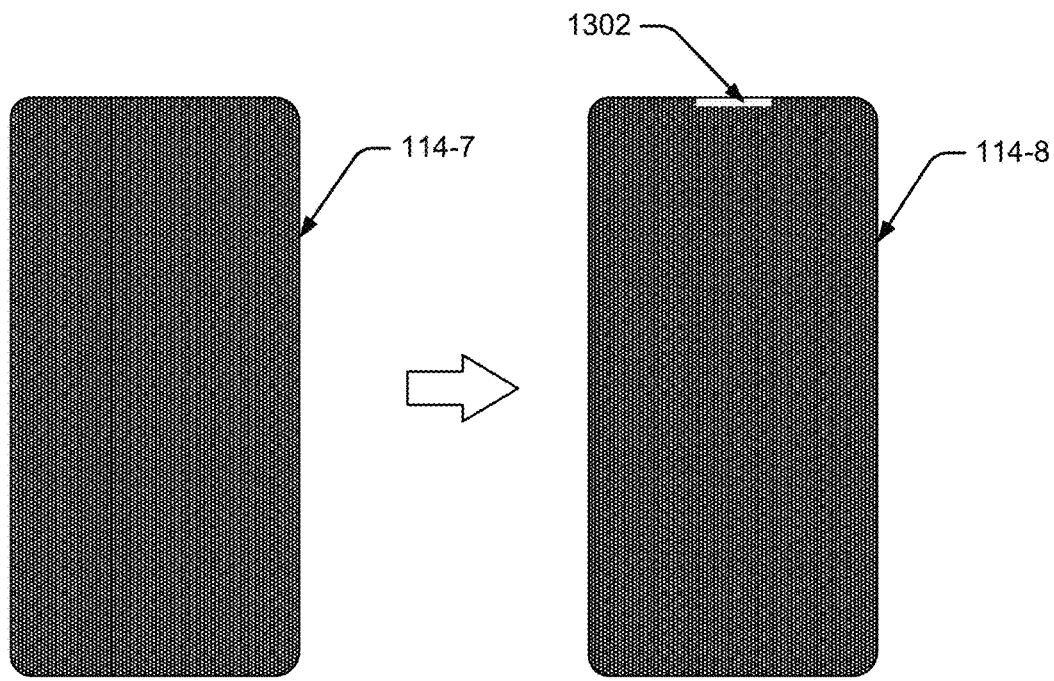
FIGS. 13-17 illustrate additional visual elements that can be presented on the display of the electronic device of FIGS. 1 and 2 when a gesture-subscribed application is running on the electronic device.
Figure 13:
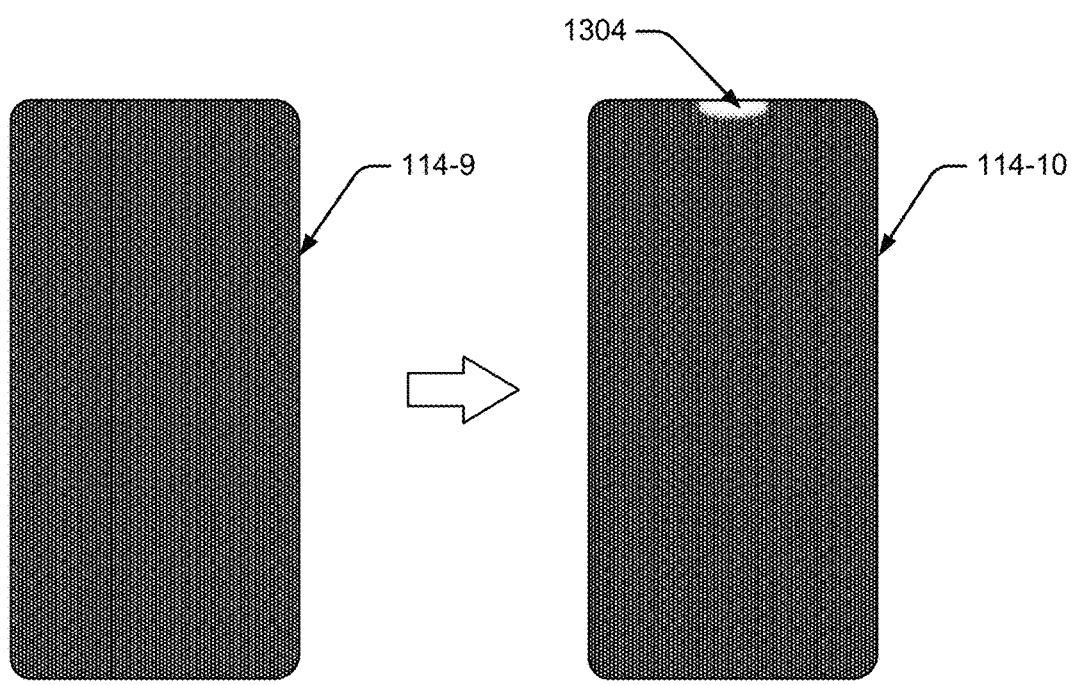

Consider FIG. 13, which illustrates generally, at 1300, example visual elements that may be used to indicate that a gesture-subscribed application is running on the electronic device 102. A detail view 1300-1 illustrates an example display 114-7, which is shown in a state with no gesture-subscribed application running Another state, in which at least one gesture-subscribed application is running, is shown on an example display 114-8. A visual element 1302 at the top of the example display 114-8 indicates that the electronic device 102 can receive input through remote 3D gestures, as described above. The visual element 1302 is shown as an illuminated line, but may be presented at another location, at a different illumination level (e.g., only partially illuminated), or as another shape or type of element. For example, in another detail view 1300-2, an example display 114-9 is shown in a state with no gesture-subscribed application running Another state in which at least one gesture-subscribed application running is shown on an example display 114-10. A visual element 1304 at the top of the example display 114-10 indicates that the electronic device 102 can receive input through remote 3D gestures. The visual element 1304 is shown as an illuminated area (e.g., a glowing area), with less-defined edges than the visual element 1302. As with the visual element 1302, the visual element 1304 can be presented at another location on the display 114-10. Note that for clarity, no other elements (e.g., time, date, or application launch icons) are shown on the example displays 114-7 through 114-10. The visual elements 1302 or 1304, however, may be displayed along with other content on the display and while the electronic device 102 is in the aware mode, the engaged mode, the active mode, or another mode.

In some implementations, the visual element that indicates the gesture-subscribed application is running (e.g., the example visual elements 1302 or 1304) may fade or disappear entirely when the user interacts with the electronic device 102 using input other than a remote 3D gesture (e.g., a touch or voice input). For example, while a gesture-subscribed application is operating on the electronic device 102, the user may decide to start another application using a touch command on the electronic device (or decide to touch or press a power or lock control). In this case, the visual element 1302 or 1304 may fade or disappear when the user picks up the electronic device 102 or touches the display 114 (or the power/lock control). When the user stops touching the display 114 or puts down the electronic device 102, the visual element will reappear (or brighten) if one or more gesture-subscribed applications are operating on the electronic device 102. The visual element may reappear or brighten immediately or after a selectable time duration.

Additionally or alternatively, the display 114 may present or not present the visual element, based on an operational state, a screen state, a power state, or a functional mode of the electronic device 102, such as the dormant mode, aware mode, engaged mode, or the active mode. For example, in the dormant mode or another mode or state in which the user may interact with the electronic device less frequently, or in which the visual element will be presented for longer durations without changing or being hidden, there is an increased risk of screen burn-in (e.g., leaving a ghost image where the visual element is presented because infrequent interaction means the visual element remains in the same place for a longer time). In these situations, the visual element may be presented at a location that changes over time (e.g., the location shifts over time to avoid being presented at one location for long periods of time).

In some cases, the visual element may also or instead be presented and hidden in intervals that can help prevent screen burn-in. The intervals may be any appropriate duration for the type of display, such as one second, three seconds, five seconds, and so forth. Similarly, when the electronic device 102 is in a mode or state in which there is frequent interaction of different types or modes (e.g., touch, voice, and remote 3D gesture), the visual element may be presented for longer durations because there is less risk of screen burn in because the user's interactions inherently cause the electronic device 102 to show and hide the visual element.

The electronic device 102 can also provide more-detailed visual feedback that is related to the availability of remote 3D gestures. Consider FIG. 14, which illustrates generally, at 1400, example visual elements that may be used to indicate that a user's hand is within a gesture zone that enables a gesture-subscribed application to receive remote 3D gesture input. The gesture zone is an area around the electronic device 102 (or the radar system 104) within which the electronic device 102 can receive, interpret, and act on remote 3D gestures, such as a swipe or a pinch. The gesture zone can extend any suitable distance from the electronic device 102 (e.g., approximately three, five, seven, or ten inches).

Figure 14:
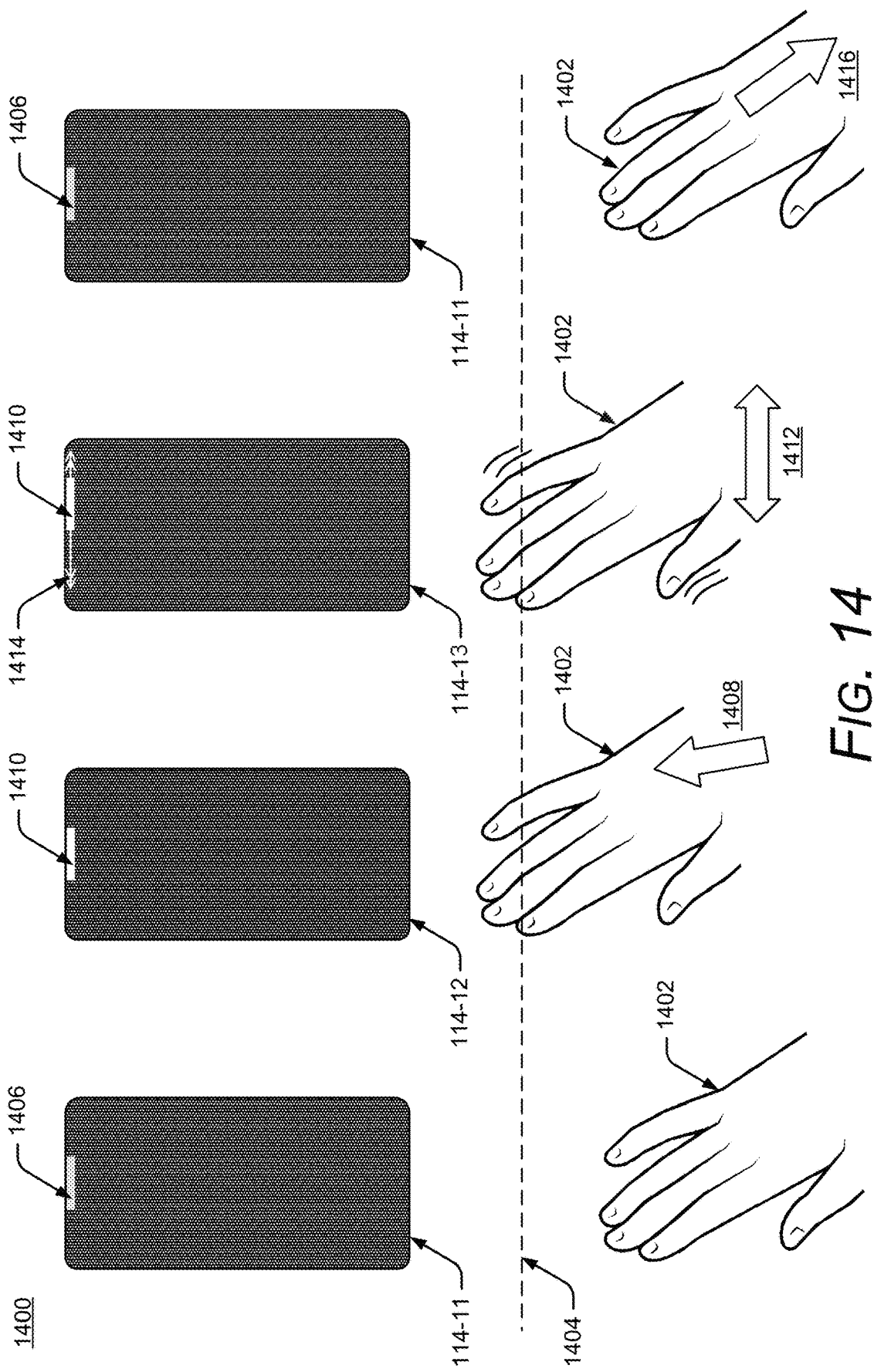

In FIG. 14, an example display 114-11 is shown in a state in which at least one gesture-subscribed application is running (e.g., similar to the example display 114-8 described with reference to FIG. 13). A user's hand 1402 is shown near the example display 114-11, but outside the gesture zone (the border of the gesture zone is shown as a dotted line 1404). A visual element 1406 is shown as an illuminated line near the top of the example display 114-11, but the visual element 1406 can be presented at another location or as another shape or type of element. As the user's hand 1402 moves to cross the border of the gesture zone 1404, as shown by an arrow 1408, another visual element 1410 replaces the visual element 1406, as shown on an example display 114-12. In this example, the visual element 1410 is a brighter line (e.g., more- or fully-illuminated) near the top of the display, but the visual element 1410 can be presented at another location or as another shape or type of element. When the user's hand 1402 is within the border of the gesture zone 1404, the visual element 1408 can move back and forth to represent smaller, non-gesture motion of the user's hand 1402, represented by an arrow 1412. The corresponding motion of the visual element 1410 is shown on an example display 114-13 by a double-ended arrow 1414. When the user's hand 1402 moves to withdraw outside the border of the gesture zone 1404, as shown by an arrow 1416, the display returns to the state as shown in the example display 114-11, with the visual element 1406 displayed near the top of the example display 114-11. The visual elements 1406 and 1410, along with the motion 1414 of the visual element 1408, can help the user 112 understand when gestures are available, and provide feedback that indicates the electronic device 102 is aware of the relative position of the user's hand, which can improve the user's experience with the electronic device 102.

In some implementations (not shown in FIG. 14), the non-gesture motions can be represented by other visual elements or changes to the visual elements. For example, in a case in which the visual element is a "glowing" shape (e.g., a shape with varying brightness, color, or other properties), a focal point of the shape can shift to represent the motions, while the shape itself remains stationary. Additionally or alternatively, changes to an intensity of the brightness or color can be used to represent the motion (e.g., the brightness or color of the shape, or part of the shape, change in accordance with the non-gesture motions.

As described with reference to FIG. 14, the electronic device 102 can provide visual feedback to represent smaller, non-gesture motion of the user's hand 1402 in the gesture zone, such moving back and forth according to the motion of the user's hand. Similarly, when the user 112 makes a remote 3D gesture (e.g., a swiping gesture to skip a song or an omni-gesture to dismiss an alert or notification), the electronic device 102 can provide feedback to notify the user 112 that the gesture has been successfully received or that a gesture attempt was received but it was not clear enough to be confirmed as a remote 3D gesture. For example, FIG. 15 illustrates generally, at 1500, a sequence of example visual elements that can be used to notify the user 112 that a gesture has been successfully received.

Figure 15:
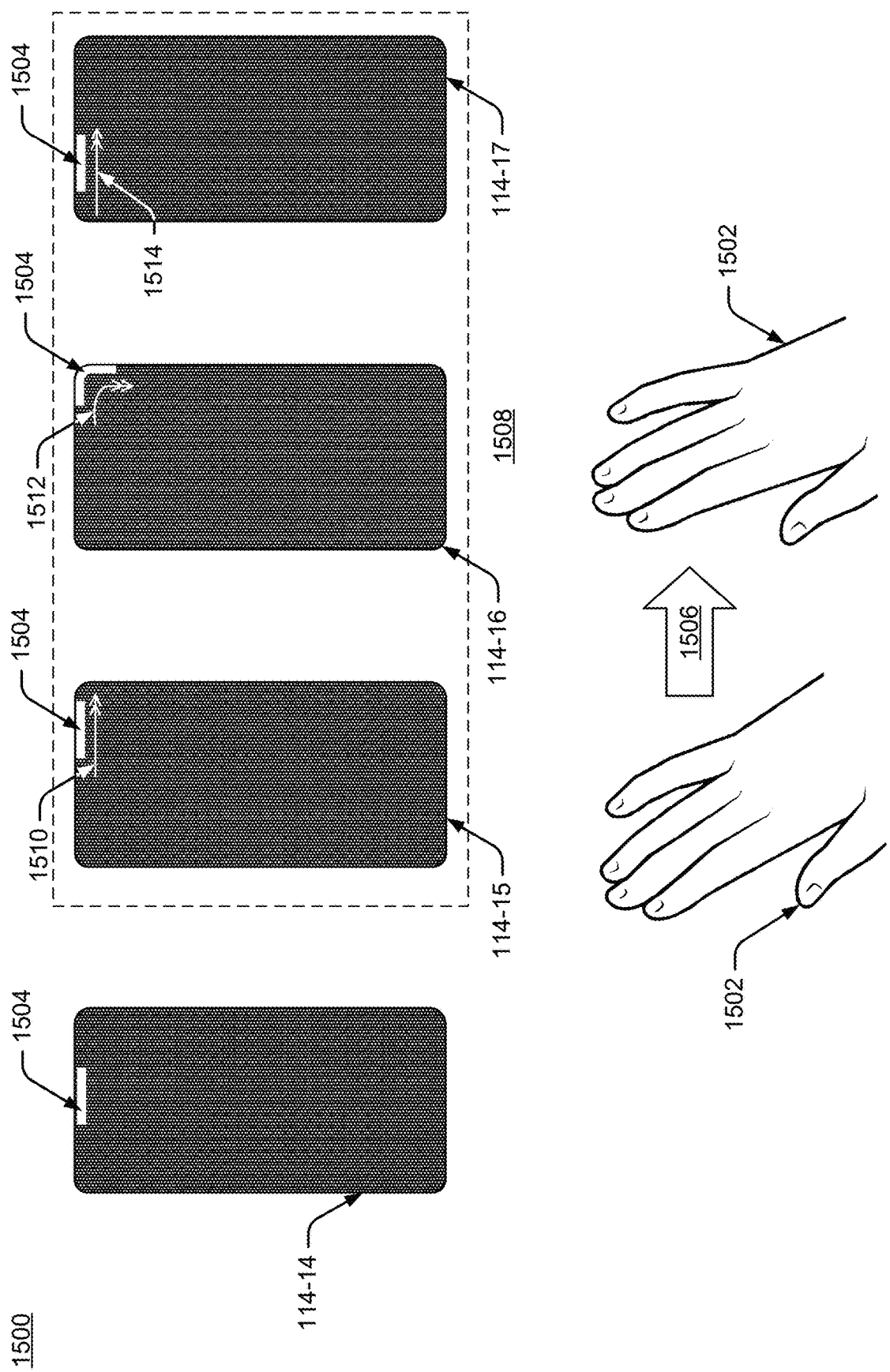

In FIG. 15, an example display 114-14 is shown in a state in which at least one gesture-subscribed application is running and a user's hand 1502 is within the boundary of a gesture zone, such as the gesture zone 1404 (e.g., similar to the example display 114-12 described with reference to FIG. 14). The example display 114-14 is presenting a visual element 1504, shown as an illuminated line near the top of the example display 114-14, to indicate the availability of remote 3D gestures and that the user's hand 1502 is within the gestures zone. In the example of FIG. 15, the user 112 makes a sliding or swiping gesture from left to right, as shown by the arrow 1506. In response to the motion 1506 of the user's hand 1502, the visual element 1504 also moves, as shown in a sequence 1508 (within a dashed-line rectangle). In the sequence 1508, an example display 114-15 illustrates the beginning of the sequence 1508, as the visual element 1504 begins moving to the right, as shown by an arrow 1510.

The sequence 1508 continues in another example display 114-16, in which the visual element 1504 bends around a corner of the example display 114-16, as shown by an arrow 1512. The visual element 1504 can continue down a side of the display 114 for a variable distance (e.g., as soon as a trailing end of the visual element completes the bend or after the trailing end has traveled a particular distance along the side) and then disappear. In another example display 114-17, the visual element 1504 reappears or regenerates from the left side of the example display 114-17 and moves toward the center position, as shown by an arrow 1514. When the sequence 1508 is complete, the display returns to the state as shown in the example display 114-14, with the visual element 1504 displayed near the top of the example display 114-14 and subtly tracking the user's hand 1502 while the hand remains within the boundary of the gesture zone 1404. The motion of the visual element 1504, can help the user 112 understand when gestures have been accepted and when the gesture is complete, which can improve the user's experience with the electronic device 102.

Note that the sequence 1508 begins when the user 112 begins the gesture, but the gesture and the sequence 1508 may be completed at different times. Further, as described above, while the visual element 1504 is shown as an illuminated line near the top of the display 114, the visual element 1504 can be presented at another location or as another shape or type of element. The sequence 1508 can also begin at another location on the display 114 and proceed in another direction, such as right to left, top to bottom, or bottom to top (e.g., if a remote 3D gesture moved from right to left, top to bottom, or bottom to top). Other examples of sequences that show a successful remote 3D gesture (not shown in FIG. 15) include a visual element that collapses on itself, briefly disappears, and then regenerates (e.g., from its original position). Other examples also include a visual element that bends or flexes (e.g., at one end, both ends, in the middle, or at another location) to show a successful remote 3D gesture, such as a gesture made in a direction perpendicular to the display 114 or a gesture with a component that is perpendicular to the display 114.

In some cases, as described herein, the visual element may be hidden even when remote 3D gestures are available (e.g., because the user interacted with a voice or touch input, or in order to reduce the risk of screen burn-in). In this situation, the visual element may still be shown when the user makes a successful remote 3D gesture. Consider an example, in which the visual element is hidden while the user is listening to music and using a voice input to open another application. In the example, the user performs a remote 3D gesture to skip a song, and the display presents the sequence 1508 to notify the user that the remote 3D gesture was successful.

Figure 16:
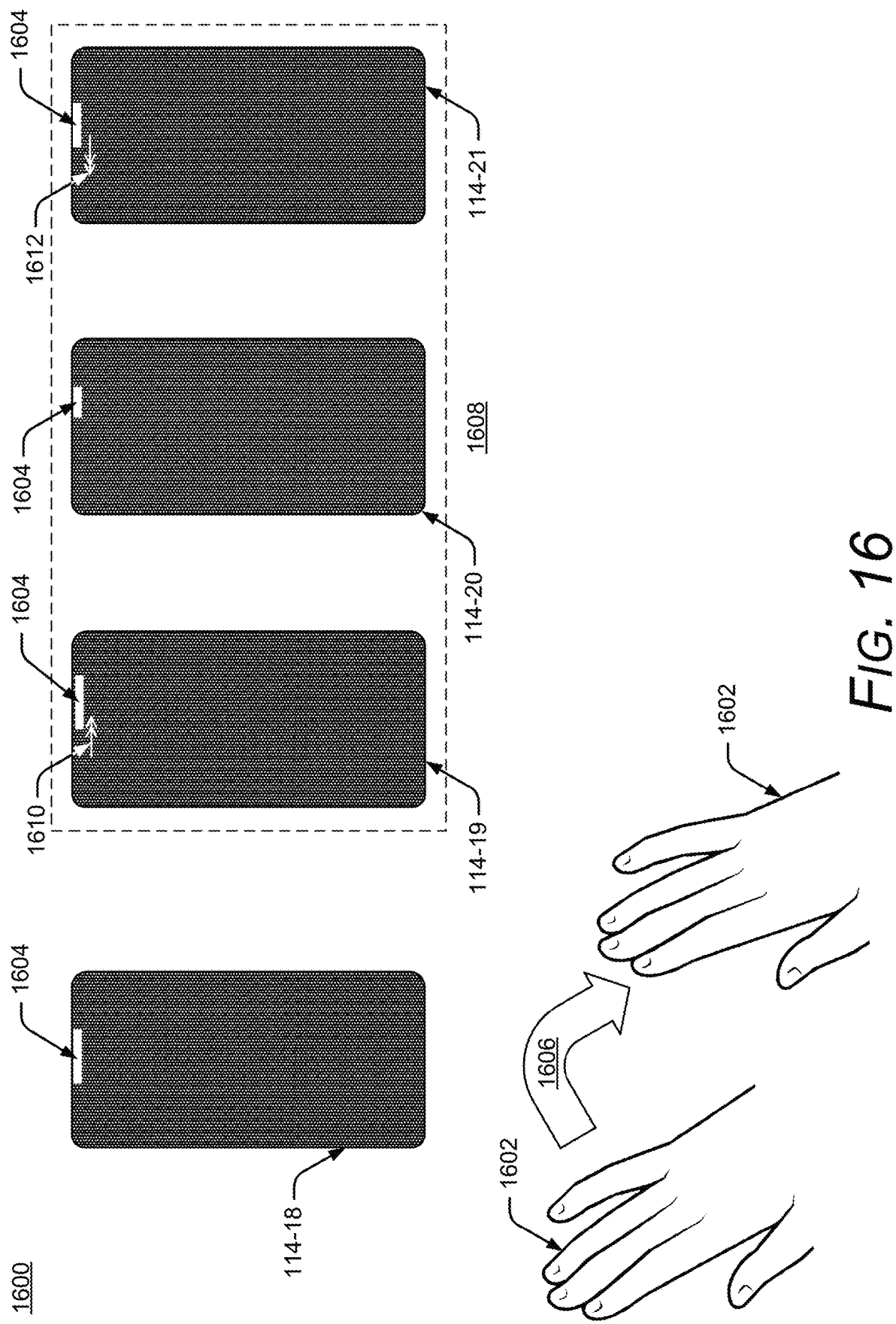

FIG. 16 illustrates generally, at 1600, a sequence of example visual elements that can be used to notify the user 112 that a gesture has failed to be successfully received. In FIG. 16, an example display 114-18 is shown in a state in which at least one gesture-subscribed application is running and a user's hand 1602 is within the boundary of a gesture zone, such as the gesture zone 1404 (e.g., similar to the example display 114-12 described with reference to FIG. 14). The example display 114-18 is presenting a visual element 1604, shown as an illuminated line near the top of the example display 114-18, to indicate the availability of remote 3D gestures and that the user's hand 1602 is within the gesture zone. In the example of FIG. 16, the user 112 attempts to make a sliding or swiping gesture from left to right, but fails to meet sufficient standards for a swiping gesture. For example, as shown by a curved arrow 1606, the user's hand 1602 may fail to travel sufficient distance in a relevant direction before withdrawing. In this case, when the electronic device 102 (or the radar system 104) detects the motion 1606 of the user's hand 1602, which lacks sufficient definition to be successfully determined to be a remote 3D gesture, the visual element 1604 moves as shown in a sequence 1608 (within a dashed-line rectangle). In the sequence 1608, an example display 114-19 illustrates the beginning of the sequence 1608, as the visual element 1604 begins moving to the right, as shown by an arrow 1610.

Continuing the sequence 1608, another example display 114-20 shows the visual element 1604 has stopped before reaching the edge of the example display 114-20 and has shrunk (compared to its starting length as shown in the example display 114-18). In another example display 114-21, the visual element 1604 reverses direction, as shown by another arrow 1612, begins to move back toward its original location (the center in this example), and begins to grow back to its original length. In other implementations, rather than stopping and shrinking, the visual element 1604 may slow and bounce before reversing direction. When the sequence 1608 is complete, the display returns to the state as shown in the example display 114-18, with the visual element 1604 displayed near the top of the example display 114-18 and subtly tracking the user's hand 1602 while it remains within the boundary of the gesture zone 1404. The motion of the visual element 1604, can help the user 112 understand when a gesture has not been successfully completed so that the user can learn techniques for making successful remote 3D gestures and become aware when an attempted gesture fails (e.g., so it can be attempted again, if necessary), which can improve the user's experience with the electronic device 102.

Note that the sequence 1608 may begin when the electronic device 102 (or the awareness manager 106) detects (e.g., using one or more subsets of the radar data) that the user 112 has attempted a remote 3D gesture, but also determines that the gesture fails to meet at least one criterion that is necessary for acceptance. Accordingly, the attempted gesture and the sequence 1608 may be completed at different times, depending on the nature of the attempted gesture and the speed of the sequence 1608. Further, as described above, while the visual element 1604 is shown as a partially illuminated line near the top of the display 114, the visual element 1604 may be presented at another location or as another shape or type of element. The sequence 1608 can also begin at another location on the display 114 and proceed in another direction, such as right to left, top to bottom, or bottom to top (e.g., if an attempted remote 3D gesture moved from right to left, top to bottom, or bottom to top). Other examples of sequences that show an unsuccessful remote 3D gesture attempt include a visual element that partially collapses on itself, such as by briefly shrinking, and then returns to its original size and position.

In some implementations, the electronic device 102 includes a gesture-paused mode that can turn off or suspend the remote 3D gesture capabilities of the electronic device 102 when conditions indicated that the system may be inefficient or ineffective at receiving or interpreting the gestures. For example, when the electronic device 102 is moving at a velocity above a threshold, or when the direction in which the electronic device 102 is moving changes rapidly and repeatedly, the electronic device can enter the gesture-paused mode and provide visual feedback to the user. The electronic device 102 may determine to enter the gesture-paused mode based on input from any of a variety of sensors, including a radar sensor (e.g., the radar system 104), an inertial measurement unit (IMU), a proximity sensor (e.g., an active infrared proximity sensor), and so forth. For example, if the user 112 is walking and listening to audio content with the electronic device 102 in the user's hands swinging back and forth, the motion may be similar to a remote 3D swipe gesture, but the user 112 does not intend to skip tracks or adjust the volume. Accordingly, because the motion of the electronic device 102 introduces ambiguity into the gesture interpretation process, the electronic device 102 may determine to enter the gesture-paused mode until the ambiguity is resolved (e.g., the user 112 stops walking).

Figure 17:
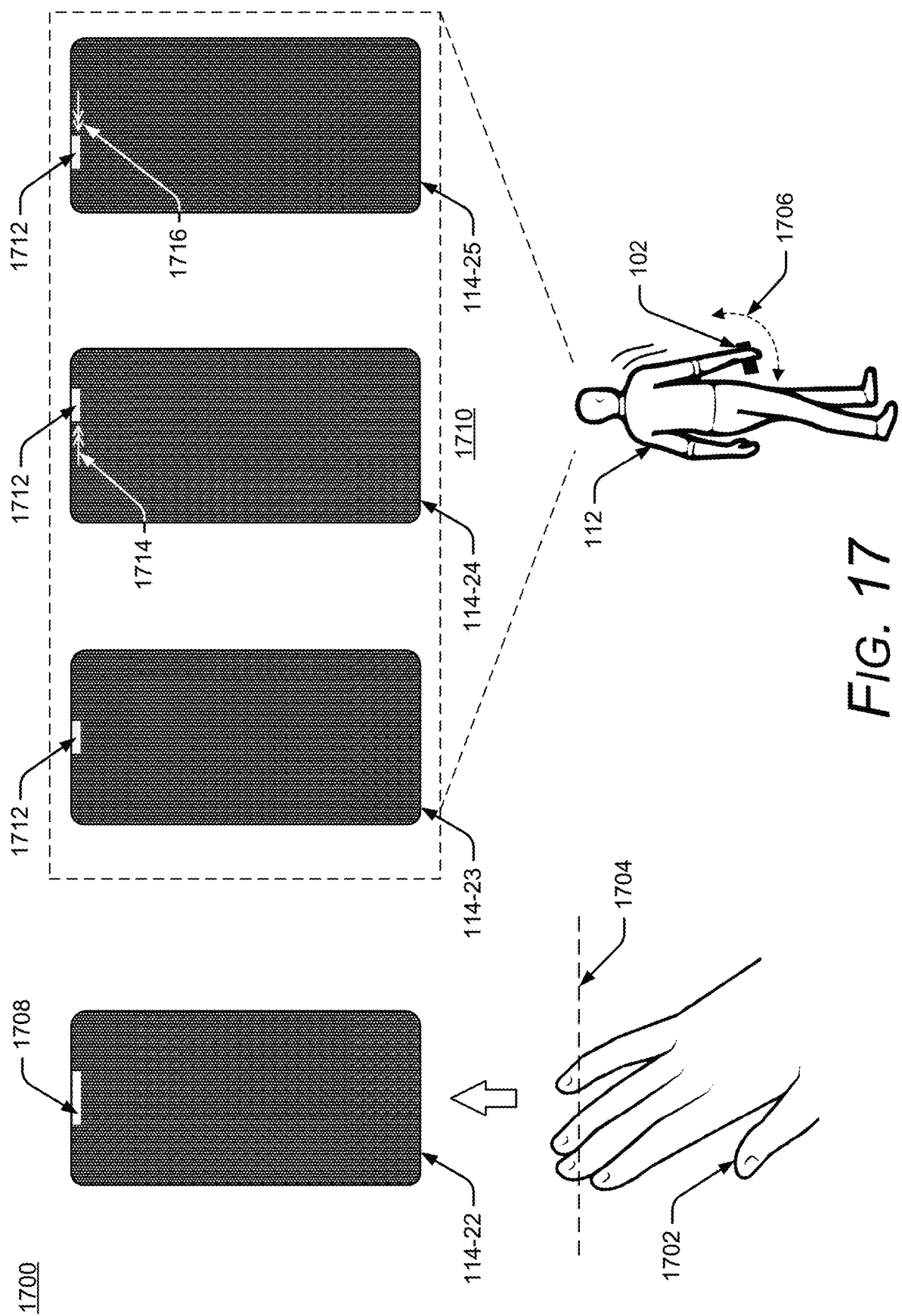

Consider FIG. 17, which illustrates generally, at 1700, example visual elements that may be used to indicate that a gesture-subscribed application is available to receive remote 3D gesture input, but that gestures are currently paused. The gesture-paused mode may be activated whenever remote 3D gestures are available, whether the user's hand is in or out of the gesture zone. In FIG. 17, an example display 114-22 is shown in a state in which at least one gesture-subscribed application is running and a user's hand 1702 is within the boundary of a gesture zone 1704 (e.g., similar to the example display 114-12 described with reference to FIG. 14). The example display 114-22 is presenting a visual element 1708, shown as an illuminated line near the top of the example display 114-22, to indicate the availability of remote 3D gestures and that the user's hand 1702 is within the gesture zone. If the user 112 takes an action that causes the electronic device 102 to enter the gesture-paused mode (e.g., the user's hand 1702 begins moving back and forth as the user 112 is walking, as shown by an arrow 1706), the visual element 1708 changes, as shown in a sequence 1710 (within a dashed-line rectangle).

An example display 114-23 illustrates the beginning of the sequence 1710 as, in response to the electronic device 102 detecting the motion 1706, another visual element 1712 replaces the visual element 1708. As shown on an example display 114-23, the visual element 1712 is another line that is shorter and dimmer than the visual element 1708. The sequence 1710 continues in another example display 114-24, in which the visual element 1712 begins moving to the right, as shown by an arrow 1714. Continuing the sequence 1710 in another example display 114-25, the visual element 1712 moves to the left as shown by an arrow 1716. In the sequence 1710, the visual element 1712 may stop and reverse direction before it reaches a side of the display or go all the way to the edge before reversing direction. In some implementations, the visual element 1712 may further shrink when it stops to reverse directions and then return to its original size when, after, or as, it begins moving in the opposite direction. Further, the oscillation of the visual element 1712 may match the condition upon which the gesture-paused mode is based. For example, in the case of the user's arms swinging, the velocity or frequency of the oscillation of the visual element 1712 may approximately match the velocity or frequency of the user's hand moving.

As described above, while the visual element 1712 is shown as a partially illuminated line near the top of the display 114, the visual element 1712 can be presented at another location or as another shape or type of element. The sequence 1710 can also begin at another location on the display 114 and proceed in another direction, such as right to left, top to bottom, or bottom to top (e.g., depending on the orientation of any content on the display 114 or another factor).

When the electronic device 102 exits the gesture-paused mode, the sequence 1710 is complete and the display returns to an appropriate state, depending on whether there are gesture-subscribed applications running and on the location of the user's hand 1702. This sequence 1710 of motion of the visual element 1712 can help the user 112 understand when gestures may be paused and allow the user 112 to adjust how the electronic device is used to avoid or take advantage of the gesture-paused mode, which can improve the user's experience with the electronic device 102.

In some implementations, the electronic device 102 can determine a background color of a region of the display 114 on which the visual elements described with reference to FIGS. 13-17 are, or will be, displayed. In response to determining the background color, the electronic device 102 can cause the display 114 to present the visual elements in another color that is different from the background color and which can provide human-discernable contrast between the visual elements and the background color to make it easier for the user 112 to see the visual elements. In some cases, the electronic device 102 can continuously, automatically, and dynamically adjust the color of the visual elements, based on changes to the background color.

Example Computing System

Figure 18:
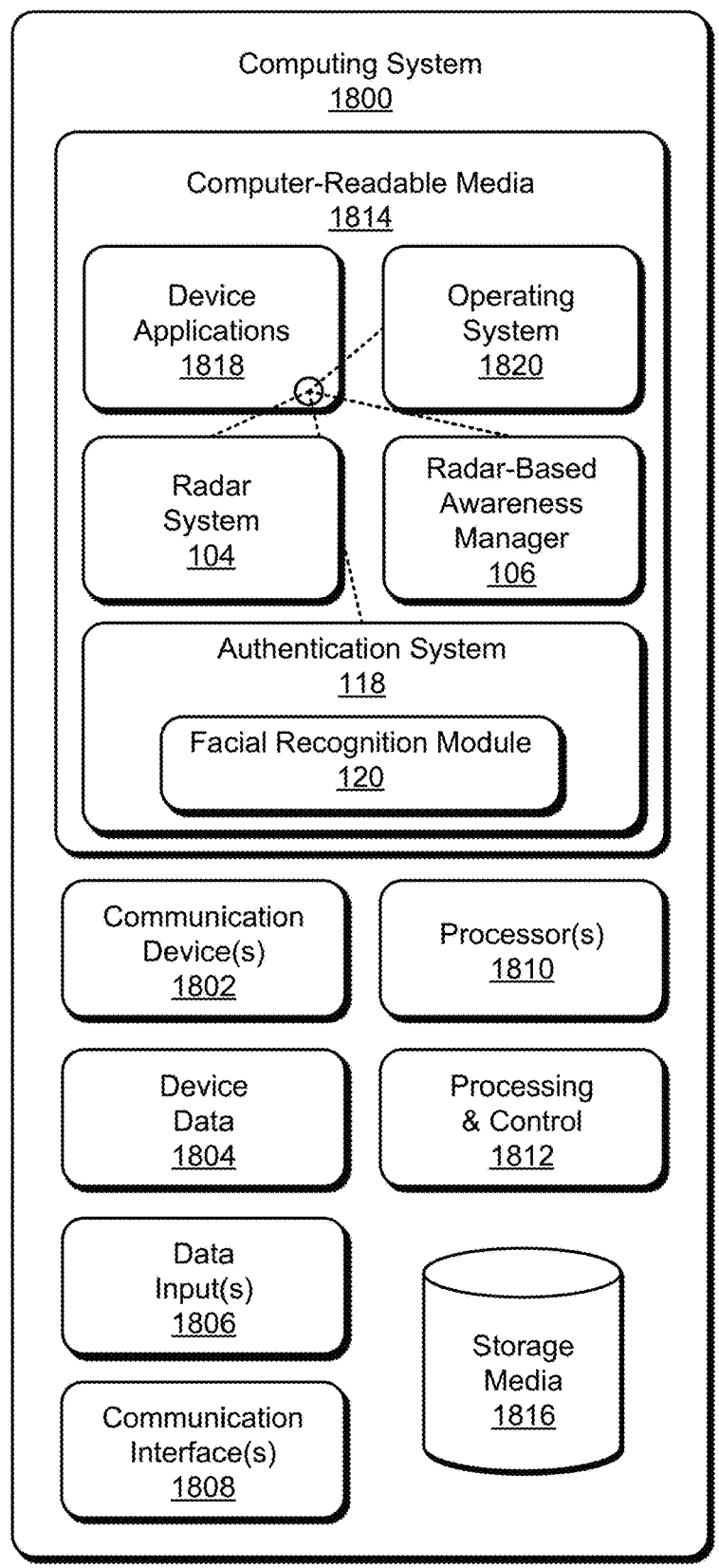
FIG. 18 illustrates an example computing system that can be implemented as any type of client, server, and/or electronic device as described with reference to FIGS. 1-17 to implement, or in which techniques may be implemented that enable, radar-based authentication status feedback.

FIG. 18 illustrates various components of an example computing system 1800 that can be implemented as any type of client, server, and/or electronic device as described with reference to the previous FIGS. 1-17 to implement radar-based authentication status feedback.

The computing system 1800 includes communication devices 1802 that enable wired and/or wireless communication of device data 1804 (e.g., radar data, authentication data, reference data, received data, data that is being received, data scheduled for broadcast, and data packets of the data). The device data 1804 or other device content can include configuration settings of the device, media content stored on the device, and/or information associated with a user of the device (e.g., an identity of a person within a radar field or customized gesture data). Media content stored on the computing system 1800 can include any type of radar, biometric, audio, video, and/or image data. The computing system 1800 includes one or more data inputs 1806 via which any type of data, media content, and/or inputs can be received, such as human utterances, interactions with a radar field (e.g., a remote 3D gesture), touch inputs, user-selectable inputs or interactions (explicit or implicit), messages, music, television media content, recorded video content, and any other type of audio, video, and/or image data received from any content and/or data source.

The computing system 1800 also includes communication interfaces 1808, which can be implemented as any one or more of a serial and/or a parallel interface, a wireless interface, any type of network interface, a modem, and as any other type of communication interface. The communication interfaces 1808 provide a connection and/or communication links between the computing system 1800 and a communication network by which other electronic, computing, and communication devices communicate data with the computing system 1800.

The computing system 1800 includes one or more processors 1810 (e.g., any of microprocessors, controllers, or other controllers) that can process various computer-executable instructions to control the operation of the computing system 1800 and to enable techniques for, or in which can be implemented, radar-based authentication status feedback. Alternatively or additionally, the computing system 1800 can be implemented with any one or combination of hardware, firmware, or fixed logic circuitry that is implemented in connection with processing and control circuits, which are generally identified at 1812. Although not shown, the computing system 1800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures. Also not shown, the computing system 1800 can include one or more non-radar sensors, such as the non-radar sensors 108.

The computing system 1800 also includes computer-readable media 1814, such as one or more memory devices that enable persistent and/or non-transitory data storage (e.g., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1800 can also include a mass storage media device (storage media) 1816.

The computer-readable media 1814 provides data storage mechanisms to store the device data 1804, as well as various device applications 1818 and any other types of information and/or data related to operational aspects of the computing system 1800. For example, an operating system 1820 can be maintained as a computer application with the computer-readable media 1814 and executed on the processors 1810. The device applications 1818 may include a device manager, such as any form of a control application, software application, signal-processing and control modules, code that is native to a particular device, an abstraction module, a gesture recognition module, and other modules. The device applications 1818 may also include system components, engines, modules, or managers to implement radar-based authentication status feedback, such as the radar system 104, the awareness manager 106, the authentication system 118, or the facial recognition module 120. The computing system 1800 may also include, or have access to, one or more machine learning systems.

Several examples are described below.

Example 1. An electronic device, comprising: a display, a radar system, implemented at least partially in hardware, configured to: provide a radar field; sense reflections from a user in the radar field; analyze the reflections from the user in the radar field; and provide, based on the analysis of the reflections, radar data; one or more computer processors; and one or more computer-readable media having instructions stored thereon that, responsive to execution by the one or more computer processors, implement a radar-based awareness manager configured to: maintain the electronic device in a dormant mode; determine, based on a first subset of the radar data, a presence of the user within a recognition zone of the electronic device; responsive to determining the presence of the user within the recognition zone, cause the electronic device to enter an aware mode in which the display presents a first visual element that indicates a first status of the electronic device; detect, based on a second subset of the radar data, a user action that is categorized as an indication of a user intent to interact with the electronic device; responsive to detection of the user action that is categorized as an indication of the user intent to interact with the electronic device, cause the electronic device to prepare an authentication system to perform an authentication process; cause the prepared authentication system to perform, based on a trigger event, the authentication process on the user; and responsive to the user being authenticated, cause the electronic device to enter an active mode.

Example 2. The electronic device of example 1, wherein the first visual element that indicates the first status of the electronic device in the aware mode is one or more of a displayed time, a displayed date, a connectivity status, or a battery-level indicator.

Example 3. The electronic device of example 1, wherein the radar-based awareness manager is further configured to, responsive to detection of the user action that is categorized as the indication of the user intent to interact with the electronic device, cause the electronic device to enter an engaged mode in which the display presents a second visual element that indicates a second status of the electronic device.

Example 4. The electronic device of example 3, wherein the second visual element that indicates the second status of the electronic device in the engaged mode is one or more of a background image or a visual element that indicates the electronic device is locked.

Example 5. The electronic device of example 3, wherein the radar-based awareness manager is further configured to, responsive to the user being authenticated, cause the electronic device to exit the engaged mode before entering the active mode.

Example 6. The electronic device of example 1, wherein the authentication system is associated with a camera and a facial recognition module, and preparing the authentication system to perform the authentication process comprises: causing the camera to enter a state in which the camera can capture an image; and causing the facial recognition module to enter a state in which the facial recognition module can use the captured image to authenticate the user. Among the advantages of the described implementations, including implementations in which radar sensing is used to detect the presence of the user within a recognition zone, and further including implementations in which radar is used to detect user action that is categorized as an indication of a user intent to interact with the electronic device, either of which might alternatively be achievable using the on-device camera that is provided with most modern smartphones, is that the power usage of the radar facility is substantially less than the power usage of the camera facility, while the propriety of the results can often be better with the radar facility than with the camera facility. For example, using the radar facility described hereinabove, the desired user-state or user-intention detection can be achieved at average power ranging from single-digit milliwatts to just a few dozen milliwatts (e.g., 10 mW, 20 mW, 30 mW or 40 mW), even including the processing power for processing the radar vector data to make the determinations. At these low levels of power, it would be readily acceptable to have the radar facility in an always-on state. As such, for example, with the smartphone radar facility in the always-on state, the desired delightful and seamless experience presently described can still be provided for a user that has been sitting across the room from their smartphone for many hours. In contrast, the optical cameras provided with most of today's smartphones typically operate at hundreds of milliwatts of power (e.g., an order of magnitude higher than 40 mW, which is 400 mW). At such power rates, optical cameras would be disadvantageous because they would significantly reduce the battery life of most of today's smartphones, so much so as to make it highly impractical, if not prohibitive, to have the optical camera in an always-on state. An additional advantage of the radar facility is that the field of view can be quite large, readily enough to detect a user walking up from any direction even when lying flat and face-up on a table (for many typical implementations in which the radar chip is facing outward in the same general direction as the selfie camera) and, furthermore, by virtue of its Doppler processing ability can be highly effective (especially at operating frequencies near 60 GHz) in detecting even relatively subtle movements of moving bodies from the variety of directions. Additionally, the radar facility can operate in environments in which the performance of the camera facility is reduced or restricted. For example, in lower-light environments, the camera facility may have a reduced ability to detect shape or movement. In contrast, the radar facility performs as well in lower-light as in full light. The radar facility can also detect presence and gestures through some obstacles. For instance, if the smartphone is in a pocket or a jacket or pair of pants, a camera facility cannot detect a user or a gesture. The radar facility, however, can still detect objects in its field, even through a fabric that would block the camera facility. An even further advantage of using a radar facility over an onboard video camera facility of a smartphone is privacy, whereby a user can have the advantages of the herein described delightful and seamless experiences while at the same time not needing to be worried that there is a video camera taking video of them for such purposes.

Example 7. The electronic device of example 1, wherein causing the electronic device to enter the active mode further includes causing the display to present a third visual element that indicates a third status of the electronic device, the third visual element being at least one of: a background image, a wallpaper, a home screen, a screen with a visual element that indicates the electronic device is in an unlocked state, or a screen of an application that was most recently open prior to the electronic device entering a locked state.

Example 8. The electronic device of example 7, wherein the radar-based awareness manager is further configured to: determine, based on at least one of a first subset of the radar data or another subset of the radar data, whether another user is present within the recognition zone of the electronic device; and determine, based at least in part on the determination of whether the other user is present within the recognition zone, the third visual element that indicates the third status of the electronic device.

Example 9. The electronic device of example 1, wherein the user action that is categorized as the indication of the user intent to interact with the electronic device is a reach gesture.

Example 10. The electronic device of example 1, wherein the trigger event is at least one of: a change in user location, a change in an orientation of the electronic device, or an explicit touch input.

Example 11. The electronic device of example 1, wherein the first subset of the radar data and the second subset of radar data are based on reflections from the user in the radar field at separate times.

Example 12. A method implemented in an electronic device that includes a radar system and a radar-based awareness manager, the method comprising: providing, by the radar system, a radar field; sensing, by the radar system, reflections from a user in the radar field; analyzing, by the radar system, the reflections from the user in the radar field; providing, by the radar system and based on the analysis of the reflections, radar data; maintaining, by the radar-based awareness manager, the electronic device in a dormant mode; determining, based on a first subset of the radar data, a presence of the user within a recognition zone of the electronic device; responsive to determining the presence of the user within the recognition zone, causing the electronic device to enter an aware mode in which the display presents a first visual element that indicates a first status of the electronic device; detecting, based on a second subset of the radar data, a user action that is categorized as an indication of a user intent to interact with the electronic device; responsive to detecting the user action that is categorized as the indication of the user intent to interact with the electronic device, causing the electronic device to prepare an authentication system to perform an authentication process; causing, by the radar-based awareness manager and based on a trigger event, the prepared authentication system to perform the authentication process on the user; and responsive to the user being authenticated, causing, by the radar-based awareness manager, the electronic device to enter an active mode.

Example 13. The method of example 12, further comprising: responsive to detecting the user action that is categorized as the indication of the user intent to interact with the electronic device, causing the electronic device to enter an engaged mode in which the display presents a second visual element that indicates a second status of the electronic device.

Example 14. The method of example 13, wherein causing, by the radar-based awareness manager, the electronic device to enter the active mode further comprises causing the electronic device to exit the engaged mode before entering the active mode.

Example 15. The method of example 13, wherein: the first visual element that indicates the first status of the electronic device in the aware mode is at least one of a displayed time, a displayed date, a connectivity status, or a battery-level indicator; and the second visual element that indicates the second status of the electronic device in the engaged mode is one or more of a background image or a visual element that indicates the electronic device is locked.

Example 16. The method of example 12, wherein the authentication system is associated with a camera and a facial recognition module, and preparing the authentication system to perform the authentication process comprises: causing the camera to enter a state in which the camera can capture an image; and causing the facial recognition module to enter a state in which the facial recognition module can use the captured image to authenticate the user.

Example 17. The method of example 12, wherein causing the electronic device to enter the active mode further comprises causing the display to present a third visual element that indicates a third status of the electronic device.

Example 18. The method of example 17, wherein: the third visual element is at least one of a background image or a visual element that indicates the electronic device is unlocked; and the background image or the visual element is presented for a duration of time and then ceases to be presented.

Example 19. The method of example 12, wherein the user action that is categorized as the indication of the user intent to interact with the electronic device is a reach gesture.

Example 20. The method of example 12, wherein the trigger event is at least one of: a change in user location, a change in an orientation of the electronic device; or, an explicit touch input.

CONCLUSION

Although implementations of techniques for, and apparatuses enabling, radar-based authentication status feedback have been described in language specific to features and/or methods, it is to be understood that the subject of the appended claims is not necessarily limited to the specific features or methods described. Rather, the specific features and methods are disclosed as example implementations enabling radar-based authentication status feedback.

What is claimed is:

1. An electronic device, comprising:
a display,
a radar system, implemented at least partially in hardware, configured to:
provide a radar field;
sense reflections from a user in the radar field;
analyze the reflections from the user in the radar field; and
provide, based on the analysis of the reflections, radar data;
one or more computer processors; and
one or more computer-readable media having instructions stored thereon that, responsive to execution by the one or more computer processors, implement a radar-based awareness manager configured to:
maintain the electronic device in a dormant mode;
determine, based on a first subset of the radar data, a presence of the user within a recognition zone of the electronic device;
responsive to determining the presence of the user within the recognition zone, cause the electronic device to enter an aware mode in which the display presents a first visual element that indicates a first status of the electronic device;
detect a user action, based on a second subset of the radar data, the user action categorized as an indication of an intent of the user to interact with the electronic device, the user action including one or more of:
the user turning toward or away from the electronic device without the user's face being detected;
the user moving toward or away from the electronic device without the user's face being detected;
the user leaning toward the electronic device without the user's face being detected; or
the user making a reach gesture toward the electronic device without a touch to the electronic device and without the user's face being detected;
responsive to detection of the user action that is categorized as the indication of the intent of the user to interact with the electronic device, cause the electronic device to prepare an authentication system to perform an authentication process;
cause the prepared authentication system to perform, based on a trigger event, the authentication process on the user; and
responsive to the user being authenticated, cause the electronic device to enter an active mode.

2. The electronic device of claim 1, wherein the first visual element that indicates the first status of the electronic device in the aware mode is one or more of a displayed time, a displayed date, a connectivity status, or a battery-level indicator.

3. The electronic device of claim 1, wherein the radar-based awareness manager is further configured to, responsive to detection of the user action that is categorized as the indication of the intent of the user to interact with the electronic device, cause the electronic device to enter an engaged mode in which the display presents a second visual element that indicates a second status of the electronic device.

4. The electronic device of claim 3, wherein the second visual element that indicates the second status of the electronic device in the engaged mode is one or more of a background image or a visual element that indicates the electronic device is locked.

5. The electronic device of claim 3, wherein the radar-based awareness manager is further configured to, responsive to the user being authenticated, cause the electronic device to exit the engaged mode before entering the active mode.

6. The electronic device of claim 1, wherein the authentication system is associated with a camera and a facial recognition module, and preparing the authentication system to perform the authentication process comprises:
    causing the camera to enter a state in which the camera can capture an image; and
    causing the facial recognition module to enter a state in which the facial recognition module can use the captured image to authenticate the user.

7. The electronic device of claim 1, wherein causing the electronic device to enter the active mode further includes causing the display to present a third visual element that indicates a third status of the electronic device, the third visual element being at least one of: a background image, a wallpaper, a home screen, a screen with a visual element that indicates the electronic device is in an unlocked state, or a screen of an application that was most recently open prior to the electronic device entering a locked state.

8. The electronic device of claim 7, wherein the radar-based awareness manager is further configured to:
    determine, based on at least one of a first subset of the radar data or another subset of the radar data, whether another user is present within the recognition zone of the electronic device; and
    determine, based at least in part on the determination of whether the other user is present within the recognition zone, the third visual element that indicates the third status of the electronic device.

9. The electronic device of claim 1, wherein the trigger event comprises at least one of:
    a change in user location;
    a change in an orientation of the electronic device; or
    an explicit touch input.

10. The electronic device of claim 1, wherein the first subset of the radar data and the second subset of radar data are based on reflections from the user in the radar field at separate times.

11. The electronic device of claim 1, wherein:
    the electronic device includes machine-learning technology configured to generate a machine-learned model, the machine-learned model trained at least in part based on the user's history and behavior with the device; and
    the radar-based awareness manager is further configured to:
        detect the user action that is categorized as the indication of the intent of the user to interact with the electronic device via a library that is associated with the electronic device, the library including actions that are categorized as indicators of the user's intent to interact or not interact with the device; and
        determine, using the machine-learned model, additions, removals, or modifications of actions included in the library that are categorized as indicators of the intent of the user to interact or not interact with the device.

12. A method implemented in an electronic device that includes a radar system and a radar-based awareness manager, the method comprising:
    providing, by the radar system, a radar field;
    sensing, by the radar system, reflections from a user in the radar field;
    analyzing, by the radar system, the reflections from the user in the radar field;
    providing, by the radar system and based on the analysis of the reflections, radar data;
    maintaining, by the radar-based awareness manager, the electronic device in a dormant mode;
    determining, based on a first subset of the radar data, a presence of the user within a recognition zone of the electronic device;
    responsive to determining the presence of the user within the recognition zone, causing the electronic device to enter an aware mode in which the display presents a first visual element that indicates a first status of the electronic device;
    detecting a user action, based on a second subset of the radar data, the user action categorized as an indication of an intent of the user to interact with the electronic device, the user action including one or more of:
        the user turning toward or away from the electronic device without the user's face being detected;
        the user moving toward or away from the electronic device without the user's face being detected;
        the user leaning toward the electronic device without the user's face being detected; or
        the user making a reach gesture toward the electronic device without a touch to the electronic device and without the user's face being detected;
    responsive to detecting the user action that is categorized as the indication of the intent of the user to interact with the electronic device, causing the electronic device to prepare an authentication system to perform an authentication process;
    causing, by the radar-based awareness manager and based on a trigger event, the prepared authentication system to perform the authentication process on the user; and
    responsive to the user being authenticated, causing, by the radar-based awareness manager, the electronic device to enter an active mode.

13. The method of claim 12, further comprising:
    responsive to detecting the user action that is categorized as the indication of the intent of the user to interact with the electronic device, causing the electronic device to enter an engaged mode in which the display presents a second visual element that indicates a second status of the electronic device.

14. The method of claim 13, wherein:
    the first visual element that indicates the first status of the electronic device in the aware mode is at least one of a displayed time, a displayed date, a connectivity status, or a battery-level indicator; and
    the second visual element that indicates the second status of the electronic device in the engaged mode is one or more of a background image or a visual element that indicates the electronic device is locked.

15. The method of claim 12, wherein the authentication system is associated with a camera and a facial recognition module, and preparing the authentication system to perform the authentication process comprises:
    causing the camera to enter a state in which the camera can capture an image; and
    causing the facial recognition module to enter a state in which the facial recognition module can use the captured image to authenticate the user.

16. The method of claim 12, wherein causing the electronic device to enter the active mode further comprises causing the display to present a third visual element that indicates a third status of the electronic device.

17. The method of claim 16, wherein:
    the third visual element is at least one of a background image or a visual element that indicates the electronic device is unlocked; and
    the background image or the visual element is presented for a duration of time and then ceases to be presented.

18. The method of claim 12, wherein the trigger event comprises at least one of:
a change in user location;
a change in an orientation of the electronic device; or
an explicit touch input.

19. The method of claim 12, wherein:
the electronic device further includes a machine-learning technology configured to generate a machine-learned model, the machine-learned model trained at least in part based on the user's history and behavior with the device; and
the method further comprises:
- detecting the user action that is categorized as the indication of the intent of the user to interact with the electronic device using a library that is associated with the electronic device, the library including actions that are categorized as indicators of the user's intent to interact or not interact with the device;
- determining, using the machine-learned model, additions, removals, or modifications of actions included in the library that are categorized as indicators of the intent of the user to interact or not interact with the device.

20. A method implemented in an electronic device that includes a radar system, a radar-based awareness manager, and machine-learning technology, the method comprising:
providing, by the radar system, a radar field;
sensing, by the radar system, reflections from a user in the radar field;
analyzing, by the radar system, the reflections from the user in the radar field;
providing, by the radar system and based on the analysis of the reflections, radar data;
generating, by the machine-learning technology, a machine-learned model, the machine-learned model trained at least in part based on the user's history and behavior with the device;
maintaining, by the radar-based awareness manager, the electronic device in a dormant mode;
determining, based on a first subset of the radar data, a presence of the user within a recognition zone of the electronic device;
responsive to determining the presence of the user within the recognition zone, causing the electronic device to enter an aware mode in which the display presents a first visual element that indicates a first status of the electronic device;
detecting a user action, based on a second subset of the radar data, the user action categorized as an indication of an intent of the user to interact with the electronic device and the detecting performed using a library that is associated with the electronic device and that includes user actions that are categorized as indicators of the user's intent to interact or not interact with the device;
responsive to detecting the user action that is categorized as the indication of the intent of the user to interact with the electronic device, causing the electronic device to prepare an authentication system to perform an authentication process;
causing, by the radar-based awareness manager and based on a trigger event, the prepared authentication system to perform the authentication process on the user;
responsive to the user being authenticated, causing, by the radar-based awareness manager, the electronic device to enter an active mode; and
determining, using the machine-learned model, additions, removals, or modifications of actions included in the library that are categorized as indicators of the intent of the user to interact or not interact with the device.

* * * * *